(12) United States Patent
Jhang et al.

(10) Patent No.: US 10,962,744 B2
(45) Date of Patent: Mar. 30, 2021

(54) OPTICAL LENS ASSEMBLY

(71) Applicant: GENIUS ELECTRONIC OPTICAL (XIAMEN) CO., LTD., Fujian (CN)

(72) Inventors: Jia-Sin Jhang, Taichung (TW); Baina Chen, Fujian (CN); Guangyun Li, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 16/584,953

(22) Filed: Sep. 27, 2019

(65) Prior Publication Data
US 2020/0018931 A1 Jan. 16, 2020

Related U.S. Application Data

(63) Continuation of application No. 15/144,837, filed on May 3, 2016, now abandoned.

(30) Foreign Application Priority Data

Mar. 18, 2016 (CN) .......................... 201610157010.5

(51) Int. Cl.
*G02B 13/00* (2006.01)
*G02B 9/60* (2006.01)
*G02B 9/34* (2006.01)

(52) U.S. Cl.
CPC ........... *G02B 13/0045* (2013.01); *G02B 9/34* (2013.01); *G02B 9/60* (2013.01); *G02B 13/004* (2013.01)

(58) Field of Classification Search
CPC .......... G02B 13/004; G02B 9/34; G02B 9/38; G02B 9/56; G02B 9/60; G02B 13/0045
USPC ......................................................... 359/715
See application file for complete search history.

(56) References Cited

U.S. PATENT DOCUMENTS

2017/0023773 A1* 1/2017 Chen ........................ G02B 9/60

* cited by examiner

Primary Examiner — Wen Huang
(74) Attorney, Agent, or Firm — JCIPRNET

(57) ABSTRACT

An optical lens assembly includes first, second, third, and fourth lens elements arranged in order from an object side to an image side along an optical axis. Each lens element has an object-side surface and an image-side surface. The object-side surface of the first lens element has a convex portion in a vicinity of a periphery. The second lens element has negative refracting power. The object-side surface of the third lens element has a concave portion in a vicinity of a periphery. The image-side surface of the fourth lens element has a convex portion in a vicinity of a periphery.

20 Claims, 63 Drawing Sheets

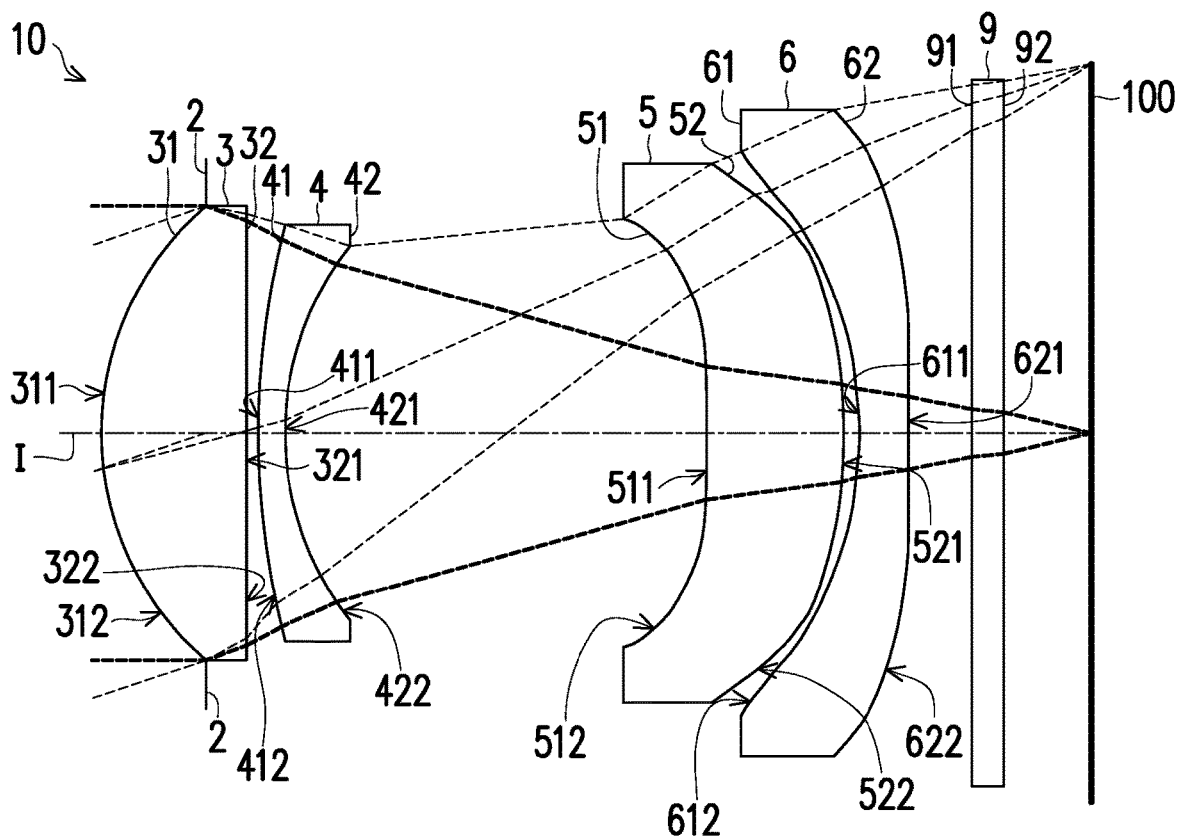
FIG.6
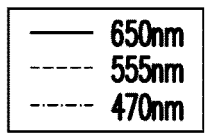
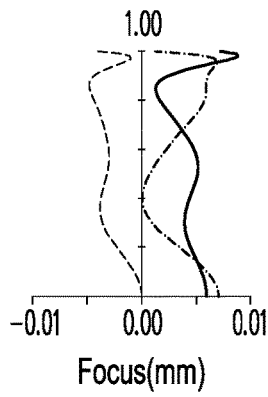
FIG.7A
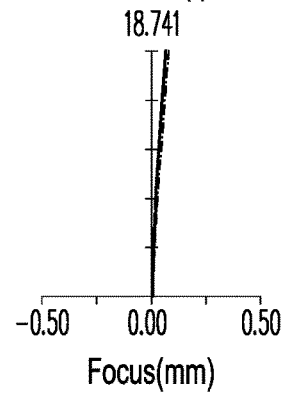
FIG.7B
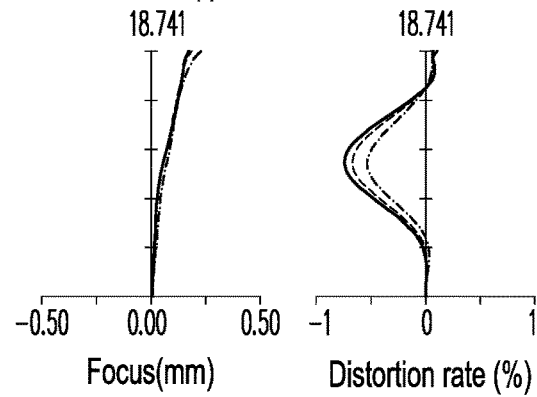
FIG.7C
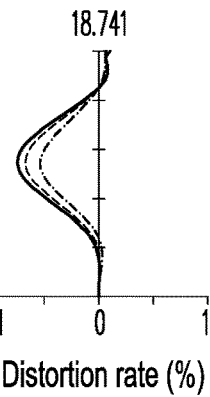
FIG.7D

| First embodiment | | | | | | |
|---|---|---|---|---|---|---|
| EFL=7.069 mm , HFOV=18.741°, Fno=2.400, System length=6.383 mm, Image height=2.400 mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.664 | | | |
| First lens element 3 | Object-side surface 31 | 1.897 | 0.934 | 1.545 | 55.987 | 3.200 |
| | Image-side surface 32 | -18.403 | 0.063 | | | |
| Second lens element 4 | Object-side surface 41 | 5.010 | 0.181 | 1.642 | 22.409 | -5.416 |
| | Image-side surface 42 | 2.033 | 2.731 | | | |
| Third lens element 5 | Object-side surface 51 | -6.454 | 0.881 | 1.642 | 22.409 | 7.594 |
| | Image-side surface 52 | -2.940 | 0.098 | | | |
| Fourth lens element 6 | Object-side surface 61 | -2.296 | 0.321 | 1.535 | 55.690 | -3.625 |
| | Image-side surface 62 | 13.344 | 0.400 | | | |
| Filter 9 | Object-side surface 91 | Infinity | 0.210 | 1.517 | 64.167 | |
| | Image-side surface 92 | Infinity | 0.563 | | | |
| | Image plane 100 | Infinity | 0.000 | | | |

FIG.8

| Surface | K | $a_4$ | $a_6$ |
|---|---|---|---|
| 31 | 0.000000E+00 | -7.619463E-03 | 5.435062E-03 |
| 32 | 0.000000E+00 | 2.348247E-02 | -1.811762E-02 |
| 41 | 0.000000E+00 | -2.251856E-03 | -3.173524E-02 |
| 42 | 0.000000E+00 | -2.243937E-02 | 7.662011E-04 |
| 51 | 0.000000E+00 | -4.444768E-02 | -1.987713E-02 |
| 52 | 0.000000E+00 | 4.835374E-02 | -2.982765E-02 |
| 61 | 0.000000E+00 | 1.096277E-02 | 3.426200E-02 |
| 62 | 0.000000E+00 | -1.036872E-01 | 4.587787E-02 |
| Surface | $a_8$ | $a_{10}$ | $a_{12}$ |
| 31 | -2.748202E-03 | 3.050934E-04 | 0.000000E+00 |
| 32 | 8.640200E-03 | -1.407087E-03 | 0.000000E+00 |
| 41 | 2.817717E-02 | -6.221797E-03 | 0.000000E+00 |
| 42 | 1.166673E-02 | 1.364312E-03 | 0.000000E+00 |
| 51 | 1.973751E-03 | -4.653013E-03 | 0.000000E+00 |
| 52 | -6.743294E-03 | 2.694856E-03 | 0.000000E+00 |
| 61 | -3.442160E-02 | 1.057376E-02 | -9.846545E-04 |
| 62 | -1.004161E-02 | 6.407007E-04 | 1.944674E-05 |

FIG.9

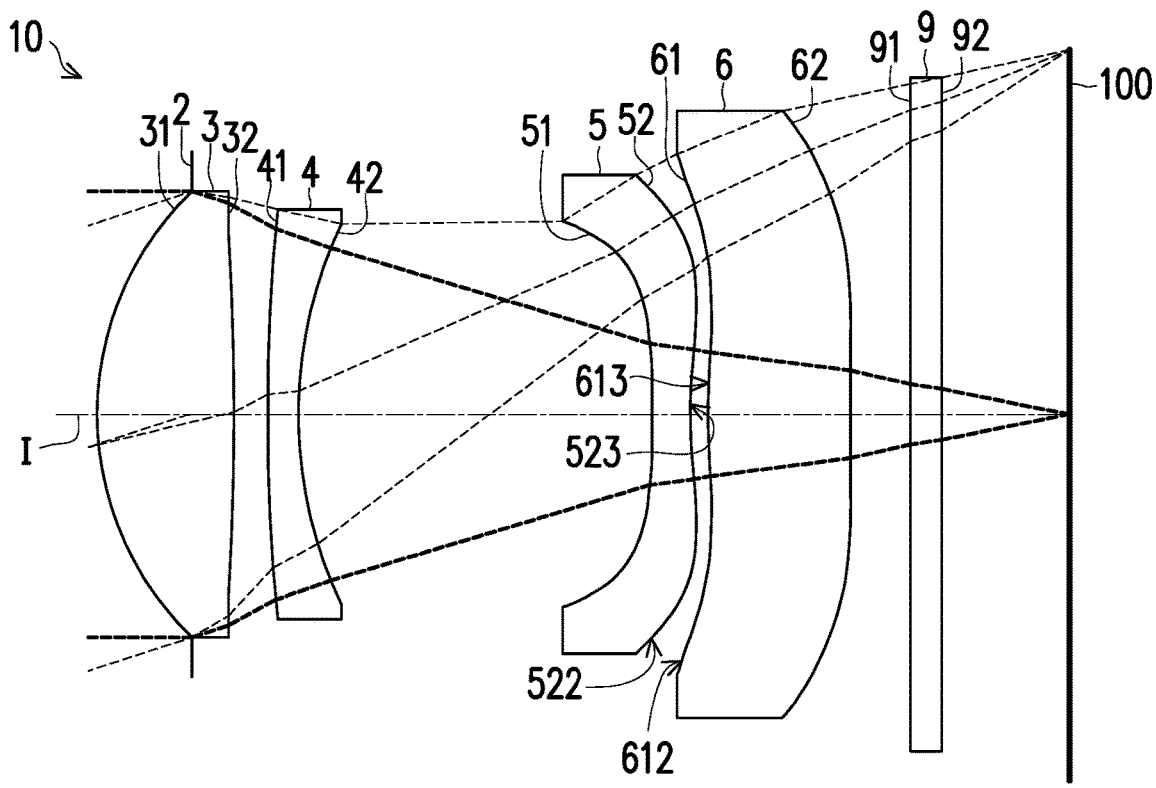
FIG.10
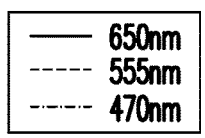
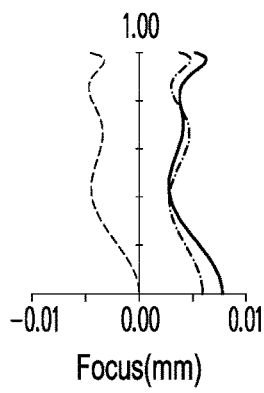
Longitudinal spherical
aberration field of view
1.00
Focus(mm)
FIG.11A
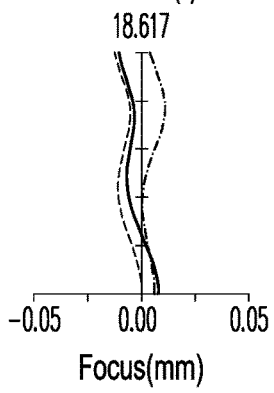
Field curvature
(sagittal direction)
HFOV (°)
18.617
Focus(mm)
FIG.11B
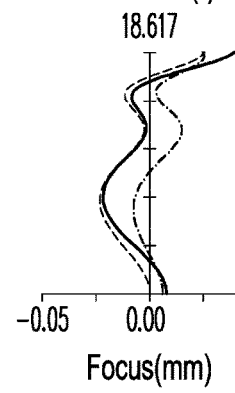
Field curvature
(tangential direction)
HFOV (°)
18.617
Focus(mm)
FIG.11C
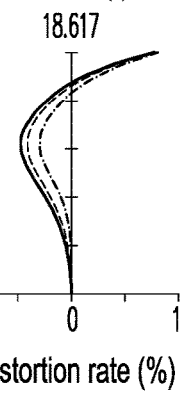
Distortion
HFOV (°)
18.617
Distortion rate (%)
FIG.11D

| Second embodiment | | | | | | |
|---|---|---|---|---|---|---|
| EFL= 7.069mm , HFOV=18.617°, Fno=2.389, System length= 6.382mm, Image height= 2.400mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.605 | | | |
| First lens element 3 | Object-side surface 31 | 2.012 | 0.899 | 1.545 | 55.987 | 3.259 |
| | Image-side surface 32 | -13.049 | 0.222 | | | |
| Second lens element 4 | Object-side surface 41 | 31.874 | 0.200 | 1.661 | 20.401 | -5.734 |
| | Image-side surface 42 | 3.403 | 2.335 | | | |
| Third lens element 5 | Object-side surface 51 | -8.746 | 0.250 | 1.545 | 55.987 | -4.382 |
| | Image-side surface 52 | 3.330 | 0.111 | | | |
| Fourth lens element 6 | Object-side surface 61 | 4.279 | 0.937 | 1.661 | 20.401 | 10.883 |
| | Image-side surface 62 | 9.527 | 0.400 | | | |
| Filter 9 | Object-side surface 91 | Infinity | 0.210 | 1.517 | 64.167 | |
| | Image-side surface 92 | Infinity | 0.818 | | | |
| | Image plane 100 | Infinity | 0.000 | | | |

FIG.12

| Surface | K | $a_4$ | $a_6$ |
|---|---|---|---|
| 31 | 0.000000E+00 | -3.828430E-03 | -7.392548E-04 |
| 32 | 0.000000E+00 | 6.385980E-03 | 3.372396E-03 |
| 41 | 0.000000E+00 | 1.258343E-03 | 1.160469E-02 |
| 42 | 0.000000E+00 | 3.594671E-03 | 1.098361E-02 |
| 51 | 0.000000E+00 | -6.811441E-02 | -6.432641E-02 |
| 52 | 0.000000E+00 | -1.624203E-01 | 4.200551E-02 |
| 61 | 0.000000E+00 | -1.541870E-01 | 5.234964E-02 |
| 62 | 0.000000E+00 | -8.242515E-02 | 1.628723E-02 |
| Surface | $a_4$ | $a_{10}$ | $a_{12}$ |
| 31 | 6.230845E-05 | 0.000000E+00 | 0.000000E+00 |
| 32 | -9.044821E-04 | 0.000000E+00 | 0.000000E+00 |
| 41 | -4.101674E-03 | 0.000000E+00 | 0.000000E+00 |
| 42 | -2.423124E-03 | 0.000000E+00 | 0.000000E+00 |
| 51 | 2.650374E-02 | -1.845420E-02 | 0.000000E+00 |
| 52 | -2.246373E-02 | 4.929245E-03 | 0.000000E+00 |
| 61 | -9.755310E-03 | 7.325964E-04 | 3.082389E-05 |
| 62 | -4.458555E-04 | -4.865774E-04 | 5.928829E-05 |

FIG.13

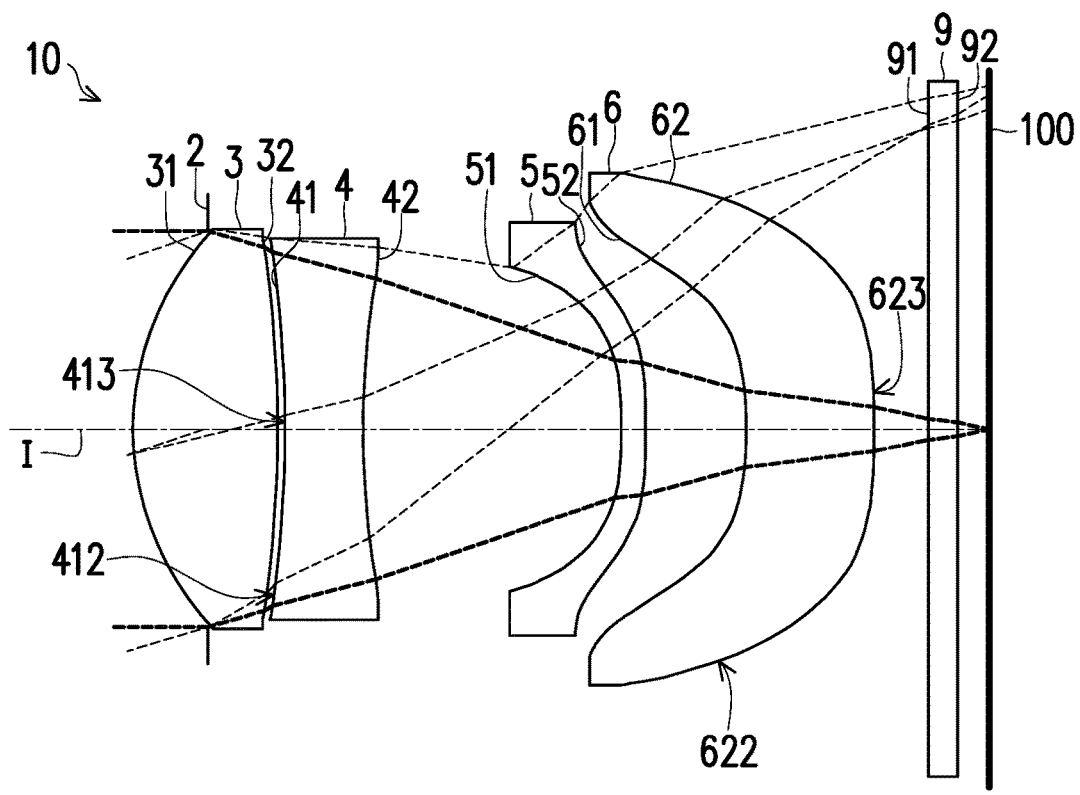
FIG.14
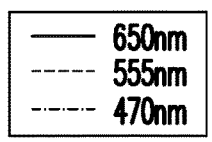
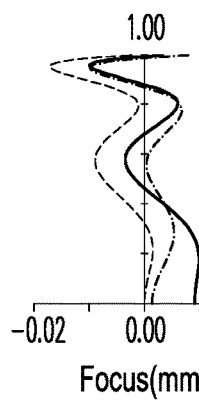
Longitudinal spherical
aberration field of view
1.00
FIG.15A
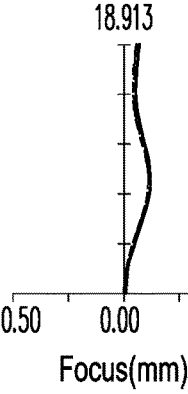
Field curvature
(sagittal direction)
HFOV (°)
18.913
FIG.15B
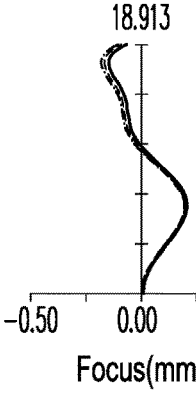
Field curvature
(tangential direction)
HFOV (°)
18.913
FIG.15C
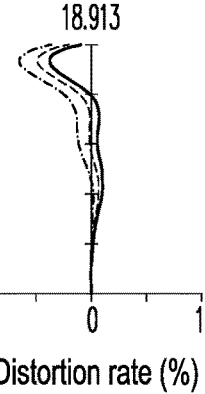
Distortion
HFOV (°)
18.913
FIG.15D

| Third embodiment | | | | | | |
|---|---|---|---|---|---|---|
| EFL= 7.018mm , HFOV=18.913°, Fno=2.381, System length=6.396 mm, Image height=2.400mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop 2 | | Infinity | -0.543 | | | |
| First lens element 3 | Object-side surface 31 | 2.081 | 1.082 | 1.545 | 55.987 | 3.152 |
| | Image-side surface 32 | -8.152 | 0.049 | | | |
| Second lens element 4 | Object-side surface 41 | -8.800 | 0.585 | 1.642 | 22.409 | -5.878 |
| | Image-side surface 42 | 6.877 | 1.936 | | | |
| Third lens element 5 | Object-side surface 51 | -4.751 | 0.179 | 1.545 | 55.987 | -12.502 |
| | Image-side surface 52 | -15.816 | 0.754 | | | |
| Fourth lens element 6 | Object-side surface 61 | -4.261 | 0.961 | 1.545 | 55.987 | -11.175 |
| | Image-side surface 62 | -15.237 | 0.400 | | | |
| Filter 9 | Object-side surface 91 | Infinity | 0.210 | 1.517 | 64.167 | |
| | Image-side surface 92 | Infinity | 0.240 | | | |
| | Image plane 100 | Infinity | 0.000 | | | |

FIG. 16

| Surface | K | $a_4$ | $a_6$ |
|---|---|---|---|
| 31 | 0.000000E+00 | -4.175182E-03 | 7.090919E-04 |
| 32 | 0.000000E+00 | -1.473968E-02 | 2.135671E-02 |
| 41 | 0.000000E+00 | -1.612162E-02 | 2.755902E-02 |
| 42 | 0.000000E+00 | -6.578238E-03 | 1.878753E-02 |
| 51 | 0.000000E+00 | -4.188286E-01 | 2.429354E-01 |
| 52 | 0.000000E+00 | -3.473836E-01 | 8.895537E-02 |
| 61 | 0.000000E+00 | -1.916727E-01 | -7.544380E-02 |
| 62 | 0.000000E+00 | -1.846882E-01 | 5.636138E-02 |
| Surface | $a_8$ | $a_{10}$ | $a_{12}$ |
| 31 | -1.827378E-03 | 4.648955E-04 | 0.000000E+00 |
| 32 | -7.618965E-03 | 6.225851E-04 | 0.000000E+00 |
| 41 | -1.145095E-02 | 8.560207E-04 | 0.000000E+00 |
| 42 | -1.468554E-02 | 2.117387E-03 | 0.000000E+00 |
| 51 | -7.402903E-02 | -3.418785E-02 | 0.000000E+00 |
| 52 | 3.721303E-02 | -1.149836E-02 | 0.000000E+00 |
| 61 | 3.561364E-02 | 9.698565E-03 | -3.155949E-03 |
| 62 | -2.009714E-02 | 5.170402E-03 | -7.656675E-04 |

FIG.17

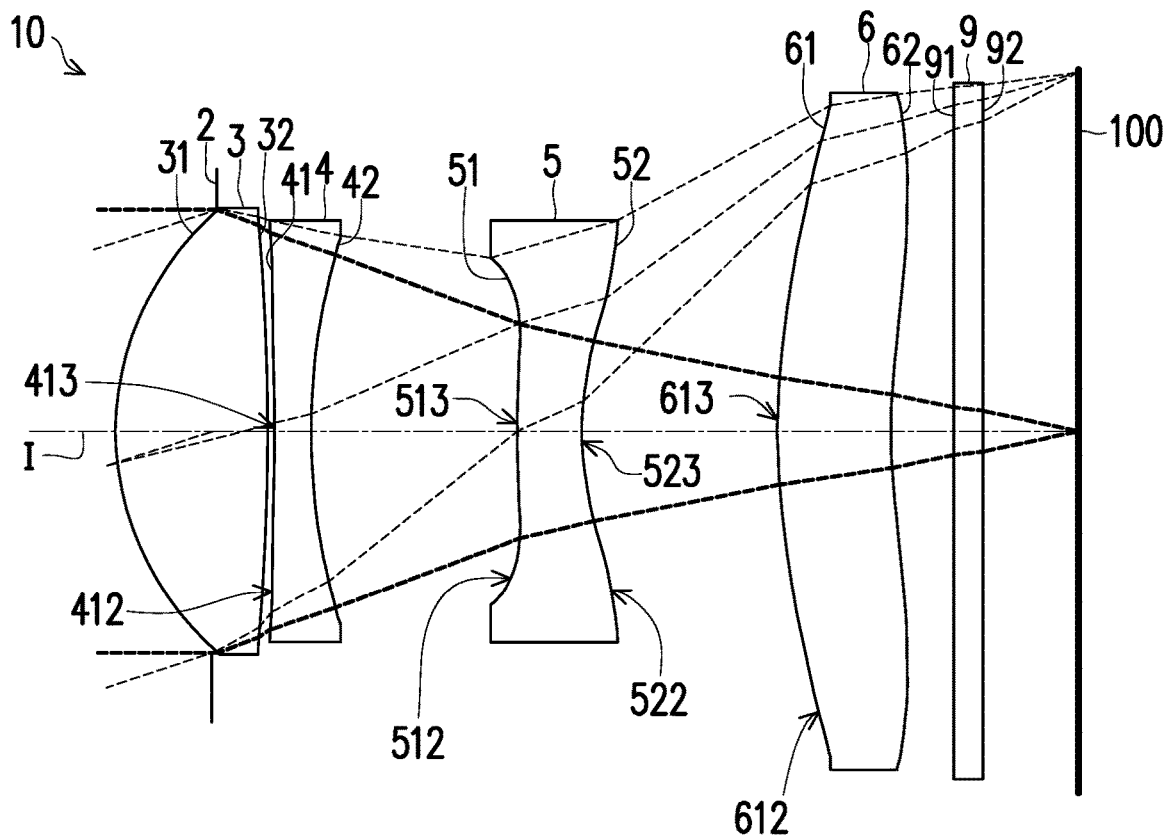
FIG.18
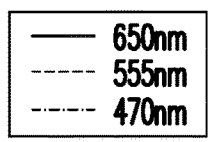
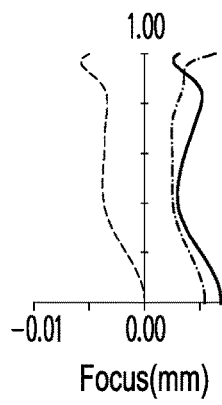
FIG.19A
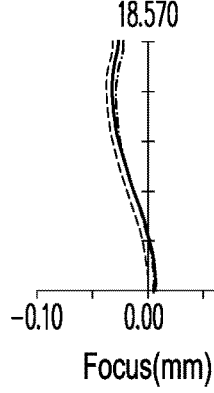
FIG.19B
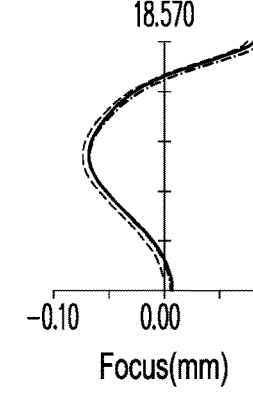
FIG.19C
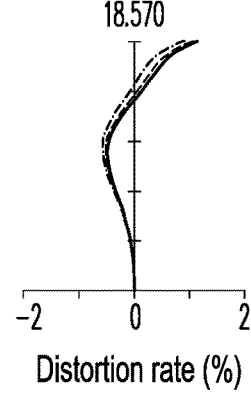
FIG.19D

| Fourth embodiment | | | | | | |
|---|---|---|---|---|---|---|
| EFL=7.069 mm , HFOV=18.570°, Fno=2.394, System length=6.383 mm, Image height=2.400 mm | | | | | | |
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.665 | | | |
| First lens element 3 | Object-side surface 31 | 1.879 | 1.000 | 1.545 | 55.987 | 3.014 |
| | Image-side surface 32 | -10.820 | 0.046 | | | |
| Second lens element 4 | Object-side surface 41 | -15.537 | 0.251 | 1.642 | 22.409 | -5.686 |
| | Image-side surface 42 | 4.854 | 1.358 | | | |
| Third lens element 5 | Object-side surface 51 | 5.482 | 0.437 | 1.535 | 55.690 | -5.821 |
| | Image-side surface 52 | 1.934 | 1.300 | | | |
| Fourth lens element 6 | Object-side surface 61 | 4.259 | 0.757 | 1.642 | 22.409 | 407.430 |
| | Image-side surface 62 | 4.027 | 0.400 | | | |
| Filter 9 | Object-side surface 91 | Infinity | 0.210 | 1.517 | 64.167 | |
| | Image-side surface 92 | Infinity | 0.624 | | | |
| | Image plane 100 | Infinity | 0.000 | | | |

FIG.20

| Surface | K | $a_4$ | $a_6$ |
|---|---|---|---|
| 31 | 0.000000E+00 | -5.670392E-03 | 2.957806E-04 |
| 32 | 0.000000E+00 | 5.170123E-03 | 6.608602E-03 |
| 41 | 0.000000E+00 | 9.576446E-03 | 5.705199E-03 |
| 42 | 0.000000E+00 | 5.724511E-03 | 6.357857E-03 |
| 51 | 0.000000E+00 | -1.029384E-01 | -6.293343E-02 |
| 52 | 0.000000E+00 | -1.046744E-01 | -6.140852E-03 |
| 61 | 0.000000E+00 | -4.592621E-02 | 2.051467E-02 |
| 62 | 0.000000E+00 | -6.965698E-02 | 2.150094E-02 |
| Surface | $a_8$ | $a_{10}$ | $a_{12}$ |
| 31 | -4.031929E-04 | -6.652735E-05 | 0.000000E+00 |
| 32 | -4.997549E-03 | 1.128758E-03 | 0.000000E+00 |
| 41 | -6.801825E-03 | 1.696510E-03 | 0.000000E+00 |
| 42 | -8.486352E-03 | 2.323340E-03 | 0.000000E+00 |
| 51 | 2.088839E-02 | 7.805610E-03 | -1.448777E-02 |
| 52 | 1.340156E-02 | -5.877194E-03 | 9.131406E-04 |
| 61 | -4.859467E-03 | 5.525129E-04 | -2.440274E-05 |
| 62 | -4.012476E-03 | 3.405630E-04 | -9.557235E-06 |

FIG.21

| Fifth embodiment | | | | | | |
|---|---|---|---|---|---|---|
| EFL=7.069 mm , HFOV=18.629°, Fno=2.374, System length=6.399 mm, Image height=2.400 mm | | | | | | |
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.636 | | | |
| First lens element 3 | Object-side surface 31 | 1.921 | 0.793 | 1.545 | 55.987 | 3.792 |
| | Image-side surface 32 | 22.518 | 0.007 | | | |
| Second lens element 4 | Object-side surface 41 | -27.696 | 0.206 | 1.642 | 22.409 | -8.369 |
| | Image-side surface 42 | 6.755 | 3.999 | | | |
| Third lens element 5 | Object-side surface 51 | -4.809 | 0.205 | 1.642 | 22.409 | 21.363 |
| | Image-side surface 52 | -3.628 | 0.009 | | | |
| Fourth lens element 6 | Object-side surface 61 | -2.786 | 0.292 | 1.535 | 55.690 | -5.182 |
| | Image-side surface 62 | 1440.475 | 0.400 | | | |
| Filter 9 | Object-side surface 91 | Infinity | 0.210 | 1.517 | 64.167 | |
| | Image-side surface 92 | Infinity | 0.279 | | | |
| | Image plane 100 | Infinity | 0.000 | | | |

FIG.24

| Surface | K | $a_4$ | $a_6$ |
|---|---|---|---|
| 31 | 0.000000E+00 | -1.676013E-02 | 1.802995E-02 |
| 32 | 0.000000E+00 | 1.959938E-02 | -2.880152E-02 |
| 41 | 0.000000E+00 | 1.053812E-01 | -7.684370E-02 |
| 42 | 0.000000E+00 | 8.687249E-02 | -1.148782E-02 |
| 51 | 0.000000E+00 | -1.539154E-01 | -3.101954E-02 |
| 52 | 0.000000E+00 | -2.235653E-01 | -3.721720E-03 |
| 61 | 0.000000E+00 | -1.265636E-01 | 2.026141E-02 |
| 62 | 0.000000E+00 | -5.117301E-02 | 2.302950E-03 |
| Surface | $a_8$ | $a_{10}$ | $a_{12}$ |
| 31 | -8.495963E-03 | 8.493058E-04 | 0.000000E+00 |
| 32 | 1.752509E-02 | -3.248297E-03 | 0.000000E+00 |
| 41 | 4.111304E-02 | -6.860592E-03 | 0.000000E+00 |
| 42 | 6.182406E-03 | 2.369570E-03 | 0.000000E+00 |
| 51 | 6.689222E-03 | -5.609712E-04 | 0.000000E+00 |
| 52 | -4.593627E-03 | 4.323858E-03 | 0.000000E+00 |
| 61 | -1.625307E-02 | 1.923651E-03 | -9.904654E-04 |
| 62 | -5.565825E-03 | 5.683243E-04 | -9.119538E-05 |

FIG.25

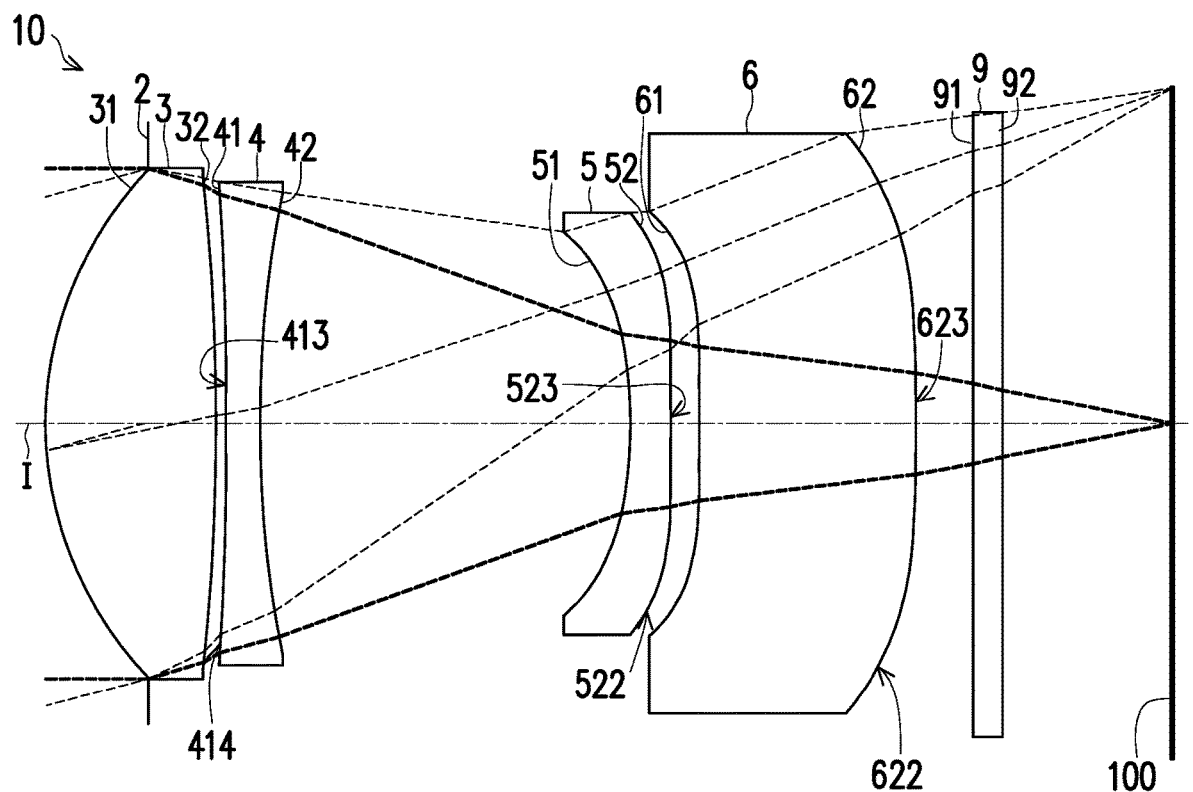
FIG.26
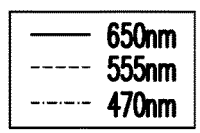
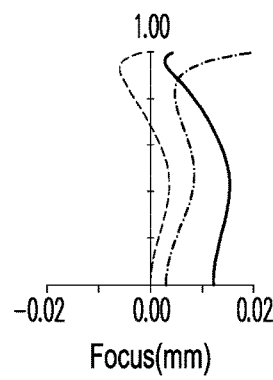
Longitudinal spherical aberration field of view
1.00
FIG.27A
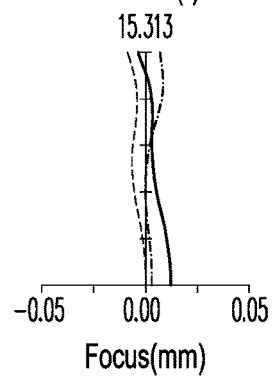
Field curvature (sagittal direction)
HFOV (°)
15.313
FIG.27B
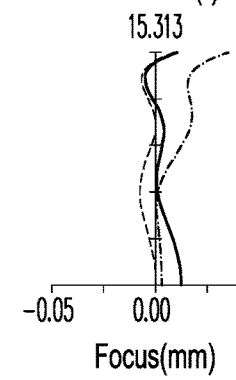
Field curvature (tangential direction)
HFOV (°)
15.313
FIG.27C
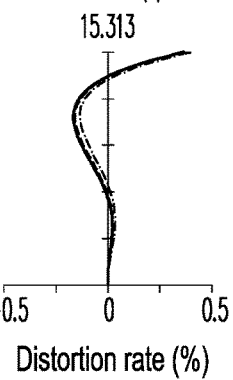
Distortion
HFOV (°)
15.313
FIG.27D

| Sixth embodiment |||||||
|---|---|---|---|---|---|---|
| EFL=8.732 mm , HFOV=15.313°, Fno=2.397, System length=8.000 mm, Image height=2.400 mm |||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.716 | | | |
| First lens element 3 | Object-side surface 31 | 2.544 | 1.213 | 1.545 | 55.987 | 3.978 |
| | Image-side surface 32 | -12.380 | 0.066 | | | |
| Second lens element 4 | Object-side surface 41 | -42.108 | 0.239 | 1.661 | 20.401 | -9.173 |
| | Image-side surface 42 | 7.167 | 2.641 | | | |
| Third lens element 5 | Object-side surface 51 | -3.364 | 0.289 | 1.545 | 55.987 | -6.140 |
| | Image-side surface 52 | 1207.381 | 0.203 | | | |
| Fourth lens element 6 | Object-side surface 61 | -285.790 | 1.546 | 1.661 | 20.401 | 42.277 |
| | Image-side surface 62 | -25.699 | 0.400 | | | |
| Filter 9 | Object-side surface 91 | Infinity | 0.210 | 1.517 | 64.167 | |
| | Image-side surface 92 | Infinity | 1.194 | | | |
| | Image plane 100 | Infinity | 0.000 | | | |

FIG.28

| Surface | K | $a_4$ | $a_6$ | $a_8$ | $a_{10}$ |
|---|---|---|---|---|---|
| 31 | 0.000000E+00 | -2.221639E-03 | -2.700842E-04 | -8.659691E-06 | 0.000000E+00 |
| 32 | 0.000000E+00 | 2.477821E-03 | 5.423012E-04 | -1.698333E-04 | 0.000000E+00 |
| 41 | 0.000000E+00 | -3.853283E-04 | 3.878300E-06 | -2.022601E-04 | 0.000000E+00 |
| 42 | 0.000000E+00 | -1.021070E-03 | -1.132760E-03 | 1.725476E-05 | 0.000000E+00 |
| 51 | 0.000000E+00 | -2.237051E-02 | -1.852831E-02 | 3.934323E-04 | 0.000000E+00 |
| 52 | 0.000000E+00 | -3.489493E-02 | -1.918748E-02 | 4.108611E-03 | 0.000000E+00 |
| 61 | 0.000000E+00 | -4.980183E-02 | -1.174967E-02 | 3.102709E-03 | -5.785030E-04 |
| 62 | -1.069201E+03 | -3.261437E-02 | 2.654907E-03 | -2.248099E-04 | 2.357767E-06 |

FIG.29

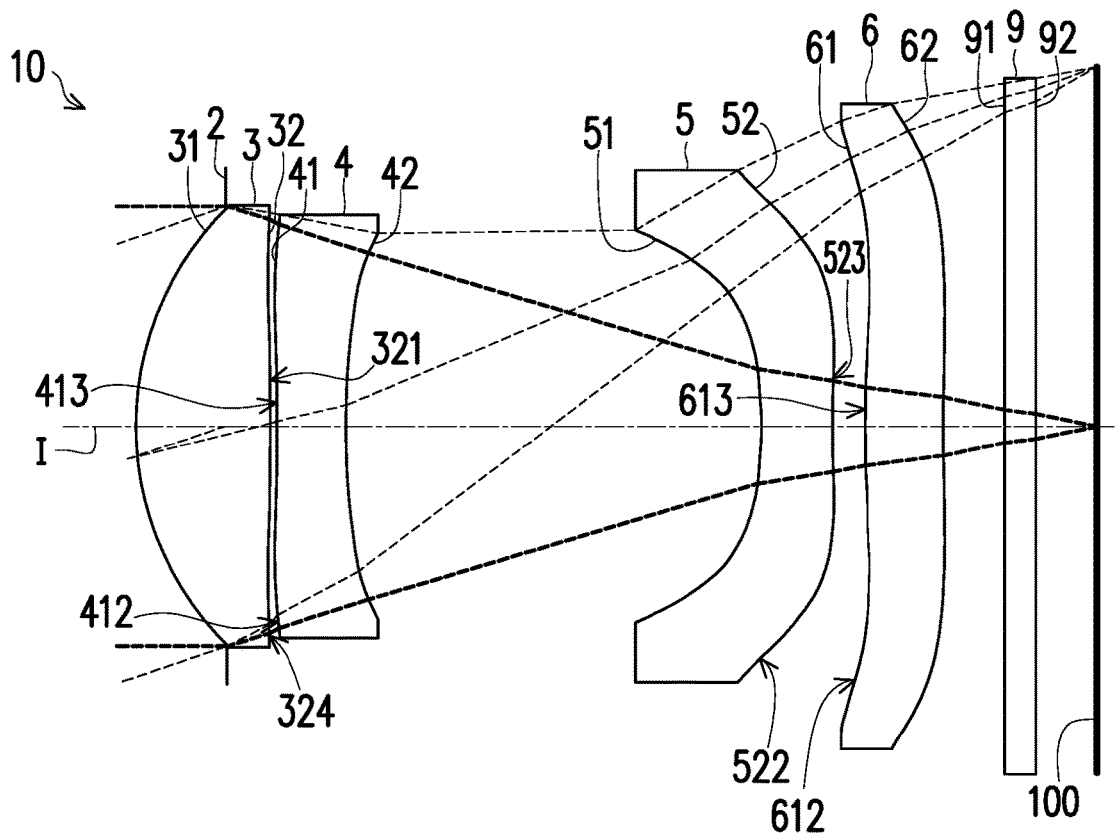
FIG.30
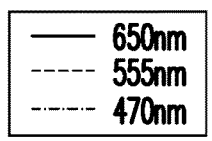
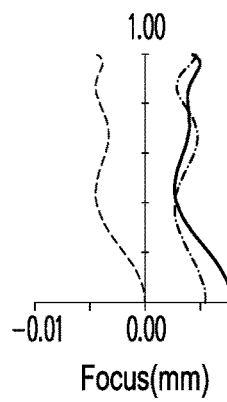
Longitudinal spherical
aberration field of view
1.00
-0.01  0.00  0.01
Focus(mm)
FIG.31A
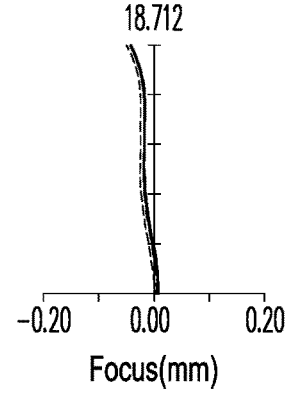
Field curvature
(sagittal direction)
HFOV (°)
18.712
-0.20  0.00  0.20
Focus(mm)
FIG.31B
Field curvature
(tangential direction)
HFOV (°)
18.712
-0.20  0.00  0.20
Focus(mm)
FIG.31C
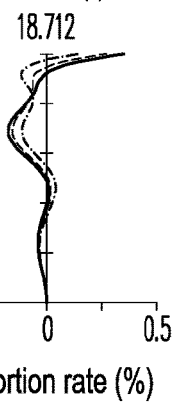
Distortion
HFOV (°)
18.712
-0.5  0  0.5
Distortion rate (%)
FIG.31D

| Seventh embodiment | | | | | | |
|---|---|---|---|---|---|---|
| EFL=7.066 mm , HFOV=18.712°, Fno=2.383, System length=6.386 mm, Image height=2.400 mm | | | | | | |
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.594 | | | |
| First lens element 3 | Object-side surface 31 | 2.068 | 0.892 | 1.545 | 55.987 | 3.432 |
| | Image-side surface 32 | -17.002 | 0.039 | | | |
| Second lens element 4 | Object-side surface 41 | -18.570 | 0.466 | 1.661 | 20.401 | -7.327 |
| | Image-side surface 42 | 6.690 | 2.772 | | | |
| Third lens element 5 | Object-side surface 51 | -3.313 | 0.477 | 1.545 | 55.987 | -4.389 |
| | Image-side surface 52 | 9.118 | 0.217 | | | |
| Fourth lens element 6 | Object-side surface 61 | 9.538 | 0.525 | 1.661 | 20.401 | 20.005 |
| | Image-side surface 62 | 32.786 | 0.400 | | | |
| Filter 9 | Object-side surface 91 | Infinity | 0.210 | 1.517 | 64.167 | |
| | Image-side surface 92 | Infinity | 0.388 | | | |
| | Image plane 100 | Infinity | 0.000 | | | |

FIG.32

| Surface | K | $a_4$ | $a_6$ | $a_8$ | $a_{10}$ |
|---|---|---|---|---|---|
| 31 | 0.000000E+00 | 1.698544E-03 | -2.032321E-03 | 1.684888E-04 | 0.000000E+00 |
| 32 | 0.000000E+00 | 1.329699E-02 | -1.948380E-04 | -2.476399E-04 | 0.000000E+00 |
| 41 | 0.000000E+00 | 1.680765E-02 | 2.552835E-03 | -7.961407E-04 | 0.000000E+00 |
| 42 | 0.000000E+00 | 2.351868E-02 | -7.121119E-04 | 2.407384E-03 | 0.000000E+00 |
| 51 | 0.000000E+00 | -1.087926E-01 | -7.003781E-02 | 1.350811E-02 | 0.000000E+00 |
| 52 | 0.000000E+00 | -1.129577E-01 | -1.385550E-02 | 7.111434E-03 | 0.000000E+00 |
| 61 | 1.565520E+01 | -2.827740E-02 | -2.577668E-03 | 6.117195E-04 | 3.071515E-05 |
| 62 | 2.081467E+02 | -2.142486E-02 | 6.189671E-03 | -2.702558E-03 | 2.989930E-04 |

FIG.33

| Eighth embodiment |||||||
|---|---|---|---|---|---|---|
| EFL=3.075 mm , HFOV=17.174°, Fno=2.374, System length=2.819 mm, Image height=0.960 mm |||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.286 | | | |
| First lens element 3 | Object-side surface 31 | 0.799 | 0.524 | 1.545 | 55.987 | 1.309 |
| | Image-side surface 32 | -5.200 | 0.050 | | | |
| Second lens element 4 | Object-side surface 41 | -3.274 | 0.198 | 1.642 | 22.409 | -2.250 |
| | Image-side surface 42 | 2.686 | 0.435 | | | |
| Third lens element 5 | Object-side surface 51 | -2.408 | 0.239 | 1.535 | 55.690 | -4.037 |
| | Image-side surface 52 | 22.322 | 0.197 | | | |
| Fourth lens element 6 | Object-side surface 61 | 78.242 | 0.266 | 1.642 | 22.409 | -10.485 |
| | Image-side surface 62 | 6.237 | 0.200 | | | |
| Filter 9 | Object-side surface 91 | Infinity | 0.210 | 1.517 | 64.167 | |
| | Image-side surface 92 | Infinity | 0.501 | | | |
| Image plane 100 | | Infinity | 0.000 | | | |

FIG.36

| Surface | K | $a_4$ | $a_6$ |
|---|---|---|---|
| 31 | 0.000000E+00 | -1.774075E-01 | 3.981134E-01 |
| 32 | 0.000000E+00 | -2.134608E-01 | 3.338898E+00 |
| 41 | 0.000000E+00 | 3.908599E-01 | 2.218595E+00 |
| 42 | 0.000000E+00 | 6.392956E-01 | 1.807825E+00 |
| 51 | 0.000000E+00 | 7.226924E-01 | -7.686553E+00 |
| 52 | 0.000000E+00 | 4.479666E-03 | 2.976922E+00 |
| 61 | 0.000000E+00 | -1.939612E+00 | 6.014236E-01 |
| 62 | 0.000000E+00 | -1.707780E+00 | 3.146956E+00 |
| Surface | $a_8$ | $a_{10}$ | $a_{12}$ |
| 31 | -1.019263E+00 | 7.336341E-01 | 0.000000E+00 |
| 32 | -1.091344E+01 | 1.164512E+01 | 0.000000E+00 |
| 41 | -1.346195E+01 | 1.735612E+01 | 0.000000E+00 |
| 42 | -2.010530E+01 | 3.219820E+01 | 0.000000E+00 |
| 51 | 2.630344E+01 | -1.162795E+02 | 0.000000E+00 |
| 52 | -2.410534E+01 | 3.172738E+01 | 0.000000E+00 |
| 61 | 2.063285E+01 | -1.204179E+02 | 1.789708E+02 |
| 62 | -5.434138E+00 | 1.646622E+00 | 4.447064E+00 |

FIG.37

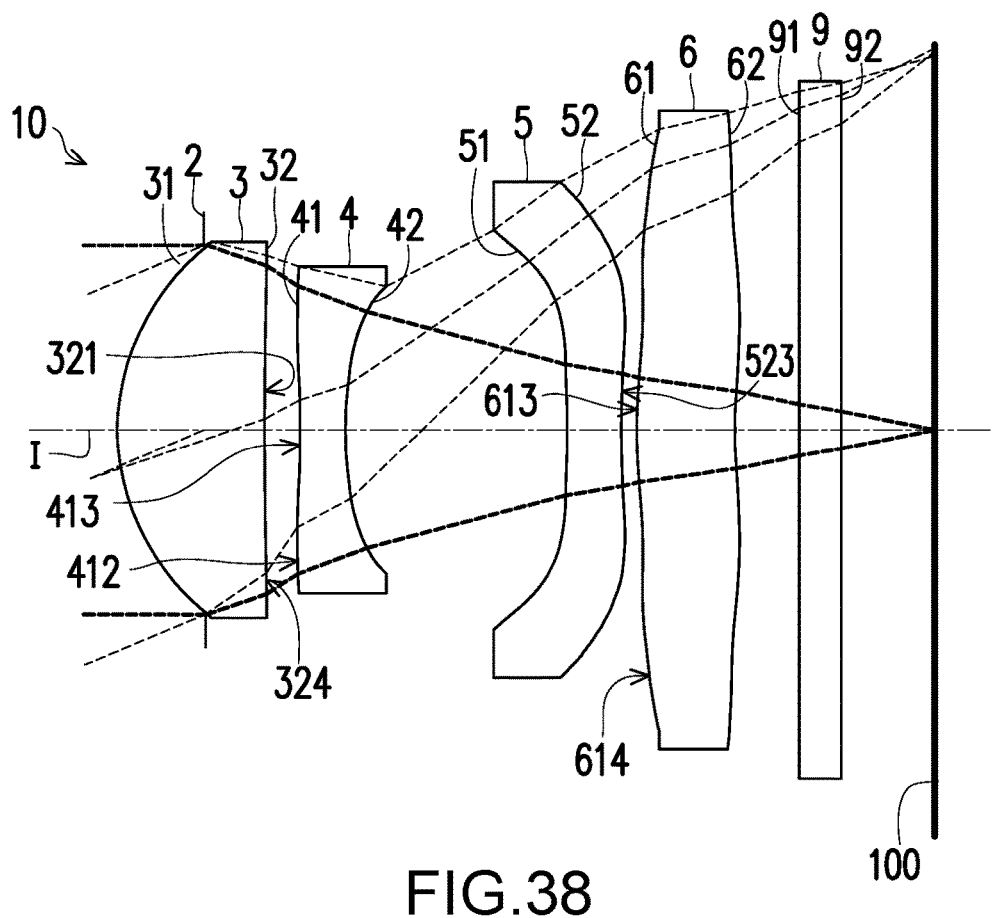
FIG.38
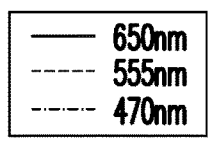
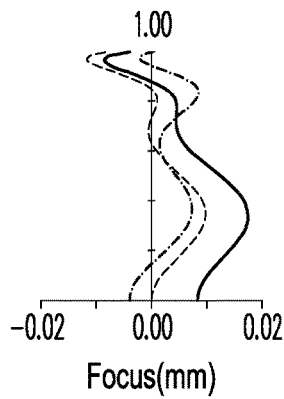
Longitudinal spherical
aberration field of view
1.00
-0.02  0.00  0.02
Focus(mm)
FIG.39A
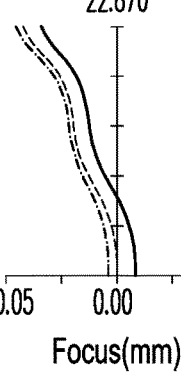
Field curvature
(sagittal direction)
HFOV (°)
22.870
-0.05  0.00  0.05
Focus(mm)
FIG.39B
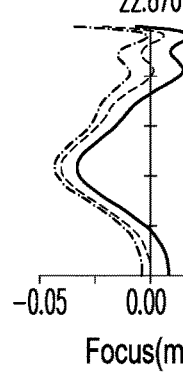
Field curvature
(tangential direction)
HFOV (°)
22.870
-0.05  0.00  0.05
Focus(mm)
FIG.39C
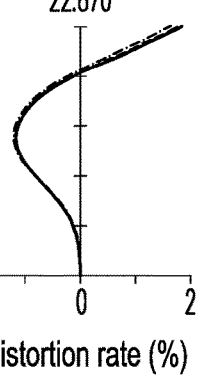
Distortion
HFOV (°)
22.870
-2  0  2
Distortion rate (%)
FIG.39D

| Ninth embodiment | | | | | | |
|---|---|---|---|---|---|---|
| EFL=4.382 mm , HFOV=23.204°, Fno=2.381, System length=4.015 mm, Image height=1.881 mm | | | | | | |
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.442 | | | |
| First lens element 3 | Object-side surface 31 | 1.119 | 0.721 | 1.545 | 55.987 | 2.034 |
| | Image-side surface 32 | -120.686 | 0.173 | | | |
| Second lens element 4 | Object-side surface 41 | -5.064 | 0.226 | 1.642 | 22.409 | -2.832 |
| | Image-side surface 42 | 2.924 | 1.091 | | | |
| Third lens element 5 | Object-side surface 51 | -8.077 | 0.267 | 1.535 | 55.690 | -5.747 |
| | Image-side surface 52 | 5.046 | 0.076 | | | |
| Fourth lens element 6 | Object-side surface 61 | 2.969 | 0.480 | 1.642 | 22.409 | 41.746 |
| | Image-side surface 62 | 3.123 | 0.314 | | | |
| Filter 9 | Object-side surface 91 | Infinity | 0.210 | 1.517 | 64.167 | |
| | Image-side surface 92 | Infinity | 0.457 | | | |
| | Image plane 100 | Infinity | 0.000 | | | |

FIG.40

| Surface | K | $a_4$ | $a_6$ |
|---|---|---|---|
| 31 | 0.000000E+00 | -3.460332E-02 | 5.982103E-02 |
| 32 | 0.000000E+00 | 3.651903E-02 | -9.193033E-02 |
| 41 | 0.000000E+00 | 2.633821E-01 | -5.220550E-01 |
| 42 | 0.000000E+00 | 2.846473E-01 | 3.323493E-01 |
| 51 | 0.000000E+00 | 3.027557E-02 | -7.587117E-01 |
| 52 | 0.000000E+00 | -3.796532E-02 | -5.012398E-01 |
| 61 | 0.000000E+00 | -4.107108E-01 | 4.585352E-01 |
| 62 | 0.000000E+00 | -4.039030E-01 | 3.672691E-01 |
| Surface | $a_8$ | $a_{10}$ | $a_{12}$ |
| 31 | -8.770671E-02 | 2.582138E-02 | 0.000000E+00 |
| 32 | 1.523238E-01 | -7.264144E-02 | 0.000000E+00 |
| 41 | 9.440052E-01 | -6.630314E-01 | 0.000000E+00 |
| 42 | -8.916470E-01 | 1.876010E+00 | 0.000000E+00 |
| 51 | 2.855158E-01 | 1.123971E-01 | 0.000000E+00 |
| 52 | 4.266595E-01 | -1.116735E-01 | 0.000000E+00 |
| 61 | -2.437783E-01 | 6.541384E-02 | -7.192548E-03 |
| 62 | -1.703886E-01 | 4.111186E-02 | -4.155250E-03 |

FIG.41

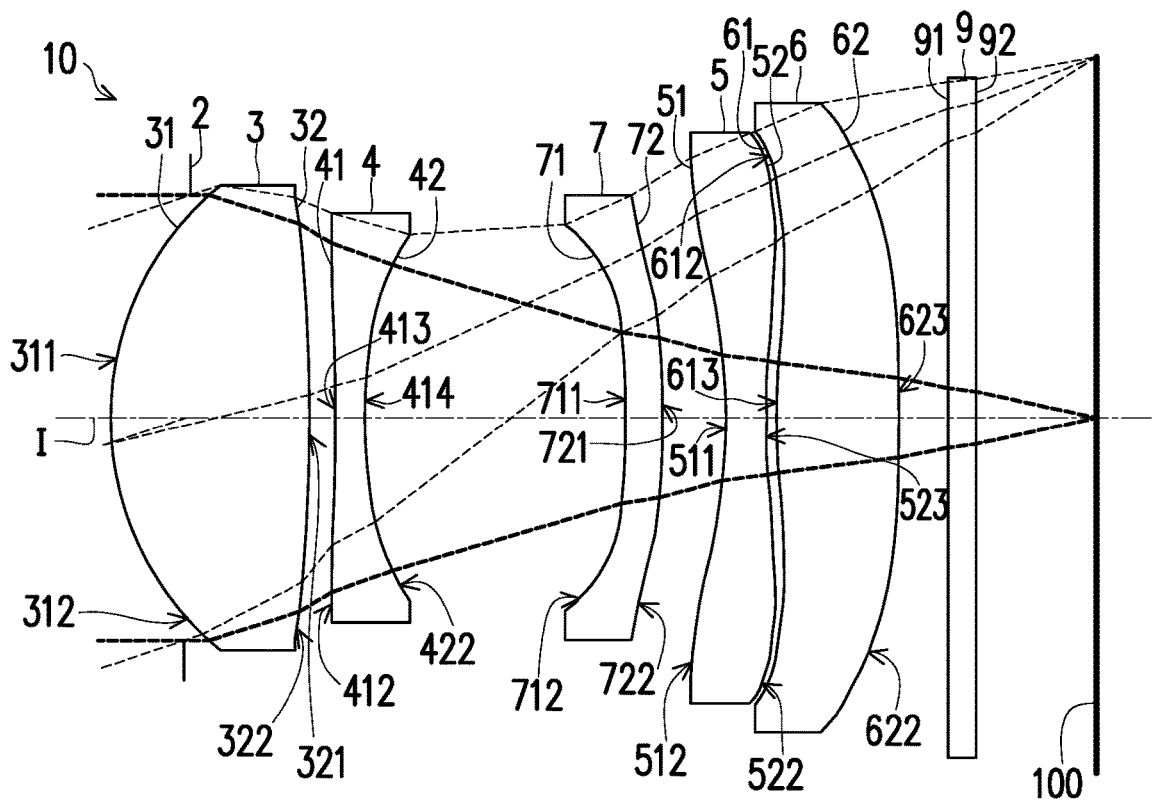
FIG.42
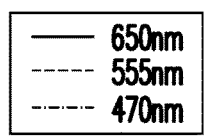
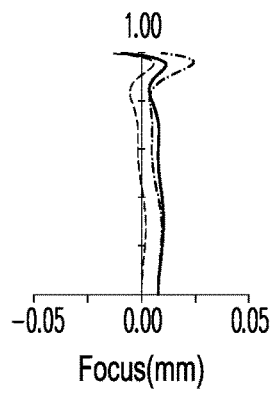
FIG.43A
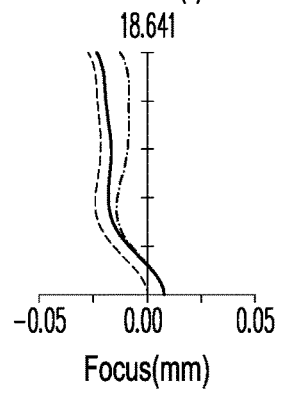
FIG.43B
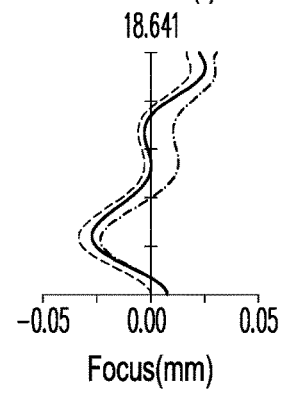
FIG.43C
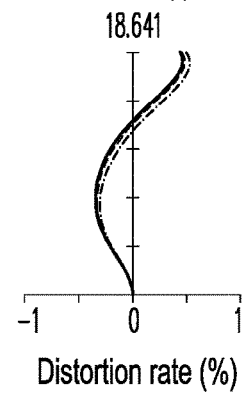
FIG.43D

| Tenth embodiment ||||||
|---|---|---|---|---|---|
| EFL= 8.688 mm , HFOV= 18.640°, Fno=2.389, System length= 8.000 mm, Image height=2.944 mm ||||||
| Lens element | Surface | Radius of curvature(mm) | Thickness(mm) | Refractive index | Dispersion coefficient | Focal length(mm) |
| Object |  | Infinity | 1.0000E+10 |  |  |  |
| Aperture stop 2 |  | Infinity | -0.635 |  |  |  |
| First lens element 3 | Object-side surface 31 | 2.385 | 1.613 | 1.545 | 55.987 | 3.656 |
|  | Image-side surface 32 | -9.355 | 0.202 |  |  |  |
| Second lens element 4 | Object-side surface 41 | -13.990 | 0.239 | 1.642 | 22.409 | -5.087 |
|  | Image-side surface 42 | 4.336 | 2.122 |  |  |  |
| Fifth lens element 7 | Object-side surface 71 | -17.075 | 0.299 | 1.535 | 55.690 | 156.998 |
|  | Image-side surface 72 | -14.284 | 0.520 |  |  |  |
| Third lens element 5 | Object-side surface 51 | -4.294 | 0.330 | 1.545 | 55.987 | -4.661 |
|  | Image-side surface 52 | 6.427 | 0.085 |  |  |  |
| Fourth lens element 6 | Object-side surface 61 | 6.006 | 0.994 | 1.642 | 22.409 | 8.107 |
|  | Image-side surface 62 | -38.895 | 0.400 |  |  |  |
| Filter 9 | Object-side surface 91 | Infinity | 0.210 | 1.517 | 64.167 |  |
|  | Image-side surface 92 | Infinity | 0.985 |  |  |  |
|  | Image plane 100 | Infinity | 0.000 |  |  |  |

FIG.44

| Surface | K | $a_4$ | $a_6$ | $a_8$ |
|---|---|---|---|---|
| 31 | -2.767009E-02 | -1.232390E-03 | 6.962089E-05 | -1.875748E-04 |
| 32 | -4.308860E+00 | 1.222169E-02 | -1.993531E-03 | 9.868277E-05 |
| 41 | 1.020546E+00 | 1.150911E-02 | 7.366872E-04 | -1.272555E-03 |
| 42 | 1.755571E+00 | 4.960784E-03 | 2.391883E-03 | 2.403463E-04 |
| 71 | -1.591281E+03 | -9.018352E-02 | 1.579316E-02 | -4.846467E-03 |
| 72 | -1.783198E+02 | -5.954447E-02 | 1.372830E-02 | 2.213712E-03 |
| 51 | 3.598837E-01 | 5.126695E-03 | 3.486398E-03 | -1.870735E-04 |
| 52 | -8.615952E+00 | -1.999411E-02 | 4.371834E-04 | 2.554582E-04 |
| 61 | -2.899444E+00 | -4.051849E-02 | 7.076275E-03 | -5.758345E-04 |
| 62 | -1.421595E+03 | -2.653424E-02 | 3.540367E-03 | -2.449560E-04 |
| Surface | $a_{10}$ | $a_{12}$ | $a_{14}$ | $a_{16}$ |
| 31 | 3.618924E-05 | -1.810261E-06 | 8.948359E-07 | -1.095347E-06 |
| 32 | -1.143714E-04 | 6.136146E-06 | -2.614351E-06 | 1.078828E-06 |
| 41 | 1.052460E-04 | 2.915169E-05 | 1.594300E-05 | -2.023836E-06 |
| 42 | 9.779468E-05 | -2.818183E-06 | -3.396652E-05 | 4.639175E-05 |
| 71 | 7.643237E-04 | -5.059999E-04 | 2.423808E-04 | -5.764497E-05 |
| 72 | -1.082831E-03 | 1.194603E-04 | -7.581137E-06 | 8.781645E-07 |
| 51 | -4.038723E-05 | 8.802283E-07 | 1.138197E-07 | 7.153744E-09 |
| 52 | -2.230134E-05 | -6.438328E-07 | -3.469654E-07 | -4.330001E-08 |
| 61 | -9.753271E-07 | 1.516238E-06 | -4.765695E-08 | -8.738226E-08 |
| 62 | 1.744464E-06 | 2.045288E-07 | -4.996815E-08 | -1.979166E-09 |

FIG.45

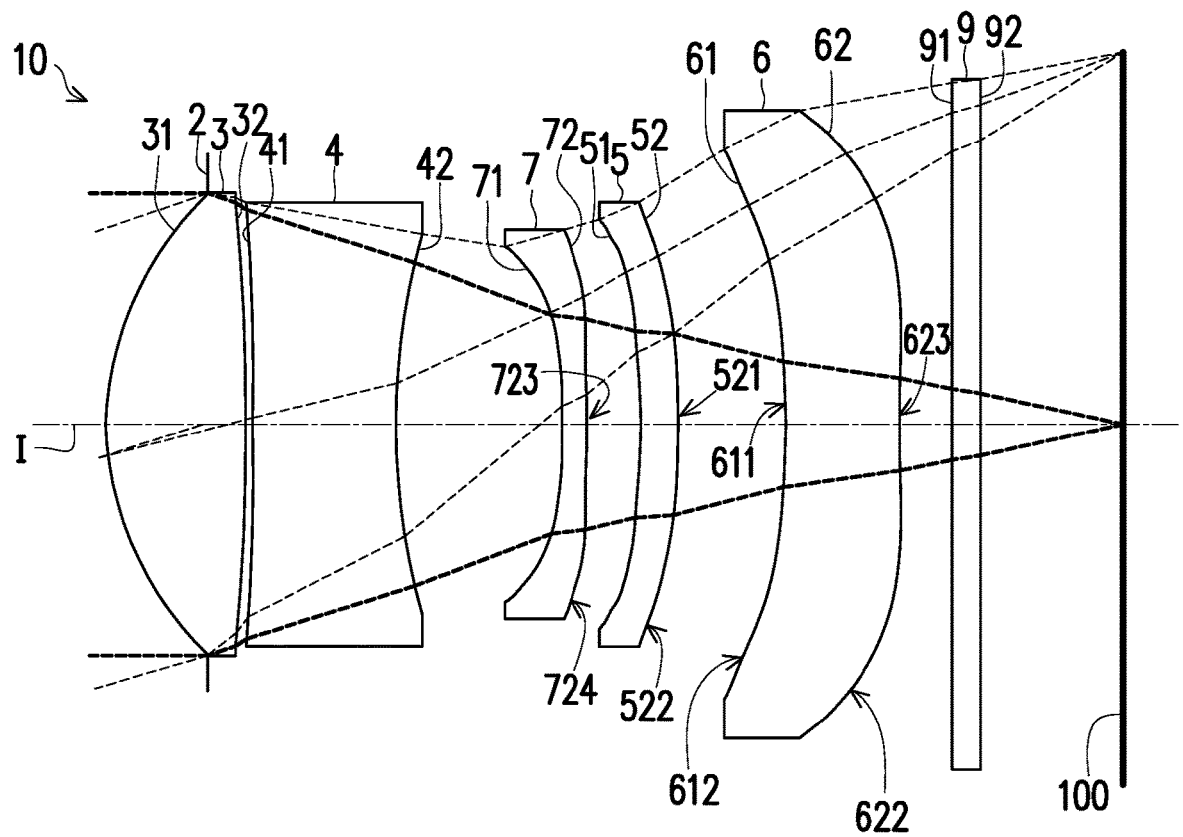
FIG.46
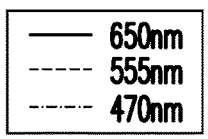
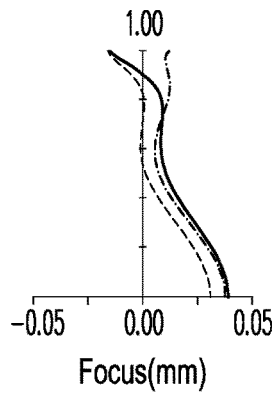
Longitudinal spherical
aberration field of view
1.00
-0.05  0.00  0.05
Focus(mm)
FIG.47A
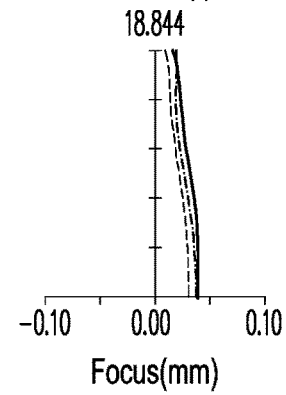
Field curvature
(sagittal direction)
HFOV (°)
18.844
-0.10  0.00  0.10
Focus(mm)
FIG.47B
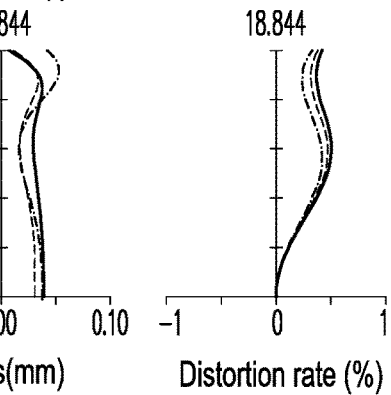
Field curvature
(tangential direction)
HFOV (°)
18.844
-0.10  0.00  0.10
Focus(mm)
FIG.47C
Distortion
HFOV (°)
18.844
-1  0  1
Distortion rate (%)
FIG.47D

| Eleventh embodiment ||||||
|---|---|---|---|---|---|
| EFL= 8.643 mm , HFOV= 18.844°, Fno=2.378, System length= 8.000 mm, Image height=2.944 mm ||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.786 | 0.000 | 0.000 | 0.000 |
| First lens element 3 | Object-side surface 31 | 2.395 | 1.095 | 1.545 | 55.987 | 3.834 |
| | Image-side surface 32 | -13.991 | 0.050 | 0.000 | 0.000 | 0.000 |
| Second lens element 4 | Object-side surface 41 | -28.012 | 1.132 | 1.642 | 22.409 | -6.536 |
| | Image-side surface 42 | 5.063 | 1.302 | 0.000 | 0.000 | 0.000 |
| Fifth lens element 7 | Object-side surface 71 | -5.023 | 0.194 | 1.545 | 55.987 | -13.672 |
| | Image-side surface 72 | -15.545 | 0.424 | 0.000 | 0.000 | 0.000 |
| Third lens element 5 | Object-side surface 51 | -5.951 | 0.313 | 1.642 | 22.409 | 54.526 |
| | Image-side surface 52 | -5.197 | 0.827 | 0.000 | 0.000 | 0.000 |
| Fourth lens element 6 | Object-side surface 61 | -15.101 | 0.917 | 1.545 | 55.987 | -20.639 |
| | Image-side surface 62 | 45.446 | 0.400 | 0.000 | 0.000 | 0.000 |
| Filter 9 | Object-side surface 91 | Infinity | 0.210 | 1.517 | 64.167 | |
| | Image-side surface 92 | Infinity | 1.136 | 0.000 | 0.000 | 0.000 |
| | Image plane 100 | Infinity | 0.000 | 0.000 | 0.000 | 0.000 |

FIG.48

| Surface | K | $a_4$ | $a_6$ | $a_8$ | $a_{10}$ |
|---|---|---|---|---|---|
| 31 | 0.000000E+00 | -1.237170E-03 | -2.334287E-04 | 8.855300E-06 | 0.000000E+00 |
| 32 | 0.000000E+00 | 4.760379E-03 | -8.772238E-04 | 6.079949E-05 | 0.000000E+00 |
| 41 | 0.000000E+00 | 2.349450E-03 | -1.185563E-03 | 8.320765E-05 | 0.000000E+00 |
| 42 | 0.000000E+00 | -6.595676E-04 | -1.328283E-03 | -3.679771E-04 | 0.000000E+00 |
| 71 | 0.000000E+00 | -9.869258E-04 | -5.359936E-02 | 8.648524E-03 | 0.000000E+00 |
| 72 | 0.000000E+00 | 4.424624E-02 | -5.678748E-02 | 1.243185E-02 | 0.000000E+00 |
| 51 | 0.000000E+00 | 3.017275E-02 | -2.291436E-02 | 1.847603E-03 | 0.000000E+00 |
| 52 | 0.000000E+00 | 1.036435E-02 | -1.358302E-02 | 3.041653E-03 | 0.000000E+00 |
| 61 | 0.000000E+00 | -2.610891E-02 | -7.573667E-04 | 1.042633E-03 | -7.905977E-05 |
| 62 | 0.000000E+00 | -2.770913E-02 | 1.392929E-03 | -8.486384E-05 | -5.184790E-06 |

FIG.49

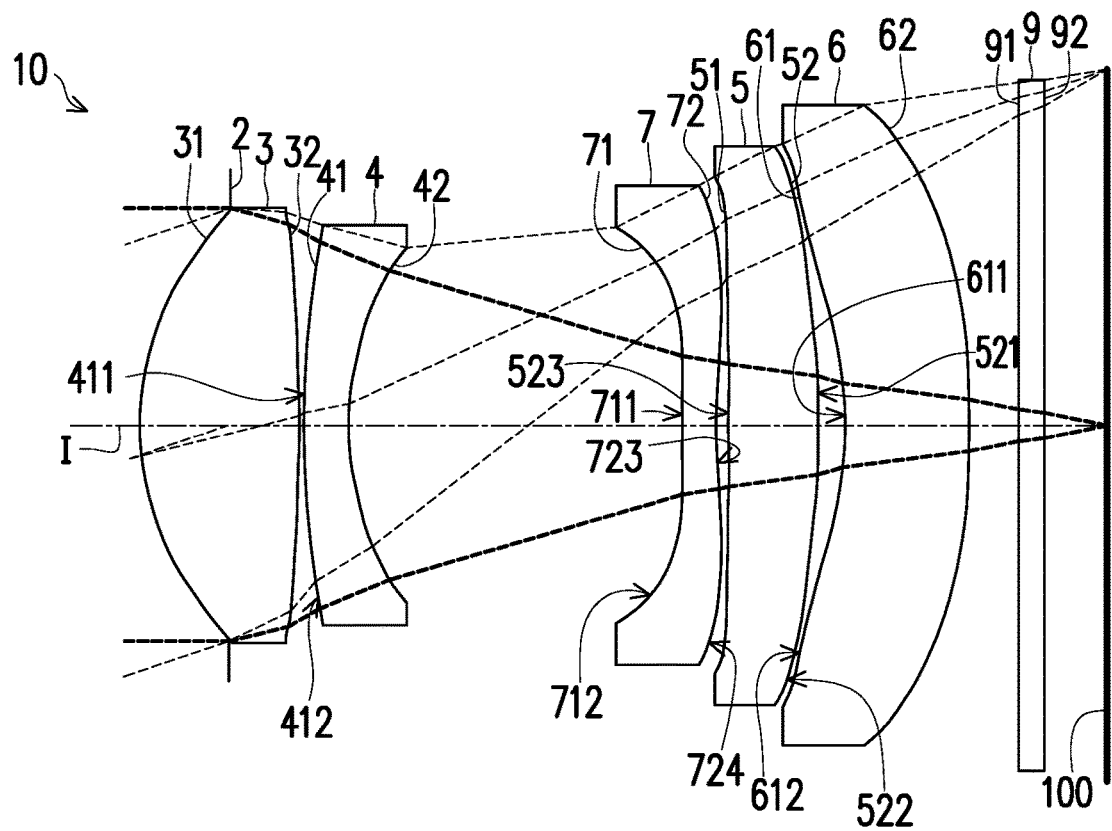
FIG.50
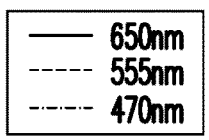
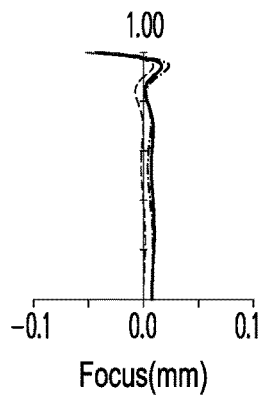
Longitudinal spherical aberration field of view
1.00
FIG.51A
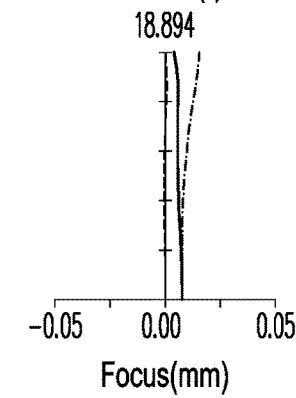
Field curvature (sagittal direction)
HFOV (°)
18.894
FIG.51B
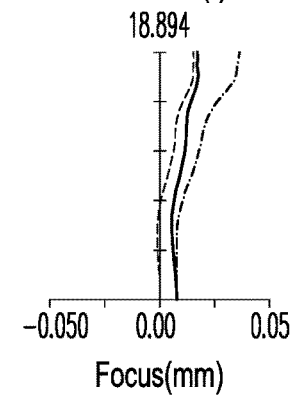
Field curvature (tangential direction)
HFOV (°)
18.894
FIG.51C
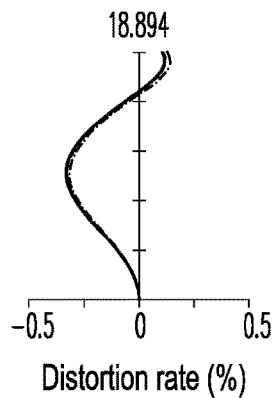
Distortion
HFOV (°)
18.894
FIG.51D

| Twelfth embodiment ||||||
|---|---|---|---|---|---|
| EFL= 8.592 mm , HFOV= 18.894°, Fno=2.374, System length= 7.963 mm, Image height=2.374 mm ||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.732 | | | |
| First lens element 3 | Object-side surface 31 | 2.414 | 1.307 | 1.545 | 55.987 | 3.777 |
| | Image-side surface 32 | -11.471 | 0.044 | | | |
| Second lens element 4 | Object-side surface 41 | 6.390 | 0.363 | 1.642 | 22.409 | -5.871 |
| | Image-side surface 42 | 2.330 | 2.753 | | | |
| Fifth lens element 7 | Object-side surface 71 | 31.324 | 0.284 | 1.545 | 55.987 | -14.723 |
| | Image-side surface 72 | 6.379 | 0.099 | | | |
| Third lens element 5 | Object-side surface 51 | -40.752 | 0.741 | 1.661 | 20.401 | 13.395 |
| | Image-side surface 52 | -7.375 | 0.218 | | | |
| Fourth lens element 6 | Object-side surface 61 | -3.329 | 1.026 | 1.535 | 55.690 | -9.679 |
| | Image-side surface 62 | -10.272 | 0.400 | | | |
| Filter 9 | Object-side surface 91 | Infinity | 0.210 | 1.517 | 64.167 | |
| | Image-side surface 92 | Infinity | 0.518 | | | |
| | Image plane 100 | Infinity | 0.000 | | | |

FIG.52

| Surface | K | $a_4$ | $a_6$ | $a_8$ |
|---|---|---|---|---|
| 31 | 9.208992E-03 | -1.202502E-03 | 4.585981E-04 | -3.634307E-04 |
| 32 | -6.534460E+01 | 6.784965E-03 | -2.269545E-03 | -1.069640E-04 |
| 41 | -4.538579E+01 | -8.230633E-03 | 2.887886E-03 | 6.901180E-04 |
| 42 | -5.170464E+00 | 6.589198E-03 | 9.372395E-03 | -2.549131E-03 |
| 71 | 3.318864E+02 | -7.451985E-02 | -1.043706E-03 | 1.029094E-03 |
| 72 | 7.511568E+00 | -5.673315E-02 | 9.300628E-03 | -2.027921E-04 |
| 51 | 3.161808E+02 | 5.298725E-03 | -3.428276E-04 | -3.241139E-04 |
| 52 | -2.499541E+01 | 4.698033E-04 | -1.105272E-03 | 3.157884E-04 |
| 61 | -7.153630E-01 | 2.103881E-03 | 5.576898E-03 | -3.855101E-04 |
| 62 | 5.720395E+00 | -2.130257E-02 | 4.830304E-03 | -8.324338E-04 |
| Surface | $a_{10}$ | $a_{12}$ | $a_{14}$ | $a_{16}$ |
| 31 | -5.072307E-05 | 1.429351E-05 | 1.315797E-05 | -5.124143E-06 |
| 32 | 2.276014E-04 | -2.901559E-05 | -2.845114E-05 | 5.101950E-06 |
| 41 | -2.395002E-04 | -3.703202E-05 | 3.968271E-06 | 4.432635E-06 |
| 42 | 1.245221E-03 | 2.668362E-04 | -3.639180E-04 | 1.005402E-04 |
| 71 | -1.157194E-03 | 3.562057E-04 | -1.158495E-04 | 1.131375E-05 |
| 72 | -4.136745E-04 | 6.529129E-05 | -5.396527E-06 | -1.745936E-07 |
| 51 | -5.313561E-05 | 1.438038E-05 | 4.387694E-06 | -1.316646E-06 |
| 52 | -1.403011E-05 | -7.085826E-06 | -8.762660E-07 | 1.878611E-07 |
| 61 | -8.986627E-05 | 5.121354E-07 | 7.353858E-07 | 2.275571E-08 |
| 62 | 8.465876E-05 | -2.875204E-06 | -2.429028E-07 | 5.136018E-09 |

FIG.53

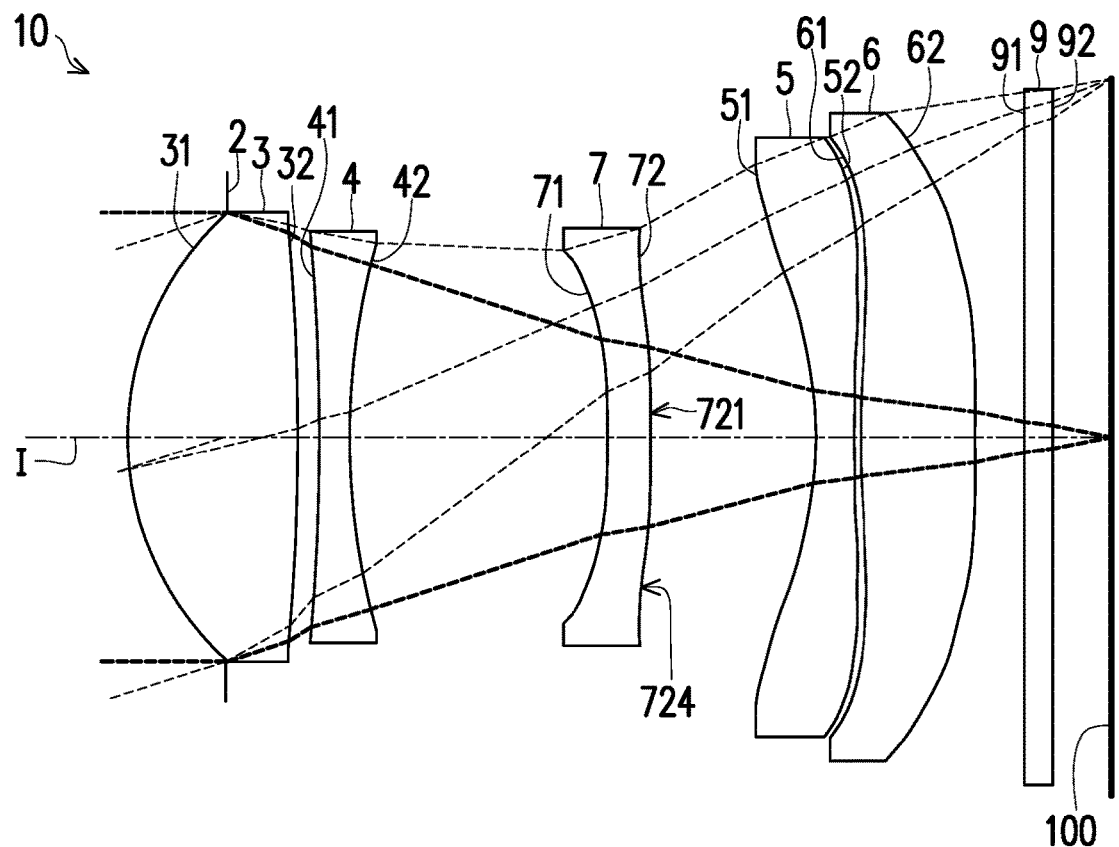
FIG.54
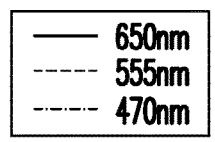
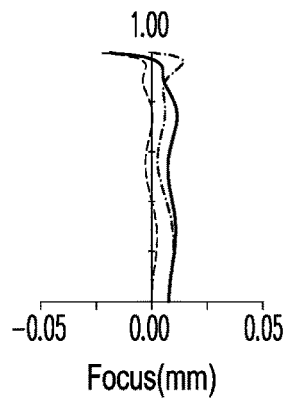
Longitudinal spherical aberration field of view
1.00
-0.05  0.00  0.05
Focus(mm)
FIG.55A
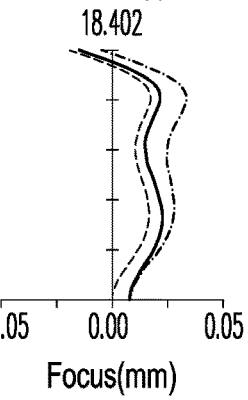
Field curvature (sagittal direction)
HFOV (°)
18.402
-0.05  0.00  0.05
Focus(mm)
FIG.55B
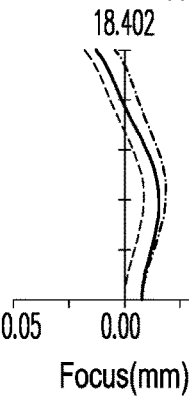
Field curvature (tangential direction)
HFOV (°)
18.402
-0.05  0.00  0.05
Focus(mm)
FIG.55C
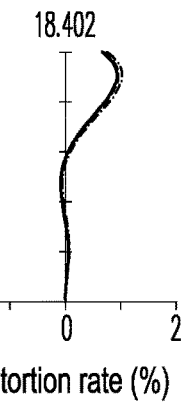
Distortion
HFOV (°)
18.402
-2  0  2
Distortion rate (%)
FIG.55D

| Thirteenth embodiment |||||||
|---|---|---|---|---|---|---|
| EFL= 8.788 mm , HFOV= 18.402°, Fno=2.394, System length= 8.000 mm, Image height=2.944 mm |||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.786 | | | |
| First lens element 3 | Object-side surface 31 | 2.492 | 1.364 | 1.545 | 55.987 | 3.789 |
| | Image-side surface 32 | -9.860 | 0.187 | | | |
| Second lens element 4 | Object-side surface 41 | -8.192 | 0.236 | 1.642 | 22.409 | -6.288 |
| | Image-side surface 42 | 8.183 | 2.103 | | | |
| Fifth lens element 7 | Object-side surface 71 | -11.598 | 0.352 | 1.535 | 55.690 | -48.571 |
| | Image-side surface 72 | -21.118 | 1.348 | | | |
| Third lens element 5 | Object-side surface 51 | -3.194 | 0.317 | 1.545 | 55.987 | -4.783 |
| | Image-side surface 52 | 14.880 | 0.049 | | | |
| Fourth lens element 6 | Object-side surface 61 | 7.189 | 0.934 | 1.642 | 22.409 | 8.934 |
| | Image-side surface 62 | -28.068 | 0.400 | | | |
| Filter 9 | Object-side surface 91 | Infinity | 0.210 | 1.517 | 64.167 | |
| | Image-side surface 92 | Infinity | 0.500 | | | |
| | Image plane 100 | Infinity | 0.000 | | | |

FIG.56

| Surface | K | $a_4$ | $a_6$ | $a_8$ |
|---|---|---|---|---|
| 31 | 6.828014E-03 | -2.958925E-04 | -4.729955E-05 | -1.113923E-04 |
| 32 | 1.765440E+00 | 1.154081E-02 | -1.298961E-03 | 2.976397E-04 |
| 41 | 7.052397E-01 | 1.234885E-02 | 8.441470E-04 | -1.131542E-03 |
| 42 | -1.282508E-01 | 4.992776E-03 | 1.802488E-03 | -1.037552E-04 |
| 71 | 3.062555E-01 | -6.496895E-02 | 1.511885E-02 | -4.110850E-03 |
| 72 | 9.524962E+01 | -4.188047E-02 | 1.578105E-02 | 1.794247E-03 |
| 51 | 4.285453E-02 | 7.462192E-03 | 2.571842E-03 | -4.840711E-05 |
| 52 | -1.842308E+02 | -8.651419E-03 | 1.140894E-04 | 9.598520E-05 |
| 61 | 9.714489E-01 | -3.325108E-02 | 4.776086E-03 | -4.168919E-04 |
| 62 | -1.885265E+03 | -2.906068E-02 | 4.087459E-03 | -3.074086E-04 |
| Surface | $a_{10}$ | $a_{12}$ | $a_{14}$ | $a_{16}$ |
| 31 | 5.654387E-05 | -3.617048E-06 | -1.332579E-07 | -1.979723E-07 |
| 32 | -9.917306E-05 | 1.120139E-05 | -8.234632E-08 | -2.072912E-07 |
| 41 | 1.815900E-04 | 1.531094E-05 | -4.163758E-06 | 2.519640E-07 |
| 42 | -1.352002E-04 | -1.369308E-06 | 3.164611E-05 | -1.422106E-06 |
| 71 | 1.584238E-03 | -6.092751E-04 | 3.670094E-05 | -9.673208E-06 |
| 72 | -1.141407E-03 | 1.270399E-04 | -3.016912E-06 | 1.880771E-07 |
| 51 | -2.490140E-05 | 1.526716E-06 | 1.636512E-08 | 3.955990E-10 |
| 52 | -3.227027E-05 | 9.873200E-07 | 2.284594E-08 | -4.229924E-09 |
| 61 | 1.874214E-06 | 5.447269E-08 | 5.301108E-09 | -4.657415E-09 |
| 62 | 2.042564E-06 | 6.250960E-07 | -1.886553E-08 | -7.902730E-10 |

FIG.57

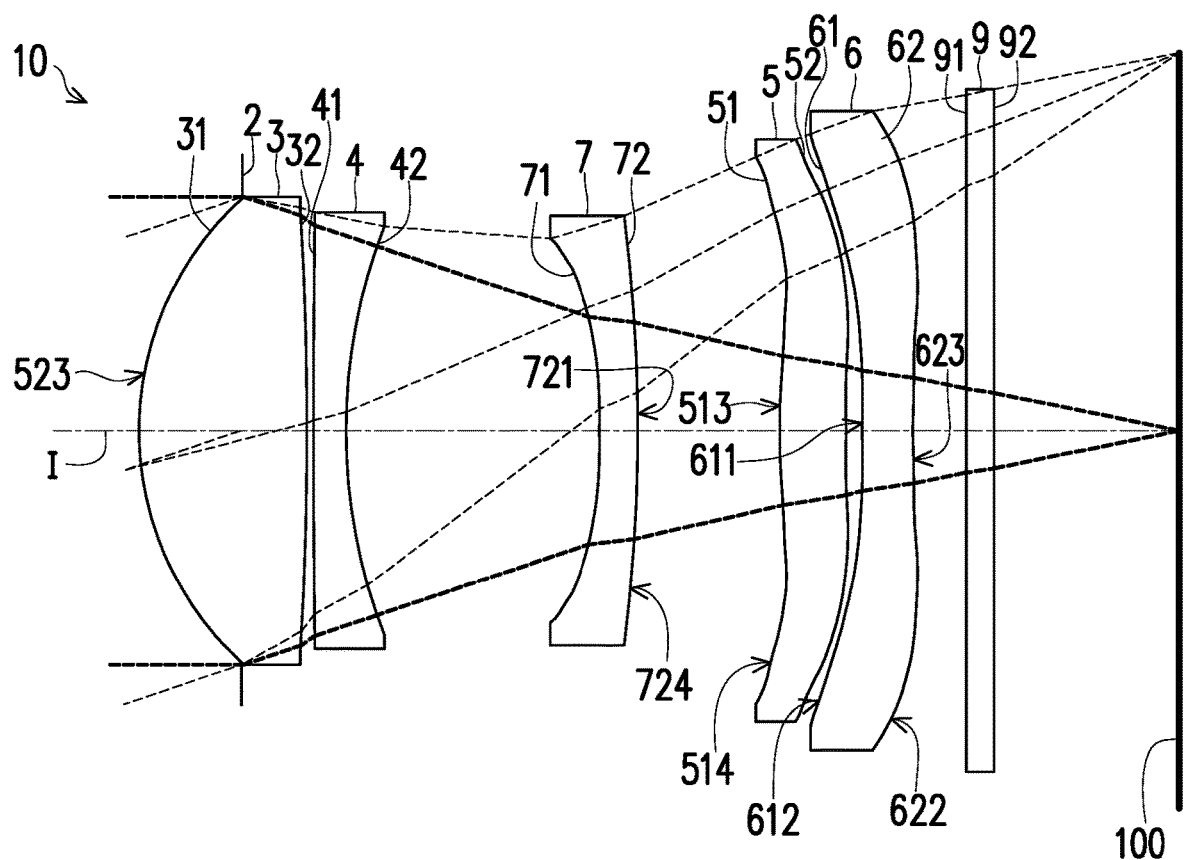
FIG.58
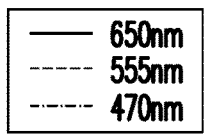
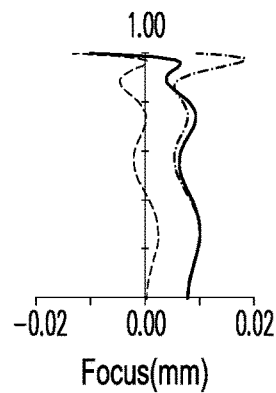
FIG.59A
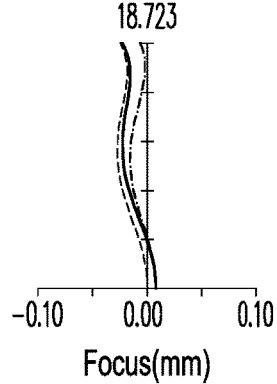
FIG.59B
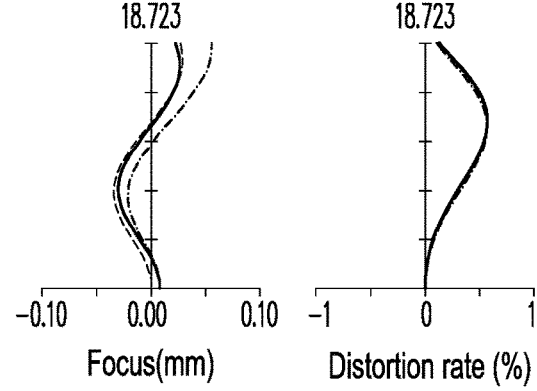
FIG.59C
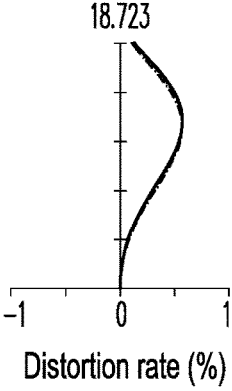
FIG.59D

| Fourteenth embodiment ||||||
|---|---|---|---|---|---|
| EFL= 8.677 mm , HFOV= 18.723°, Fno=2.386, System length= 8.000 mm, Image height=2.944 mm ||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.793 | | | |
| First lens element 3 | Object-side surface 31 | 2.387 | 1.291 | 1.545 | 55.987 | 3.803 |
| | Image-side surface 32 | -12.954 | 0.050 | | | |
| Second lens element 4 | Object-side surface 41 | -121.672 | 0.238 | 1.642 | 22.409 | -6.630 |
| | Image-side surface 42 | 4.452 | 1.962 | | | |
| Fifth lens element 7 | Object-side surface 71 | -5.424 | 0.299 | 1.545 | 55.987 | -14.388 |
| | Image-side surface 72 | -17.844 | 1.092 | | | |
| Third lens element 5 | Object-side surface 51 | 5.733 | 0.511 | 1.661 | 20.401 | 19.102 |
| | Image-side surface 52 | 10.058 | 0.131 | | | |
| Fourth lens element 6 | Object-side surface 61 | -12.459 | 0.394 | 1.535 | 55.690 | -12.726 |
| | Image-side surface 62 | 15.278 | 0.400 | | | |
| Filter 9 | Object-side surface 91 | Infinity | 0.210 | 1.517 | 64.167 | |
| | Image-side surface 92 | Infinity | 1.423 | | | |
| | Image plane 100 | Infinity | 0.000 | | | |

FIG.60

| Surface | K | $a_4$ | $a_6$ | $a_8$ |
|---|---|---|---|---|
| 31 | -9.285764E-03 | -1.978491E-03 | 3.359408E-04 | -2.156097E-04 |
| 32 | -1.390918E+01 | 6.095882E-03 | 2.413590E-04 | -1.597703E-04 |
| 41 | -3.711318E+02 | 2.088568E-03 | 9.348479E-04 | -2.415025E-04 |
| 42 | 2.450450E-01 | -2.696298E-04 | 1.314210E-03 | -4.699235E-04 |
| 71 | 1.069024E+01 | -1.517490E-02 | -4.950212E-03 | 6.717826E-03 |
| 72 | 9.742409E+01 | -2.175795E-02 | 1.038848E-02 | -7.597914E-04 |
| 51 | -1.713467E+01 | -3.440550E-02 | 6.477027E-04 | 5.412217E-04 |
| 52 | -5.966122E+01 | -3.935509E-02 | 2.466130E-03 | 1.865273E-04 |
| 61 | 2.026950E+01 | -1.507571E-02 | 1.200835E-03 | 1.943672E-04 |
| 62 | 3.136156E+01 | -1.489179E-02 | 4.581292E-04 | -2.445004E-04 |
| Surface | $a_{10}$ | $a_{12}$ | $a_{14}$ | $a_{16}$ |
| 31 | 2.690219E-05 | 4.731806E-06 | 3.708112E-07 | -3.212331E-07 |
| 32 | 4.177168E-06 | 9.317575E-07 | -1.963511E-07 | -3.873642E-07 |
| 41 | -4.059906E-05 | -6.023861E-06 | 1.632855E-07 | 4.749407E-07 |
| 42 | 9.059378E-05 | -2.543612E-05 | -7.419351E-06 | 4.618484E-06 |
| 71 | -2.334181E-03 | -2.382085E-04 | 4.269948E-05 | 2.654161E-05 |
| 72 | -1.308488E-04 | -4.372115E-05 | 3.391081E-06 | 6.170735E-06 |
| 51 | -2.410998E-05 | 1.217157E-06 | 1.024171E-07 | -1.229556E-07 |
| 52 | 1.424862E-05 | -1.585819E-06 | -1.881514E-07 | -2.754646E-09 |
| 61 | -7.762032E-06 | -2.142736E-06 | 3.979423E-08 | 4.959217E-08 |
| 62 | 3.376699E-05 | -2.055098E-06 | -3.495306E-08 | 7.192280E-09 |

FIG.61

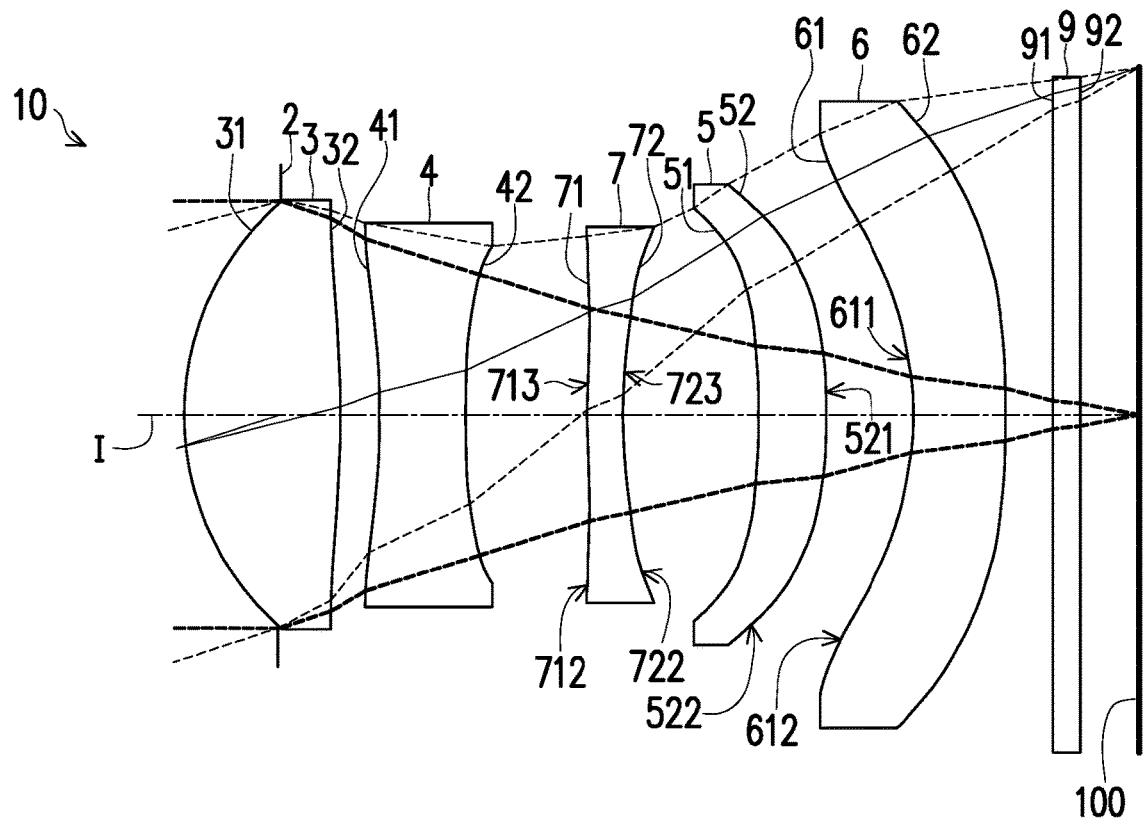
FIG.62
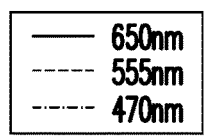
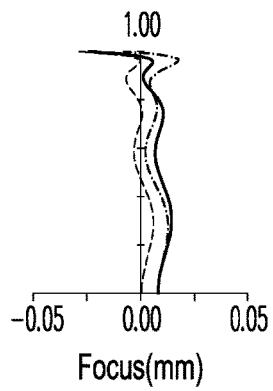
FIG.63A
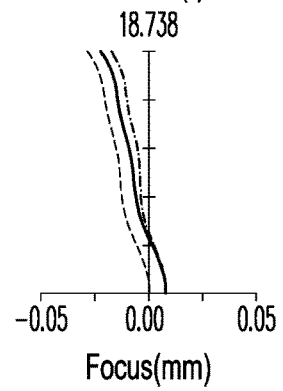
FIG.63B
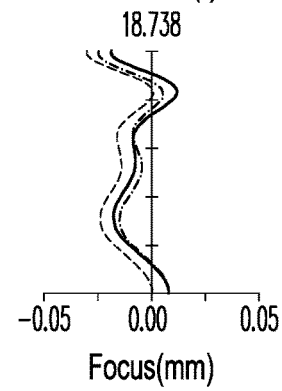
FIG.63C
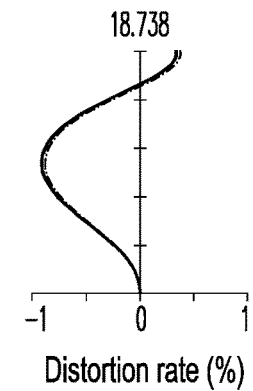
FIG.63D

| Fifteenth embodiment ||||||
|---|---|---|---|---|---|
| EFL= 8.650 mm , HFOV= 18.738°, Fno=2.379, System length= 8.000 mm, Image height=2.944 mm ||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.793 | | | |
| First lens element 3 | Object-side surface 31 | 2.413 | 1.305 | 1.545 | 55.987 | 3.638 |
| | Image-side surface 32 | -9.125 | 0.326 | | | |
| Second lens element 4 | Object-side surface 41 | -5.488 | 0.721 | 1.642 | 22.409 | -5.242 |
| | Image-side surface 42 | 9.352 | 1.027 | | | |
| Fifth lens element 7 | Object-side surface 71 | 7.769 | 0.298 | 1.545 | 55.987 | -17.048 |
| | Image-side surface 72 | 4.178 | 1.138 | | | |
| Third lens element 5 | Object-side surface 51 | -8.751 | 0.579 | 1.642 | 22.409 | 10.921 |
| | Image-side surface 52 | -4.012 | 0.729 | | | |
| Fourth lens element 6 | Object-side surface 61 | -2.964 | 0.767 | 1.545 | 55.987 | -7.146 |
| | Image-side surface 62 | -13.439 | 0.400 | | | |
| Filter 9 | Object-side surface 91 | Infinity | 0.210 | 1.517 | 64.167 | |
| | Image-side surface 92 | Infinity | 0.500 | | | |
| | Image plane 100 | Infinity | 0.000 | | | |

FIG.64

| Surface | K | $a_4$ | $a_6$ | $a_8$ |
|---|---|---|---|---|
| 31 | -3.350551E-02 | -5.895746E-04 | 6.164313E-04 | -2.294670E-04 |
| 32 | 8.849981E+00 | 1.391583E-02 | -1.065858E-03 | 7.962409E-05 |
| 41 | -7.149202E+00 | 1.484423E-02 | -1.328001E-04 | -4.104855E-04 |
| 42 | 3.551353E+01 | 8.551030E-04 | 7.716350E-03 | -1.209498E-03 |
| 71 | -1.808274E+01 | -8.344560E-02 | 3.287067E-02 | 3.569373E-03 |
| 72 | 1.231487E+00 | -7.883345E-02 | 4.271427E-02 | -7.234151E-03 |
| 51 | 3.057957E+00 | -1.310247E-02 | -9.717336E-03 | 1.170008E-04 |
| 52 | -9.067077E+00 | -1.968038E-02 | -2.596703E-03 | -2.974733E-03 |
| 61 | -1.019975E+01 | -4.333575E-02 | 8.504461E-03 | -3.711906E-04 |
| 62 | -3.669676E+02 | -4.074415E-02 | 7.422959E-03 | -7.646555E-04 |
| Surface | $a_{10}$ | $a_{12}$ | $a_{14}$ | $a_{16}$ |
| 31 | 7.159953E-06 | 1.362943E-05 | 2.480510E-06 | -1.205777E-06 |
| 32 | -1.087709E-05 | 7.008739E-06 | 3.116367E-07 | -1.014409E-06 |
| 41 | 1.790228E-05 | 1.557866E-05 | 1.243533E-06 | -1.630798E-06 |
| 42 | -1.137764E-04 | 1.612595E-04 | 5.025851E-05 | -2.053848E-05 |
| 71 | -3.410286E-03 | -8.108115E-04 | 7.460604E-04 | -1.458699E-04 |
| 72 | 1.342206E-03 | -9.741059E-05 | -2.304430E-04 | 4.444059E-05 |
| 51 | 3.087137E-04 | -2.460049E-04 | 3.017265E-05 | 9.101891E-06 |
| 52 | 1.217113E-03 | -4.279648E-05 | -8.648078E-05 | 1.631406E-05 |
| 61 | -6.686920E-06 | -6.022545E-07 | 8.520174E-08 | 1.066740E-09 |
| 62 | 3.205723E-05 | -1.992127E-07 | -1.529303E-07 | 1.704430E-08 |

FIG.65

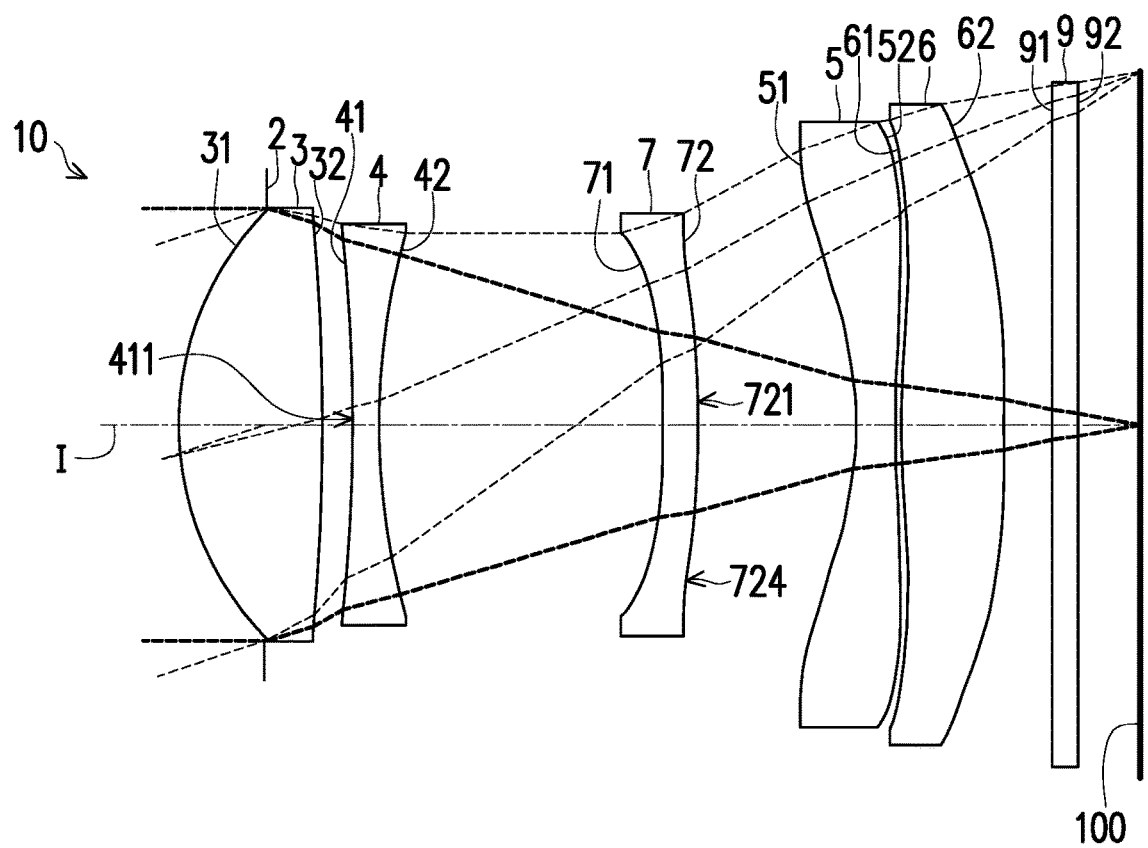
FIG.66
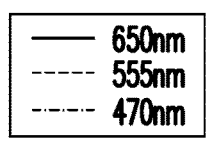
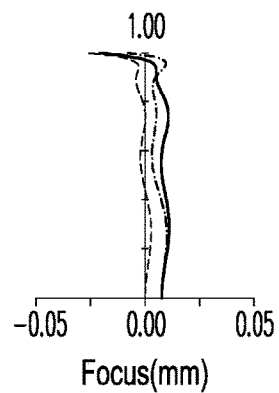
FIG.67A
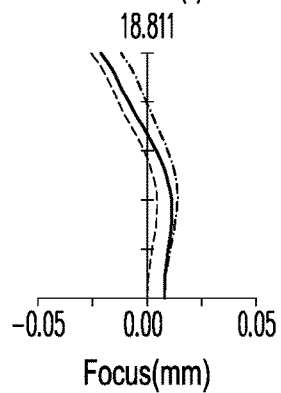
FIG.67B
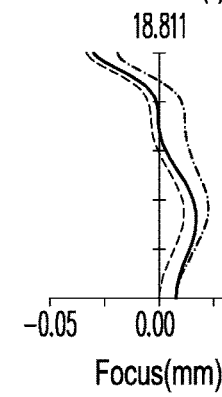
FIG.67C
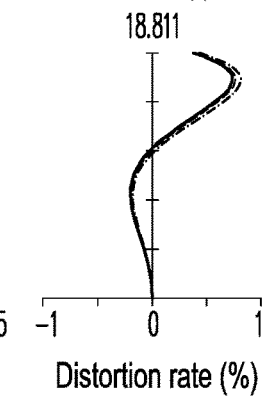
FIG.67D

| Sixteenth embodiment ||||||
|---|---|---|---|---|---|
| EFL= 8.609 mm , HFOV= 18.810°, Fno=2.390, System length= 7.927 mm, Image height=2.944 mm ||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.710 | | | |
| First lens element 3 | Object-side surface 31 | 2.587 | 1.176 | 1.545 | 55.987 | 3.910 |
| | Image-side surface 32 | -10.288 | 0.247 | | | |
| Second lens element 4 | Object-side surface 41 | -9.158 | 0.237 | 1.642 | 22.409 | -6.576 |
| | Image-side surface 42 | 8.035 | 2.322 | | | |
| Fifth lens element 7 | Object-side surface 71 | -19.734 | 0.299 | 1.535 | 55.690 | 108.703 |
| | Image-side surface 72 | -14.823 | 1.317 | | | |
| Third lens element 5 | Object-side surface 51 | -3.091 | 0.328 | 1.545 | 55.987 | -4.431 |
| | Image-side surface 52 | 11.588 | 0.050 | | | |
| Fourth lens element 6 | Object-side surface 61 | 6.956 | 0.842 | 1.642 | 22.409 | 9.739 |
| | Image-side surface 62 | -64.084 | 0.400 | | | |
| Filter 9 | Object-side surface 91 | Infinity | 0.210 | 1.517 | 64.167 | |
| | Image-side surface 92 | Infinity | 0.500 | | | |
| | Image plane 100 | Infinity | 0.000 | | | |

FIG.68

| Surface | K | $a_4$ | $a_6$ | $a_8$ |
|---|---|---|---|---|
| 31 | 1.225913E-02 | -4.296296E-04 | -2.312616E-05 | -1.080337E-04 |
| 32 | 6.416853E+00 | 1.048630E-02 | -1.137006E-03 | 3.232928E-04 |
| 41 | 3.134220E+00 | 1.148153E-02 | 6.136658E-04 | -1.137703E-03 |
| 42 | -8.483820E-01 | 4.771617E-03 | 1.474028E-03 | -4.112561E-04 |
| 71 | -3.860513E+02 | -6.073700E-02 | 1.506055E-02 | -3.823745E-03 |
| 72 | 5.281209E+01 | -3.377489E-02 | 1.367780E-02 | 1.864933E-03 |
| 51 | 1.309010E-02 | 1.003760E-02 | 2.724344E-03 | -6.204451E-05 |
| 52 | -3.621932E+01 | -1.097714E-02 | 6.090327E-04 | 1.215791E-04 |
| 61 | 3.777619E+00 | -3.487359E-02 | 5.332670E-03 | -3.979706E-04 |
| 62 | -1.199285E+03 | -2.630028E-02 | 3.983600E-03 | -2.768434E-04 |
| Surface | $a_{10}$ | $a_{12}$ | $a_{14}$ | $a_{16}$ |
| 31 | 5.790002E-05 | -1.629689E-06 | 1.258004E-07 | -3.237786E-07 |
| 32 | -9.570596E-05 | 1.208690E-05 | -1.223511E-07 | -3.851447E-07 |
| 41 | 1.762493E-04 | 1.070769E-05 | -4.393662E-06 | 5.584882E-07 |
| 42 | -1.168397E-04 | 8.382177E-06 | 2.900145E-05 | -2.956791E-06 |
| 71 | 1.211845E-03 | -6.005450E-04 | 1.009463E-04 | -1.677297E-05 |
| 72 | -1.086656E-03 | 1.053469E-04 | -1.045854E-05 | 2.810688E-06 |
| 51 | -2.695746E-05 | 1.478634E-06 | 8.090640E-10 | -8.103100E-10 |
| 52 | -3.212973E-05 | 1.102950E-06 | 2.340380E-08 | -9.233112E-09 |
| 61 | 3.574282E-06 | 7.553458E-08 | -1.776703E-08 | -4.556096E-09 |
| 62 | 4.226717E-06 | 6.987380E-07 | -2.758606E-08 | -3.739234E-09 |

FIG.69

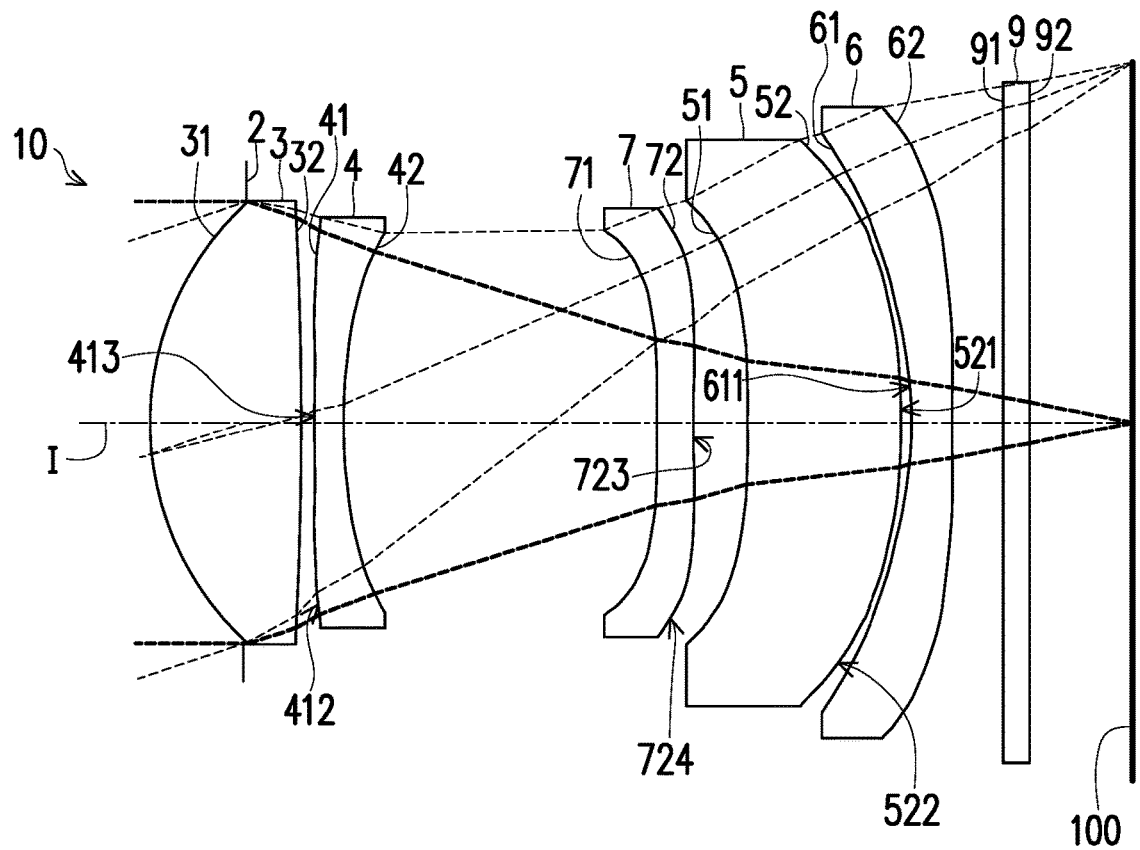
FIG.70
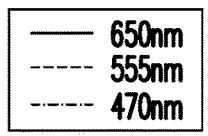
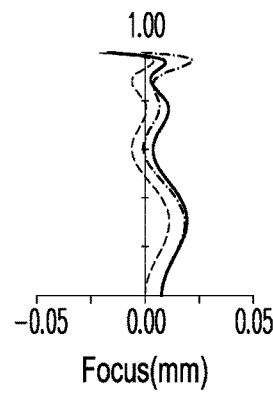
FIG.71A
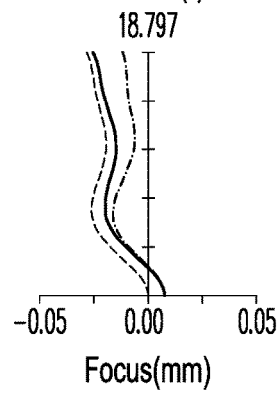
FIG.71B
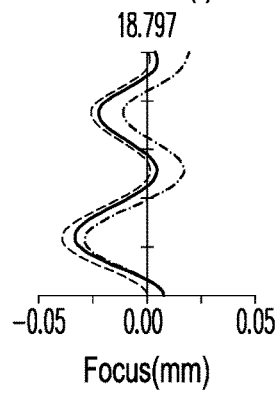
FIG.71C
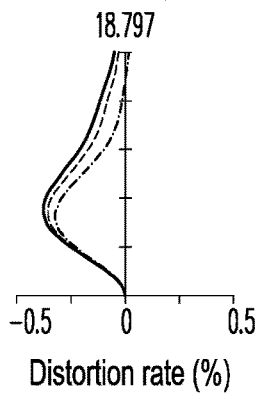
FIG.71D

| Seventeenth embodiment | | | | | | |
|---|---|---|---|---|---|---|
| EFL= 8.652 mm , HFOV= 18.797°, Fno=2.379, System length= 8.000 mm, Image height=2.944 mm | | | | | | |
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.771 | | | |
| First lens element 3 | Object-side surface 31 | 2.426 | 1.232 | 1.545 | 55.987 | 3.884 |
| | Image-side surface 32 | -13.862 | 0.105 | | | |
| Second lens element 4 | Object-side surface 41 | -41.669 | 0.238 | 1.642 | 22.409 | -7.181 |
| | Image-side surface 42 | 5.244 | 2.549 | | | |
| Fifth lens element 7 | Object-side surface 71 | -46.748 | 0.296 | 1.545 | 55.987 | -17.523 |
| | Image-side surface 72 | 12.064 | 0.446 | | | |
| Third lens element 5 | Object-side surface 51 | -12.427 | 1.249 | 1.661 | 20.401 | 13.966 |
| | Image-side surface 52 | -5.535 | 0.088 | | | |
| Fourth lens element 6 | Object-side surface 61 | -3.661 | 0.336 | 1.535 | 55.690 | -7.686 |
| | Image-side surface 62 | -33.599 | 0.400 | | | |
| Filter 9 | Object-side surface 91 | Infinity | 0.210 | 1.517 | 64.167 | |
| | Image-side surface 92 | Infinity | 0.851 | | | |
| | Image plane 100 | Infinity | 0.000 | | | |

FIG.72

| Surface | K | $a_4$ | $a_6$ | $a_8$ |
|---|---|---|---|---|
| 31 | -6.178238E-02 | -1.228358E-03 | 9.749085E-04 | -3.475903E-04 |
| 32 | -8.590645E+01 | 6.081262E-03 | 4.312001E-04 | -3.598339E-04 |
| 41 | 5.353425E+02 | 1.181331E-02 | 1.015338E-03 | -5.262569E-04 |
| 42 | 3.202181E+00 | 5.488218E-03 | 2.470548E-03 | -2.315307E-05 |
| 71 | -3.108522E+01 | -6.160528E-02 | 1.778147E-02 | -7.625973E-03 |
| 72 | -6.843962E+02 | -3.877174E-02 | 1.005955E-02 | -2.783341E-03 |
| 51 | 2.130765E+01 | -3.514860E-02 | 4.655992E-03 | 6.109218E-06 |
| 52 | -1.153408E+01 | -1.633446E-02 | 3.045064E-04 | 8.625818E-06 |
| 61 | 7.469227E-01 | 9.298768E-03 | -7.783892E-05 | -1.350322E-05 |
| 62 | 1.363552E+02 | -1.465833E-02 | 2.521887E-03 | -4.607575E-04 |
| Surface | $a_{10}$ | $a_{12}$ | $a_{14}$ | $a_{16}$ |
| 31 | -5.518150E-06 | 1.710088E-05 | 7.168363E-06 | -2.708793E-06 |
| 32 | -5.158752E-06 | 6.086926E-06 | -1.280185E-06 | -1.238295E-07 |
| 41 | -1.213213E-05 | -5.610574E-06 | 3.835276E-06 | 2.632475E-06 |
| 42 | -1.190922E-04 | -1.011502E-05 | 2.177424E-05 | 7.063285E-06 |
| 71 | -1.963259E-03 | 8.763791E-04 | -2.937379E-05 | -1.450118E-05 |
| 72 | -8.092915E-04 | 5.164579E-05 | 6.916851E-05 | -3.594989E-06 |
| 51 | -1.996387E-04 | -1.272462E-04 | -1.804506E-05 | 1.234163E-05 |
| 52 | -4.028577E-06 | -4.907929E-06 | -5.710969E-07 | 2.191370E-07 |
| 61 | -1.076141E-05 | -1.709795E-07 | 1.287028E-07 | 4.438921E-08 |
| 62 | 4.223969E-05 | -2.289143E-06 | 2.466135E-08 | -3.250140E-10 |

FIG.73

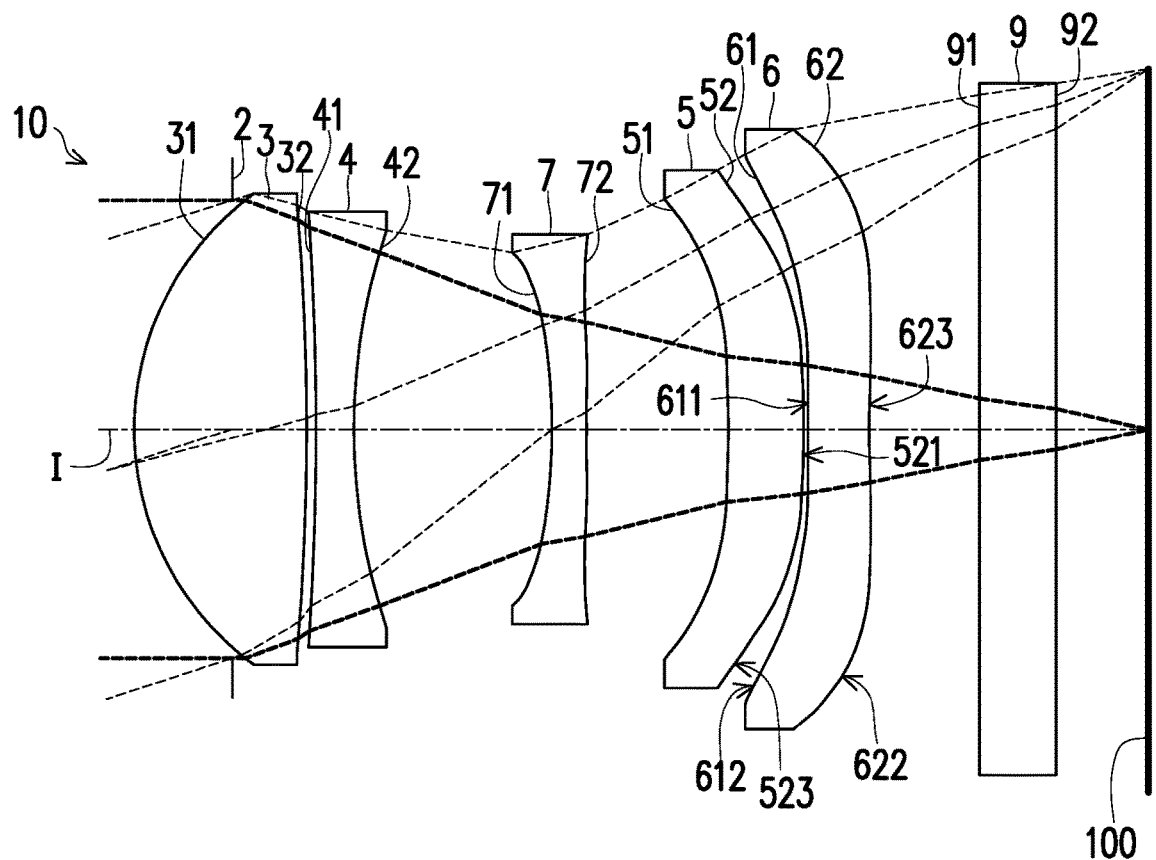
FIG.74
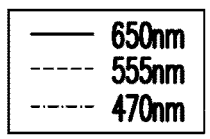
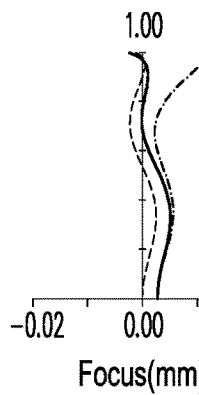
FIG.75A
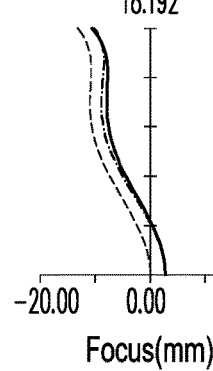
FIG.75B
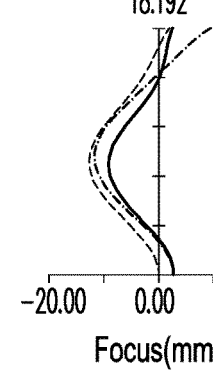
FIG.75C
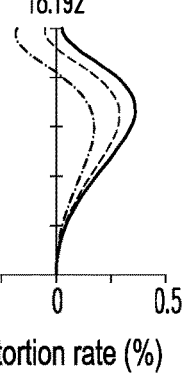
FIG.75D

| Eighteenth embodiment |||||||
|---|---|---|---|---|---|---|
| EFL= 3.044 mm, HFOV= 18.192°, Fno=2.392, System length= 2.800 mm, Image height=1.000 mm |||||||
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.273 | | | |
| First lens element 3 | Object-side surface 31 | 0.803 | 0.478 | 1.545 | 55.987 | 1.271 |
| | Image-side surface 32 | -4.066 | 0.022 | | | |
| Second lens element 4 | Object-side surface 41 | -6.751 | 0.105 | 1.642 | 22.409 | -2.304 |
| | Image-side surface 42 | 1.926 | 0.543 | | | |
| Fifth lens element 7 | Object-side surface 71 | -1.805 | 0.099 | 1.545 | 55.987 | -4.447 |
| | Image-side surface 72 | -7.159 | 0.392 | | | |
| Third lens element 5 | Object-side surface 51 | -3.983 | 0.209 | 1.661 | 20.401 | 23.869 |
| | Image-side surface 52 | -3.253 | 0.010 | | | |
| Fourth lens element 6 | Object-side surface 61 | -10.148 | 0.171 | 1.535 | 55.690 | -6.941 |
| | Image-side surface 62 | 5.919 | 0.300 | | | |
| Filter 9 | Object-side surface 91 | Infinity | 0.210 | 1.517 | 64.167 | |
| | Image-side surface 92 | Infinity | 0.261 | | | |
| | Image plane 100 | Infinity | 0.000 | | | |

FIG.76

| Surface | K | $a_4$ | $a_6$ | $a_8$ |
|---|---|---|---|---|
| 31 | -4.142426E-03 | -4.810924E-02 | 9.593219E-02 | -2.930310E-01 |
| 32 | -4.674953E-01 | 1.246931E-01 | 7.013212E-02 | -2.321520E-01 |
| 41 | 1.183008E+00 | 3.051673E-02 | 1.699918E-01 | -2.952633E-01 |
| 42 | 5.009807E-01 | -8.444648E-03 | 3.753987E-01 | -8.513068E-01 |
| 71 | 1.122562E+01 | 1.680632E-02 | -1.163231E+00 | 7.274267E+00 |
| 72 | 6.733996E+01 | 3.035549E-02 | 1.292796E+00 | -1.512874E+00 |
| 51 | 1.064011E+01 | -9.286169E-01 | 1.028641E-02 | 1.029268E+00 |
| 52 | 9.292354E-01 | -1.070636E+00 | 5.654732E-01 | 4.444771E-01 |
| 61 | 1.312733E+02 | -7.848838E-01 | 3.130875E-01 | 5.743667E-01 |
| 62 | 4.125471E+01 | -5.437932E-01 | 4.683618E-02 | -4.005992E-01 |
| Surface | $a_{10}$ | $a_{12}$ | $a_{14}$ | $a_{16}$ |
| 31 | 2.404546E-01 | 1.577405E-02 | 2.210558E-02 | -1.280079E-02 |
| 32 | 2.270184E-02 | -5.446853E-03 | -1.572690E-01 | -5.765412E-01 |
| 41 | -1.854530E-01 | -4.746342E-02 | -6.887573E-02 | -2.243688E-02 |
| 42 | 1.165637E+00 | -1.797690E-01 | -1.592111E+00 | 7.964196E+00 |
| 71 | -2.486474E+01 | 6.999961E-02 | 2.494071E+00 | 2.894331E+01 |
| 72 | 7.019781E-01 | 1.607242E+00 | -5.734516E+00 | -1.039906E+01 |
| 51 | -2.081371E-01 | 1.917977E-01 | 7.864055E-02 | 3.178135E-01 |
| 52 | 4.379325E-01 | -6.772968E-02 | 7.524360E-02 | 8.599381E-02 |
| 61 | 7.224442E-02 | -9.168811E-02 | -1.039673E-02 | -5.820478E-02 |
| 62 | 4.654875E-01 | -2.687818E-01 | -3.510587E-02 | -5.894599E-02 |

FIG.77

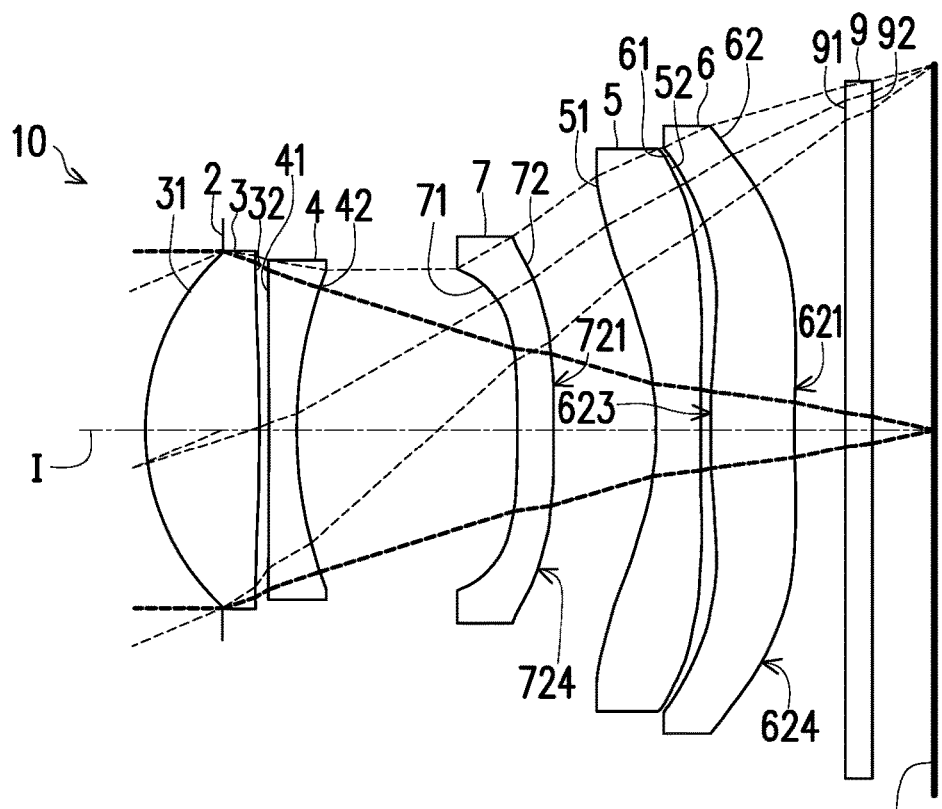
FIG.78
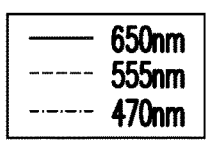
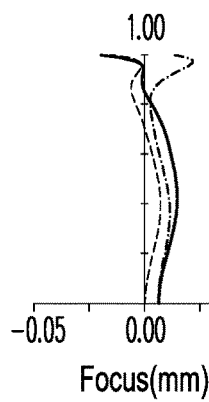
FIG.79A
FIG.79B
FIG.79C
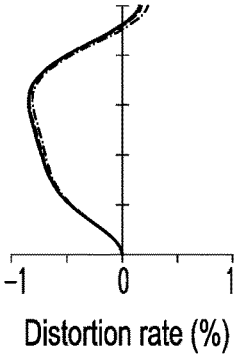
FIG.79D

| Nineteenth embodiment | | | | | | |
|---|---|---|---|---|---|---|
| EFL= 6.828 mm , HFOV= 23.288°, Fno=2.387, System length= 6.294 mm, Image height=2.944 mm | | | | | | |
| Lens element | Surface | Radius of curvature(mm) | Thickness(mm) | Refractive index | Dispersion coefficient | Focal length(mm) |
| Object | | Infinity | 1.0000E+10 | | | |
| Aperture stop 2 | | Infinity | -0.619 | | | |
| First lens element 3 | Object-side surface 31 | 1.912 | 0.910 | 1.545 | 55.987 | 3.100 |
| | Image-side surface 32 | -12.306 | 0.073 | | | |
| Second lens element 4 | Object-side surface 41 | -53.168 | 0.228 | 1.642 | 22.409 | -5.504 |
| | Image-side surface 42 | 3.825 | 1.753 | | | |
| Fifth lens element 7 | Object-side surface 71 | -15.457 | 0.290 | 1.535 | 55.690 | 47.409 |
| | Image-side surface 72 | -9.678 | 0.820 | | | |
| Third lens element 5 | Object-side surface 51 | -2.388 | 0.357 | 1.545 | 55.987 | -3.911 |
| | Image-side surface 52 | 21.413 | 0.080 | | | |
| Fourth lens element 6 | Object-side surface 61 | 5.357 | 0.667 | 1.642 | 22.409 | 12.063 |
| | Image-side surface 62 | 16.224 | 0.400 | | | |
| Filter 9 | Object-side surface 91 | Infinity | 0.210 | 1.517 | 64.167 | |
| | Image-side surface 92 | Infinity | 0.506 | | | |
| | Image plane 100 | Infinity | 0.000 | | | |

FIG.80

| Surface | K | $a_4$ | $a_6$ | $a_8$ |
|---|---|---|---|---|
| 31 | -6.138743E-02 | -2.112942E-03 | 1.166392E-03 | -3.850375E-04 |
| 32 | -1.239611E+02 | 1.180197E-02 | -2.367443E-03 | 1.524932E-04 |
| 41 | 4.461206E+02 | 8.668845E-03 | -1.441723E-03 | -1.277444E-03 |
| 42 | -1.854695E+00 | 1.958480E-04 | 5.796418E-03 | -2.309443E-03 |
| 71 | -3.318463E+02 | -1.000439E-01 | 4.765247E-03 | -2.272336E-02 |
| 72 | 3.123756E+01 | -4.189672E-02 | -1.723248E-03 | 1.360664E-03 |
| 51 | -1.198764E+00 | 1.291857E-02 | 3.974647E-03 | -3.408178E-04 |
| 52 | -3.632296E+03 | -1.442363E-02 | 2.835154E-04 | 5.881897E-05 |
| 61 | 1.546953E+00 | -6.233560E-02 | 8.189895E-03 | -7.706109E-04 |
| 62 | 1.576780E+01 | -4.262787E-02 | 2.919647E-03 | -1.736362E-05 |
| Surface | $a_{10}$ | $a_{12}$ | $a_{14}$ | $a_{16}$ |
| 31 | 1.761694E-04 | 7.020731E-05 | 9.221684E-06 | -1.149963E-05 |
| 32 | -3.798864E-05 | 3.324239E-05 | -8.953156E-06 | -1.091820E-05 |
| 41 | 8.432424E-05 | 5.758428E-05 | 7.400101E-05 | -2.716293E-05 |
| 42 | 9.304751E-04 | 2.197293E-04 | -4.613523E-04 | 2.658555E-04 |
| 71 | -1.212744E-03 | 3.053821E-03 | 2.032667E-03 | -2.641694E-03 |
| 72 | -1.753196E-04 | 3.098029E-04 | 1.999569E-05 | 4.246373E-06 |
| 51 | -8.466110E-05 | 9.602376E-06 | 1.249839E-06 | -1.704912E-07 |
| 52 | -4.853061E-05 | 4.785137E-06 | 2.282686E-07 | -6.237164E-08 |
| 61 | 1.904969E-05 | 5.128911E-06 | 4.217344E-08 | -7.767377E-08 |
| 62 | -1.588948E-06 | 1.679337E-06 | -1.091294E-07 | -5.341795E-09 |

FIG.81

| Conditional equation | First embodiment | Second embodiment | Third embodiment | Fourth embodiment | Fifth embodiment | Sixth embodiment | Seventh embodiment | Eighth embodiment | Ninth embodiment | Tenth embodiment |
|---|---|---|---|---|---|---|---|---|---|---|
| T1 | 0.93 | 0.90 | 1.08 | 1.00 | 0.79 | 1.21 | 0.89 | 0.52 | 0.72 | 1.61 |
| G12 | 0.06 | 0.22 | 0.05 | 0.05 | 0.01 | 0.07 | 0.04 | 0.05 | 0.17 | 0.20 |
| T2 | 0.18 | 0.20 | 0.58 | 0.25 | 0.21 | 0.24 | 0.47 | 0.20 | 0.23 | 0.24 |
| G23 | 2.73 | 2.33 | 1.94 | 1.36 | 4.00 | 2.64 | 2.77 | 0.43 | 1.09 | 2.94 |
| T3 | 0.88 | 0.25 | 0.18 | 0.44 | 0.21 | 0.29 | 0.48 | 0.24 | 0.27 | 0.33 |
| G34 | 0.10 | 0.11 | 0.75 | 1.30 | 0.01 | 0.20 | 0.22 | 0.20 | 0.08 | 0.08 |
| T4 | 0.32 | 0.94 | 0.96 | 0.76 | 0.29 | 1.55 | 0.52 | 0.27 | 0.48 | 0.99 |
| G4F | 0.40 | 0.40 | 0.40 | 0.40 | 0.40 | 0.40 | 0.40 | 0.20 | 0.31 | 0.40 |
| TF | 0.21 | 0.21 | 0.21 | 0.21 | 0.21 | 0.21 | 0.21 | 0.21 | 0.21 | 0.21 |
| GFP | 0.56 | 0.82 | 0.24 | 0.62 | 0.28 | 1.19 | 0.39 | 0.50 | 0.46 | 0.99 |
| BFL | 1.17 | 1.43 | 0.85 | 1.23 | 0.89 | 1.80 | 1.00 | 0.91 | 0.98 | 1.60 |
| ALT | 2.32 | 2.29 | 2.81 | 2.44 | 1.50 | 3.29 | 2.36 | 1.23 | 1.69 | 3.18 |
| AAG | 2.89 | 2.67 | 2.74 | 2.70 | 4.01 | 2.91 | 3.03 | 0.68 | 1.34 | 3.23 |
| TL | 5.21 | 4.95 | 5.55 | 5.15 | 5.51 | 6.20 | 5.39 | 1.91 | 3.04 | 6.40 |
| TTL | 6.38 | 6.38 | 6.40 | 6.38 | 6.40 | 8.00 | 6.39 | 2.82 | 4.02 | 8.00 |
| (TTL*Fno)/EFL | 2.17 | 2.16 | 2.17 | 2.16 | 2.15 | 2.20 | 2.15 | 2.18 | 2.18 | 2.20 |
| EFL/T4 | 22.00 | 7.54 | 7.30 | 9.34 | 24.23 | 5.65 | 13.47 | 11.56 | 9.12 | 8.74 |
| G23/T4 | 8.50 | 2.49 | 2.01 | 1.79 | 13.71 | 1.71 | 5.28 | 1.63 | 2.27 | 2.96 |
| AAG/T4 | 9.00 | 2.85 | 2.85 | 3.57 | 13.76 | 1.88 | 5.77 | 2.56 | 2.79 | 3.25 |
| G23/T1 | 2.92 | 2.60 | 1.79 | 1.36 | 5.04 | 2.18 | 3.11 | 0.83 | 1.51 | 1.82 |
| EFL/G23 | 2.59 | 3.03 | 3.62 | 5.21 | 1.77 | 3.31 | 2.55 | 7.08 | 4.02 | 2.95 |
| EFL/T3 | 8.02 | 28.32 | 39.22 | 16.18 | 34.42 | 30.24 | 14.80 | 12.88 | 16.40 | 26.36 |
| EFL/AAG | 2.44 | 2.65 | 2.56 | 2.61 | 1.76 | 3.00 | 2.33 | 4.51 | 3.27 | 2.69 |
| AAG/G12 | 46.03 | 12.00 | 56.23 | 59.26 | 549.28 | 44.22 | 78.00 | 13.52 | 7.76 | 15.98 |
| G23/G12 | 43.48 | 10.50 | 39.74 | 29.77 | 547.10 | 40.13 | 71.41 | 8.62 | 6.31 | 14.56 |
| EFL/ALT | 3.05 | 3.09 | 2.50 | 2.89 | 4.73 | 2.66 | 2.99 | 2.51 | 2.59 | 2.74 |
| G23/T3 | 3.10 | 9.35 | 10.82 | 3.11 | 19.47 | 9.15 | 5.81 | 1.82 | 4.08 | 8.92 |
| AAG/T1 | 3.09 | 2.97 | 2.53 | 2.70 | 5.06 | 2.40 | 3.40 | 1.30 | 1.86 | 2.00 |
| (T3+BFL)/T1 | 2.20 | 1.87 | 0.95 | 1.67 | 1.38 | 1.73 | 1.65 | 2.19 | 1.73 | 1.19 |
| EFL/T2 | 39.00 | 35.30 | 12.00 | 28.20 | 34.33 | 36.54 | 15.17 | 15.56 | 19.35 | 36.30 |
| G23/BFL | 2.33 | 1.63 | 2.28 | 1.10 | 4.50 | 1.46 | 2.78 | 0.48 | 1.11 | 1.84 |
| AAG/T2 | 15.95 | 13.33 | 4.69 | 10.79 | 19.50 | 12.18 | 6.50 | 3.45 | 5.92 | 13.49 |
| ALT/G23 | 0.85 | 0.98 | 1.45 | 1.80 | 0.37 | 1.24 | 0.85 | 2.82 | 1.55 | 1.08 |
| G23/T2 | 15.07 | 11.66 | 3.31 | 5.42 | 19.42 | 11.05 | 5.95 | 2.20 | 4.82 | 12.29 |
| ALT/T1 | 2.48 | 2.54 | 2.59 | 2.44 | 1.89 | 2.71 | 2.65 | 2.34 | 2.35 | 1.97 |

FIG.82

| Conditional equation | First embodiment | Second embodiment | Third embodiment | Fourth embodiment | Fifth embodiment | Sixth embodiment | Seventh embodiment | Eighth embodiment | Ninth embodiment | Tenth embodiment |
|---|---|---|---|---|---|---|---|---|---|---|
| T3/G12 | 14.02 | 1.12 | 3.67 | 9.58 | 28.10 | 4.39 | 12.29 | 4.74 | 1.55 | 1.63 |
| T2/G12 | 2.89 | 0.90 | 12.00 | 5.49 | 28.17 | 3.63 | 12.00 | 3.92 | 1.31 | 1.18 |
| T1/G12 | 14.87 | 4.04 | 22.21 | 21.92 | 108.49 | 18.43 | 22.96 | 10.39 | 4.17 | 7.99 |
| EFL/G12 | 112.53 | 31.79 | 144.05 | 154.93 | 967.11 | 132.71 | 182.00 | 60.99 | 25.36 | 43.00 |
| EFL/T1 | 7.57 | 7.87 | 6.48 | 7.07 | 8.91 | 7.20 | 7.93 | 5.87 | 6.08 | 5.38 |
| T1/T3 | 1.06 | 3.60 | 6.05 | 2.29 | 3.86 | 4.20 | 1.87 | 2.19 | 2.70 | 4.90 |
| T1/T4 | 2.91 | 0.96 | 1.13 | 1.32 | 2.72 | 0.78 | 1.70 | 1.97 | 1.50 | 1.62 |
| T3/T2 | 4.86 | 1.25 | 0.31 | 1.74 | 1.00 | 1.21 | 1.02 | 1.21 | 1.18 | 1.38 |
| T4/T3 | 0.36 | 3.75 | 5.37 | 1.73 | 1.42 | 5.35 | 1.10 | 1.11 | 1.80 | 3.02 |
| G34/G12 | 1.56 | 0.50 | 15.49 | 28.50 | 1.18 | 3.09 | 5.59 | 3.90 | 0.44 | 0.42 |
| G23/G34 | 27.93 | 21.00 | 2.57 | 1.04 | 463.49 | 12.99 | 12.77 | 2.21 | 14.29 | 34.62 |
| AAG/G23 | 1.06 | 1.14 | 1.41 | 1.99 | 1.00 | 1.10 | 1.09 | 1.57 | 1.23 | 1.10 |
| AAG/G34 | 29.57 | 24.00 | 3.63 | 2.08 | 465.34 | 14.31 | 13.95 | 3.46 | 17.55 | 38.00 |
| ALT/T2 | 12.79 | 11.41 | 4.80 | 9.75 | 7.27 | 13.75 | 5.06 | 6.20 | 7.49 | 13.27 |
| ALT/T3 | 2.63 | 9.16 | 15.69 | 5.60 | 7.28 | 11.38 | 4.94 | 5.14 | 6.34 | 9.64 |
| ALT/T4 | 7.21 | 2.44 | 2.92 | 3.23 | 5.13 | 2.13 | 4.50 | 4.61 | 3.53 | 3.20 |
| T1/G34 | 9.55 | 8.08 | 1.43 | 0.77 | 91.91 | 5.97 | 4.11 | 2.66 | 9.44 | 18.99 |
| G34/T2 | 0.54 | 0.56 | 1.29 | 5.19 | 0.04 | 0.85 | 0.47 | 1.00 | 0.34 | 0.35 |
| G34/T3 | 0.11 | 0.45 | 4.22 | 2.98 | 0.04 | 0.70 | 0.45 | 0.82 | 0.29 | 0.26 |
| T4/G12 | 5.11 | 4.21 | 19.73 | 16.59 | 39.91 | 23.49 | 13.51 | 5.28 | 2.78 | 4.92 |
| G34/T4 | 0.30 | 0.12 | 0.78 | 1.72 | 0.03 | 0.13 | 0.41 | 0.74 | 0.16 | 0.09 |
| ALT/G34 | 23.70 | 20.55 | 3.72 | 1.88 | 173.39 | 16.17 | 10.87 | 6.23 | 22.19 | 37.39 |
| EFL/G34 | 72.28 | 63.57 | 9.30 | 5.44 | 819.32 | 42.96 | 32.54 | 15.62 | 57.38 | 102.27 |
| BFL/T1 | 1.26 | 1.59 | 0.78 | 1.23 | 1.12 | 1.49 | 1.12 | 1.74 | 1.36 | 0.99 |
| BFL/T2 | 6.47 | 7.13 | 1.45 | 4.92 | 4.32 | 7.55 | 2.14 | 4.61 | 4.33 | 6.67 |
| BFL/T3 | 1.33 | 5.72 | 4.75 | 2.83 | 4.33 | 6.25 | 2.09 | 3.81 | 3.67 | 4.84 |
| BFL/T4 | 3.65 | 1.52 | 0.88 | 1.63 | 3.05 | 1.17 | 1.90 | 3.42 | 2.04 | 1.61 |
| BFL/G1 | 18.68 | 6.42 | 17.44 | 27.06 | 121.58 | 27.42 | 25.71 | 18.06 | 5.68 | 7.90 |
| BFL/G34 | 12.00 | 12.84 | 1.13 | 0.95 | 103.00 | 8.88 | 4.60 | 4.62 | 12.84 | 18.78 |
| EFL/TL | 1.37 | 1.42 | 1.36 | 1.32 | 1.33 | 1.31 | 1.32 | 1.32 | 1.35 | 1.36 |

FIG.83

| Conditional equation | Eleventh embodiment | Twelfth embodiment | Thirteenth embodiment | Fourteenth embodiment | Fifteenth embodiment | Sixteenth embodiment | Seventeenth embodiment | Eighteenth embodiment | Nineteenth embodiment |
|---|---|---|---|---|---|---|---|---|---|
| T1 | 1.10 | 1.31 | 1.36 | 1.29 | 1.30 | 1.18 | 1.23 | 0.48 | 0.91 |
| G12 | 0.05 | 0.04 | 0.19 | 0.05 | 0.33 | 0.25 | 0.10 | 0.02 | 0.07 |
| T2 | 1.13 | 0.36 | 0.24 | 0.24 | 0.72 | 0.24 | 0.24 | 0.11 | 0.23 |
| G23 | 1.92 | 3.14 | 3.80 | 3.35 | 2.46 | 3.94 | 3.29 | 1.03 | 2.86 |
| T3 | 0.31 | 0.74 | 0.32 | 0.51 | 0.58 | 0.33 | 1.25 | 0.21 | 0.36 |
| G34 | 0.83 | 0.22 | 0.05 | 0.13 | 0.73 | 0.05 | 0.09 | 0.01 | 0.08 |
| T4 | 0.92 | 1.03 | 0.93 | 0.39 | 0.77 | 0.84 | 0.34 | 0.17 | 0.67 |
| G4F | 0.40 | 0.40 | 0.40 | 0.40 | 0.40 | 0.40 | 0.40 | 0.30 | 0.40 |
| TF | 0.21 | 0.21 | 0.21 | 0.21 | 0.21 | 0.21 | 0.21 | 0.21 | 0.21 |
| GFP | 1.14 | 0.52 | 0.50 | 1.42 | 0.50 | 0.50 | 0.85 | 0.26 | 0.51 |
| BFL | 1.75 | 1.13 | 1.11 | 2.03 | 1.11 | 1.11 | 1.46 | 0.77 | 1.12 |
| ALT | 3.46 | 3.44 | 2.85 | 2.43 | 3.37 | 2.58 | 3.05 | 0.96 | 2.16 |
| AAG | 2.80 | 3.40 | 4.04 | 3.53 | 3.52 | 4.23 | 3.48 | 1.07 | 3.02 |
| TL | 6.25 | 6.83 | 6.89 | 5.97 | 6.89 | 6.82 | 6.54 | 2.03 | 5.18 |
| TTL | 8.00 | 7.96 | 8.00 | 8.00 | 8.00 | 7.93 | 8.00 | 2.80 | 6.29 |
| (TTL*Fno)/EFL | 2.20 | 2.20 | 2.18 | 2.20 | 2.20 | 2.20 | 2.20 | 2.20 | 2.20 |
| EFL/T4 | 9.43 | 8.37 | 9.41 | 22.00 | 11.28 | 10.23 | 25.76 | 17.85 | 10.24 |
| G23/T4 | 2.09 | 3.06 | 4.07 | 8.50 | 3.21 | 4.68 | 9.80 | 6.06 | 4.29 |
| AAG/T4 | 3.05 | 3.31 | 4.33 | 8.96 | 4.59 | 5.03 | 10.37 | 6.25 | 4.52 |
| G23/T1 | 1.75 | 2.40 | 2.79 | 2.60 | 1.89 | 3.35 | 2.67 | 2.16 | 3.14 |
| EFL/G23 | 4.50 | 2.74 | 2.31 | 2.59 | 3.51 | 2.19 | 2.63 | 2.94 | 2.38 |
| EFL/T3 | 27.64 | 11.60 | 27.72 | 16.97 | 14.95 | 26.25 | 6.93 | 14.56 | 19.13 |
| EFL/AAG | 3.09 | 2.53 | 2.18 | 2.46 | 2.46 | 2.03 | 2.48 | 2.86 | 2.26 |
| AAG/G12 | 55.95 | 78.00 | 21.63 | 71.15 | 10.79 | 17.16 | 33.25 | 49.24 | 41.30 |
| G23/G12 | 38.40 | 72.00 | 20.37 | 67.51 | 7.56 | 15.96 | 31.41 | 47.77 | 39.21 |
| EFL/ALT | 2.50 | 2.50 | 3.08 | 3.56 | 2.57 | 3.33 | 2.83 | 3.16 | 3.16 |
| G23/T3 | 6.14 | 4.24 | 12.00 | 6.56 | 4.26 | 12.01 | 2.64 | 4.94 | 8.02 |
| AAG/T1 | 2.55 | 2.60 | 2.96 | 2.74 | 2.70 | 3.60 | 2.83 | 2.23 | 3.31 |
| (T3+BFL)/T1 | 1.88 | 1.43 | 1.05 | 1.97 | 1.29 | 1.22 | 2.20 | 2.05 | 1.62 |
| EFL/T2 | 7.64 | 23.65 | 37.30 | 36.53 | 12.00 | 36.33 | 36.32 | 28.96 | 29.91 |
| G23/BFL | 1.10 | 2.78 | 3.43 | 1.65 | 2.22 | 3.55 | 2.25 | 1.34 | 2.57 |
| AAG/T2 | 2.47 | 9.35 | 17.15 | 14.87 | 4.88 | 17.86 | 14.63 | 10.14 | 13.21 |
| ALT/G23 | 1.80 | 1.10 | 0.75 | 0.73 | 1.37 | 0.66 | 0.93 | 0.93 | 0.76 |
| G23/T2 | 1.70 | 8.63 | 16.15 | 14.11 | 3.42 | 16.61 | 13.82 | 9.83 | 12.54 |
| ALT/T1 | 3.16 | 2.63 | 2.09 | 1.89 | 2.58 | 2.20 | 2.48 | 2.01 | 2.38 |

FIG.84

| Conditional equation | Eleventh embodiment | Twelfth embodiment | Thirteenth embodiment | Fourteenth embodiment | Fifteenth embodiment | Sixteenth embodiment | Seventeenth embodiment | Eighteenth embodiment | Nineteenth embodiment |
|---|---|---|---|---|---|---|---|---|---|
| T3/G12 | 6.25 | 17.00 | 1.70 | 10.30 | 1.78 | 1.33 | 11.92 | 9.66 | 4.89 |
| T2/G12 | 22.64 | 8.34 | 1.26 | 4.78 | 2.21 | 0.96 | 2.27 | 4.86 | 3.13 |
| T1/G12 | 21.90 | 30.00 | 7.30 | 26.01 | 4.00 | 4.77 | 11.76 | 22.09 | 12.47 |
| EFL/G12 | 172.88 | 197.24 | 47.05 | 174.75 | 26.54 | 34.90 | 82.57 | 140.66 | 93.50 |
| EFL/T1 | 7.89 | 6.57 | 6.44 | 6.72 | 6.63 | 7.32 | 7.02 | 6.37 | 7.50 |
| T1/T3 | 3.50 | 1.76 | 4.30 | 2.53 | 2.25 | 3.59 | 0.99 | 2.29 | 2.55 |
| T1/T4 | 1.19 | 1.27 | 1.46 | 3.27 | 1.70 | 1.40 | 3.67 | 2.80 | 1.37 |
| T3/T2 | 0.28 | 2.04 | 1.35 | 2.15 | 0.80 | 1.38 | 5.24 | 1.99 | 1.56 |
| T4/T3 | 2.93 | 1.39 | 2.94 | 0.77 | 1.33 | 2.57 | 0.27 | 0.82 | 1.87 |
| G34/G12 | 16.55 | 5.00 | 0.26 | 2.63 | 2.24 | 0.20 | 0.84 | 0.48 | 1.09 |
| G23/G34 | 2.32 | 14.40 | 77.91 | 25.65 | 3.38 | 79.30 | 37.28 | 100.26 | 35.89 |
| AAG/G23 | 1.46 | 1.08 | 1.06 | 1.05 | 1.43 | 1.08 | 1.06 | 1.03 | 1.05 |
| AAG/G34 | 3.38 | 15.60 | 82.73 | 27.03 | 4.83 | 85.27 | 39.46 | 103.36 | 37.81 |
| ALT/T2 | 3.05 | 9.46 | 12.10 | 10.25 | 4.68 | 10.90 | 12.82 | 9.16 | 9.47 |
| ALT/T3 | 11.05 | 4.64 | 8.99 | 4.76 | 5.83 | 7.88 | 2.45 | 4.60 | 6.06 |
| ALT/T4 | 3.77 | 3.35 | 3.05 | 6.17 | 4.40 | 3.07 | 9.09 | 5.65 | 3.24 |
| T1/G34 | 1.32 | 6.00 | 27.94 | 9.88 | 1.79 | 23.69 | 13.96 | 46.37 | 11.41 |
| G34/T2 | 0.73 | 0.60 | 0.21 | 0.55 | 1.01 | 0.21 | 0.37 | 0.10 | 0.35 |
| G34/T3 | 2.65 | 0.29 | 0.15 | 0.26 | 1.26 | 0.15 | 0.07 | 0.05 | 0.22 |
| T4/G12 | 18.33 | 23.56 | 5.00 | 7.94 | 2.35 | 3.41 | 3.21 | 7.88 | 9.13 |
| G34/T4 | 0.90 | 0.21 | 0.05 | 0.33 | 0.95 | 0.06 | 0.26 | 0.06 | 0.12 |
| ALT/G34 | 4.18 | 15.78 | 58.38 | 18.63 | 4.63 | 52.02 | 34.60 | 93.39 | 27.11 |
| EFL/G34 | 10.45 | 39.44 | 179.99 | 66.39 | 11.87 | 173.40 | 98.00 | 295.25 | 85.60 |
| BFL/T1 | 1.59 | 0.86 | 0.81 | 1.57 | 0.85 | 0.94 | 1.19 | 1.61 | 1.23 |
| BFL/T2 | 1.54 | 3.11 | 4.71 | 8.56 | 1.54 | 4.68 | 6.14 | 7.34 | 4.89 |
| BFL/T3 | 5.58 | 1.52 | 3.50 | 3.98 | 1.92 | 3.38 | 1.17 | 3.69 | 3.13 |
| BFL/T4 | 1.91 | 1.10 | 1.19 | 5.16 | 1.45 | 1.32 | 4.35 | 4.52 | 1.67 |
| BFL/G1 | 34.93 | 25.90 | 5.94 | 40.95 | 3.41 | 4.50 | 13.95 | 35.63 | 15.28 |
| BFL/G34 | 2.11 | 5.18 | 22.73 | 15.56 | 1.52 | 22.35 | 16.55 | 74.79 | 13.99 |
| EFL/TL | 1.43 | 1.27 | 1.37 | 1.28 | 1.41 | 1.31 | 1.61 | 1.44 | 1.36 |

FIG.85

OPTICAL LENS ASSEMBLY

CROSS-REFERENCE TO RELATED APPLICATION

This application is a continuation application of and claims the priority benefit of U.S. application Ser. No. 15/144,837, filed on May 3, 2016, which claims the priority benefit of Chinese application serial no. 201610157010.5, filed on Mar. 18, 2016. The entirety of each of the above-mentioned patent applications is hereby incorporated by reference herein and made a part of this specification.

BACKGROUND OF THE INVENTION

Field of the Invention

The invention relates to a lens assembly; more particularly, the invention relates to an optical lens assembly.

Description of Related Art

The specification of portable electronic products (e.g., mobile phones, cameras, tablet PCs, personal digital assistants, and automotive cameras) is ever-changing, and the key components of the portable electronic products, i.e., optical lens assemblies, have been developed diversely. The optical lens assembly not only can be applied to take images and record video clips but also can be installed in a dashboard camera or employed for environmental surveillance. As image sensing technology advances, consumers' demands for image quality also increase. The dimension of a conventional micro telescopic lens assembly exceeds 50 millimeters (mm), and f-number (Fno) is up to 4 or more, which apparently cannot meet the standard of the existing portable electronic products. Hence, favorable image quality and small size should be taken into account when designing the optical lens assembly for telescope, and the requirement for the increased size of the aperture stop should also be considered.

However, simply scaling down an optical lens assembly with the favorable image quality does not guarantee the subsequent manufacture of the optical lens assembly characterized by favorable image quality and microminiaturization. The design process involves considerations of material characteristics and practical issues including manufacture and assembly yield, and the optical lens assembly should be designed in consideration of the design of a camera module at the application end. As such, the technical barrier of the micro optical lens assembly is apparently higher than that of the conventional optical lens assembly. Hence, how to produce an optical lens assembly that complies with the requirements for consumer electronic products and features the improved image quality has always been a concern of industry, government, and academia.

SUMMARY OF THE INVENTION

The invention provides an optical lens assembly suitable for being applied in a telescopic optical lens assembly with a large aperture stop.

An embodiment of the invention provides an optical lens assembly that includes a first lens element, a second lens element, a third lens element, and a fourth lens element in order from an object side to an image side along an optical axis. Each of the first lens element to the fourth lens element includes an object-side surface that faces the object side and allows an imaging ray to pass through and an image-side surface that faces image side and allows the imaging ray to pass through. The object-side surface of the first lens element has a convex portion in a vicinity of a periphery. The second lens element has negative refracting power. The object-side surface of the third lens element has a concave portion in a vicinity of a periphery. The image-side surface of the fourth lens element has a convex portion in a vicinity of a periphery. The optical lens assembly satisfies: (TTL× Fno)/EFL≤2.2, 2.8 mm≤TTL≤8 mm, and HFOV≤25°, wherein TTL is a distance from the object-side surface of the first lens element to an image plane at the image side along the optical axis, Fno is an f-number of the optical lens assembly, EFL is an effective focal length of the optical lens assembly, and HFOV is a half field of view of the optical lens assembly.

The invention also provides another optical lens assembly with an improved ability to take photographs of a distant object.

An embodiment of the invention provides an optical lens assembly that includes a first lens element, a second lens element, a third lens element, and a fourth lens element in order from an object side to an image side along an optical axis. Each of the first lens element to the fourth lens element includes an object-side surface that faces the object side and allows an imaging ray to pass through and an image-side surface that faces image side and allows the imaging ray to pass through. The object-side surface of the first lens element has a convex portion in a vicinity of a periphery. The second lens element has negative refracting power. The object-side surface of the third lens element has a concave portion in a vicinity of a periphery. The image-side surface of the fourth lens element has a convex portion in a vicinity of a periphery. The optical lens assembly satisfies: (TTL× Fno)/EFL≤2.2, 2.8 mm≤TTL≤8 mm, and 2.5≤EFL/ALT≤4.75, wherein TTL is a distance from the object-side surface of the first lens element to an image plane at the image side along the optical axis, Fno is an f-number of the optical lens assembly, EFL is an effective focal length of the optical lens assembly, and ALT a sum of a thickness of the first lens element along the optical axis, a thickness of the second lens element along the optical axis, a thickness of the third lens element along the optical axis, and a thickness of the fourth lens element along the optical axis.

In view of the above, the optical lens assembly described herein brings certain advantageous effects. For instance, with the concave and convex shape design and the arrangement of the object-side surface or the image-side surface of the lens elements, the system length of the optical lens assembly can be reduced, and the resultant optical lens assembly can act as a telescopic optical lens assembly with a large aperture stop or can have the enhanced ability to take photographs of a distant object.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic view illustrating an optical lens assembly according to a first embodiment of the invention.

FIG. 7A to FIG. 7D illustrate a longitudinal spherical aberration and other aberrations of the optical lens assembly according to the first embodiment of the invention.

FIG. 8 shows detailed optical data pertaining to the optical lens assembly according to the first embodiment of the invention.

FIG. 9 shows aspheric parameters pertaining to the optical lens assembly according to the first embodiment of the invention.

FIG. 10 is a schematic view illustrating an optical lens assembly according to a second embodiment of the invention.

FIG. 11A to FIG. 11D illustrate longitudinal spherical aberration and other aberrations of the optical lens assembly according to the second embodiment of the invention.

FIG. 12 shows detailed optical data pertaining to the optical lens assembly according to the second embodiment of the invention.

FIG. 13 shows aspheric parameters pertaining to the optical lens assembly according to the second embodiment of the invention.

FIG. 14 is a schematic view illustrating an optical lens assembly according to a third embodiment of the invention.

FIG. 15A to FIG. 15D illustrate a longitudinal spherical aberration and other aberrations of the optical lens assembly according to the third embodiment of the invention.

FIG. 16 shows detailed optical data pertaining to the optical lens assembly according to the third embodiment of the invention.

FIG. 17 shows aspheric parameters pertaining to the optical lens assembly according to the third embodiment of the invention.

FIG. 18 is a schematic view illustrating an optical lens assembly according to a fourth embodiment of the invention.

FIG. 19A to FIG. 19D illustrate a longitudinal spherical aberration and other aberrations of the optical lens assembly according to the fourth embodiment of the invention.

FIG. 20 shows detailed optical data pertaining to the optical lens assembly according to the fourth embodiment of the invention.

FIG. 21 shows aspheric parameters pertaining to the optical lens assembly according to the fourth embodiment of the invention.

FIG. 24 shows detailed optical data pertaining to the optical lens assembly according to the fifth embodiment of the invention.

FIG. 25 shows aspheric parameters pertaining to the optical lens assembly according to the fifth embodiment of the invention.

FIG. 26 is a schematic view illustrating an optical lens assembly according to a sixth embodiment of the invention.

FIG. 27A to FIG. 27D illustrate a longitudinal spherical aberration and other aberrations of the optical lens assembly according to the sixth embodiment of the invention.

FIG. 28 shows detailed optical data pertaining to the optical lens assembly according to the sixth embodiment of the invention.

FIG. 29 shows aspheric parameters pertaining to the optical lens assembly according to the sixth embodiment of the invention.

FIG. 30 is a schematic view illustrating an optical lens assembly according to a seventh embodiment of the invention.

FIG. 31A to FIG. 31D illustrate a longitudinal spherical aberration and other aberrations of the optical lens assembly according to the seventh embodiment of the invention.

FIG. 32 shows detailed optical data pertaining to the optical lens assembly according to the seventh embodiment of the invention.

FIG. 33 shows aspheric parameters pertaining to the optical lens assembly according to the seventh embodiment of the invention.

FIG. 36 shows detailed optical data pertaining to the optical lens assembly according to the eighth embodiment of the invention.

FIG. 37 shows aspheric parameters pertaining to the optical lens assembly according to the eighth embodiment of the invention.

FIG. 38 is a schematic view illustrating an optical lens assembly according to a ninth embodiment of the invention.

FIG. 39A to FIG. 39D illustrate a longitudinal spherical aberration and other aberrations of the optical lens assembly according to the ninth embodiment of the invention.

FIG. 40 shows detailed optical data pertaining to the optical lens assembly according to the ninth embodiment of the invention.

FIG. 41 shows aspheric parameters pertaining to the optical lens assembly according to the ninth embodiment of the invention.

FIG. 42 is a schematic view illustrating an optical lens assembly according to a tenth embodiment of the invention.

FIG. 43A to FIG. 43D illustrate a longitudinal spherical aberration and other aberrations of the optical lens assembly according to the tenth embodiment of the invention.

FIG. 44 shows detailed optical data pertaining to the optical lens assembly according to the tenth embodiment of the invention.

FIG. 45 shows aspheric parameters pertaining to the optical lens assembly according to the tenth embodiment of the invention.

FIG. 46 is a schematic view illustrating an optical lens assembly according to an eleventh embodiment of the invention.

FIG. 47A to FIG. 47D illustrate a longitudinal spherical aberration and other aberrations of the optical lens assembly according to the eleventh embodiment of the invention.

FIG. 48 shows detailed optical data pertaining to the optical lens assembly according to the eleventh embodiment of the invention.

FIG. 49 shows aspheric parameters pertaining to the optical lens assembly according to the eleventh embodiment of the invention.

FIG. 50 is a schematic view illustrating an optical lens assembly according to a twelfth embodiment of the invention.

FIG. 51A to FIG. 51D illustrate a longitudinal spherical aberration and other aberrations of the optical lens assembly according to the twelfth embodiment of the invention.

FIG. 52 shows detailed optical data pertaining to the optical lens assembly according to the twelfth embodiment of the invention.

FIG. 53 shows aspheric parameters pertaining to the optical lens assembly according to the twelfth embodiment of the invention.

FIG. 54 is a schematic view illustrating an optical lens assembly according to a thirteenth embodiment of the invention.

FIG. 55A to FIG. 55D illustrate a longitudinal spherical aberration and other aberrations of the optical lens assembly according to the thirteenth embodiment of the invention.

FIG. 56 shows detailed optical data pertaining to the optical lens assembly according to the thirteenth embodiment of the invention.

FIG. 57 shows aspheric parameters pertaining to the optical lens assembly according to the thirteenth embodiment of the invention.

FIG. 58 is a schematic view illustrating an optical lens assembly according to a fourteenth embodiment of the invention.

FIG. 59A to FIG. 59D illustrate a longitudinal spherical aberration and other aberrations of the optical lens assembly according to the fourteenth embodiment of the invention.

FIG. 60 shows detailed optical data pertaining to the optical lens assembly according to the fourteenth embodiment of the invention.

FIG. 61 shows aspheric parameters pertaining to the optical lens assembly according to the fourteenth embodiment of the invention.

FIG. 62 is a schematic view illustrating an optical lens assembly according to a fifteenth embodiment of the invention.

FIG. 63A to FIG. 63D illustrate a longitudinal spherical aberration and other aberrations of the optical lens assembly according to the fifteenth embodiment of the invention.

FIG. 64 shows detailed optical data pertaining to the optical lens assembly according to the fifteenth embodiment of the invention.

FIG. 65 shows aspheric parameters pertaining to the optical lens assembly according to the fifteenth embodiment of the invention.

FIG. 66 is a schematic view illustrating an optical lens assembly according to a sixteenth embodiment of the invention.

FIG. 67A to FIG. 67D illustrate a longitudinal spherical aberration and other aberrations of the optical lens assembly according to the sixteenth embodiment of the invention.

FIG. 68 shows detailed optical data pertaining to the optical lens assembly according to the sixteenth embodiment of the invention.

FIG. 69 shows aspheric parameters pertaining to the optical lens assembly according to the sixteenth embodiment of the invention.

FIG. 70 is a schematic view illustrating an optical lens assembly according to a seventeenth embodiment of the invention.

FIG. 71A to FIG. 71D illustrate a longitudinal spherical aberration and other aberrations of the optical lens assembly according to the seventeenth embodiment of the invention.

FIG. 72 shows detailed optical data pertaining to the optical lens assembly according to the seventeenth embodiment of the invention.

FIG. 73 shows aspheric parameters pertaining to the optical lens assembly according to the seventeenth embodiment of the invention.

FIG. 74 is a schematic view illustrating an optical lens assembly according to an eighteenth embodiment of the invention.

FIG. 75A to FIG. 75D illustrate a longitudinal spherical aberration and other aberrations of the optical lens assembly according to the eighteenth embodiment of the invention.

FIG. 76 shows detailed optical data pertaining to the optical lens assembly according to the eighteenth embodiment of the invention.

FIG. 77 shows aspheric parameters pertaining to the optical lens assembly according to the eighteenth embodiment of the invention.

FIG. 78 is a schematic view illustrating an optical lens assembly according to a nineteenth embodiment of the invention.

FIG. 79A to FIG. 79D illustrate a longitudinal spherical aberration and other aberrations of the optical lens assembly according to the nineteenth embodiment of the invention.

FIG. 80 shows detailed optical data pertaining to the optical lens assembly according to the nineteenth embodiment of the invention.

FIG. 81 shows aspheric parameters pertaining to the optical lens assembly according to the nineteenth embodiment of the invention.

FIG. 82 and FIG. 83 show crucial parameters of the optical lens assembly provided in the first embodiment to the tenth embodiment and values of the relationship among the crucial parameters.

FIG. 84 and FIG. 85 show crucial parameters of the optical lens assembly provided in the eleventh embodiment to the nineteenth embodiment and values of the relationship among the crucial parameters.

DETAILED DESCRIPTION OF DISCLOSED EMBODIMENTS

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
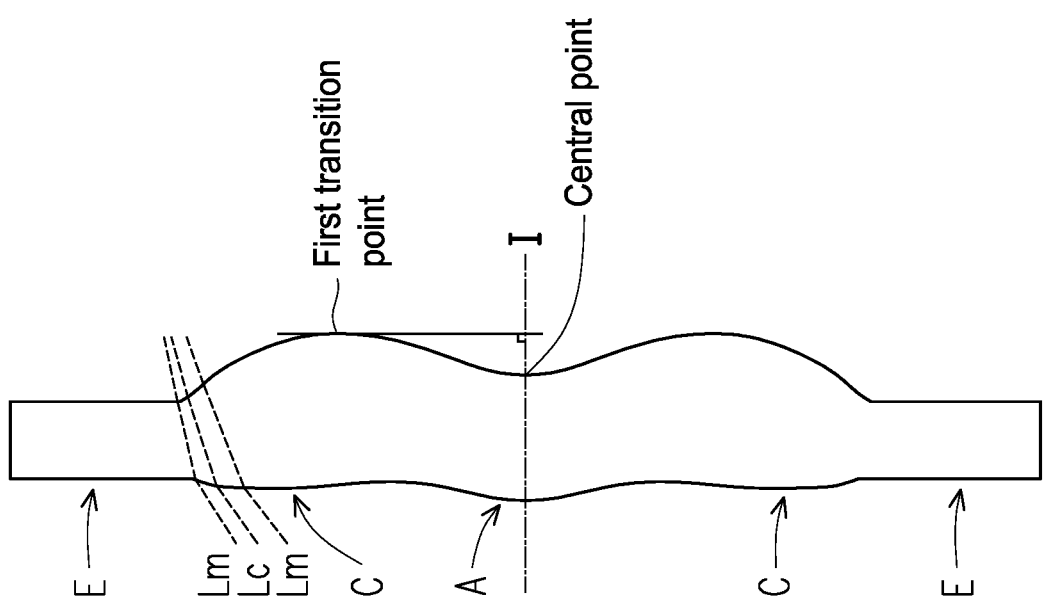
FIG. 1 is a schematic view illustrating a surface structure of a lens element.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
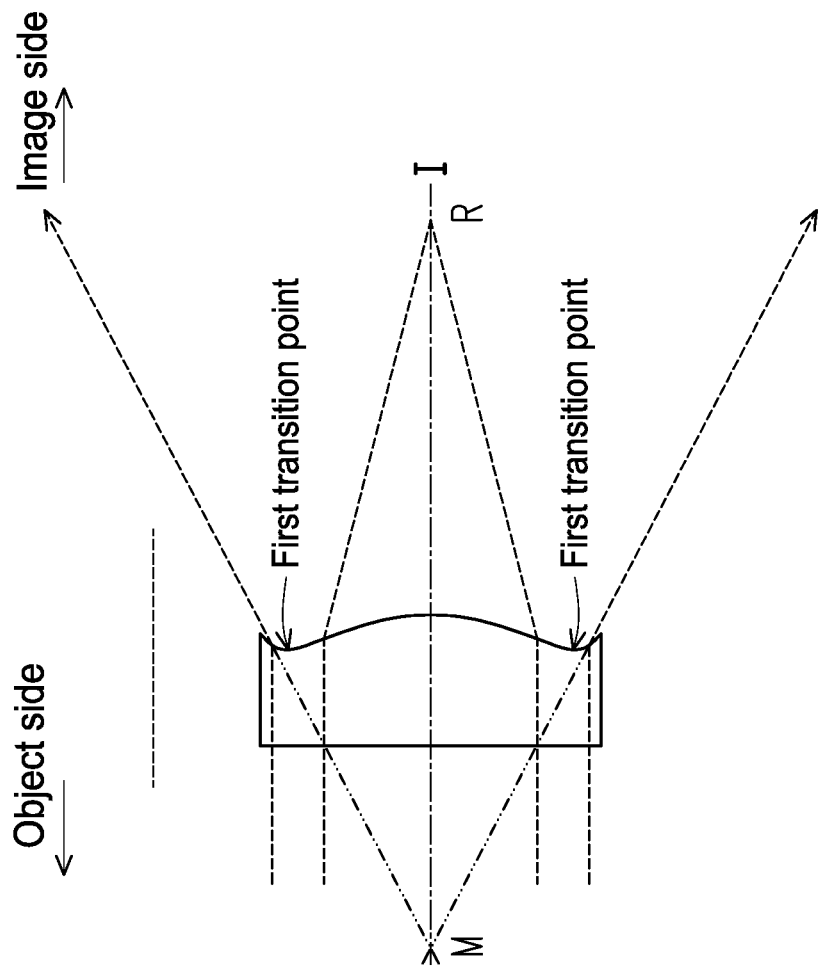
FIG. 2 is a schematic view illustrating a concave and convex surface structure of a lens element and a focus of a ray.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Figure 3:
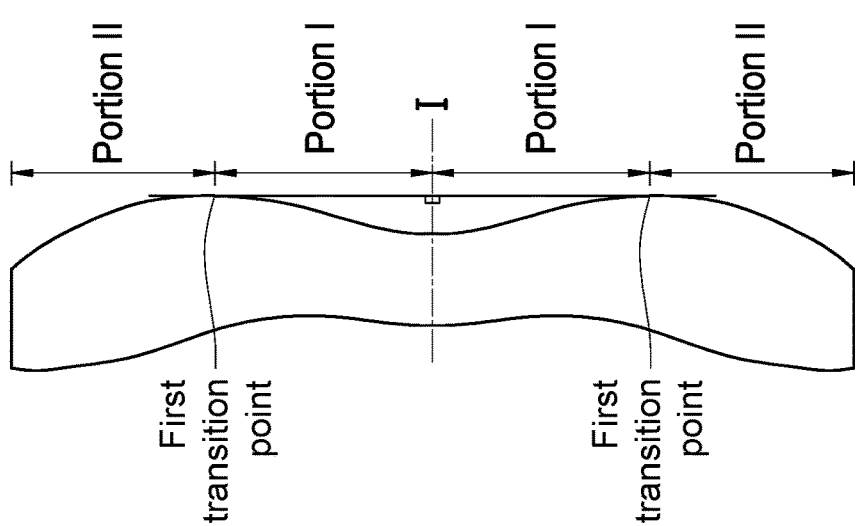
FIG. 3 is a schematic view illustrating a surface structure of a lens element according to an example 1.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Figure 4:
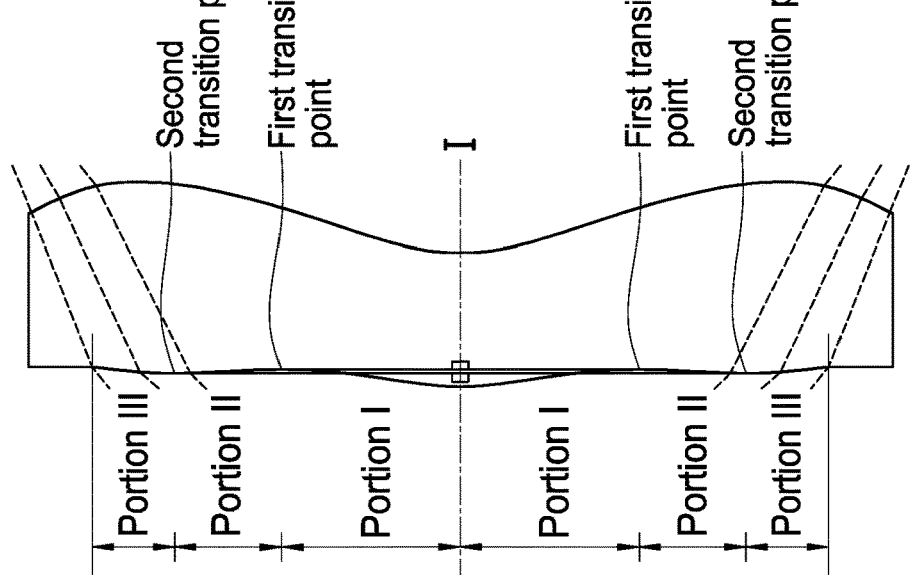
FIG. 4 is a schematic view illustrating a surface structure of a lens element according to an example 2.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Figure 5:
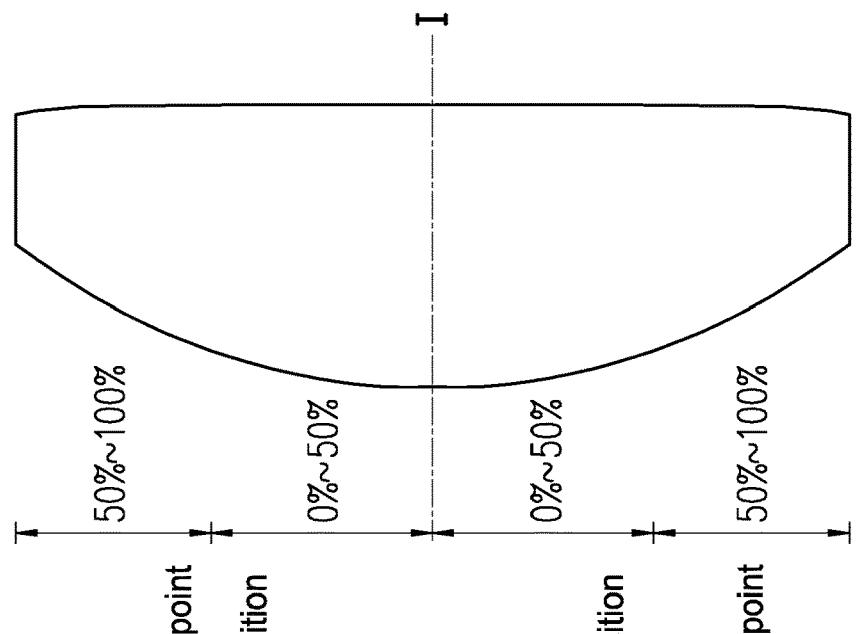
FIG. 5 is a schematic view illustrating a surface structure of a lens element according to an example 3.

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic view illustrating an optical lens assembly according to a first embodiment of the invention.

FIG. 7A to FIG. 7D illustrate a longitudinal spherical aberration and other aberrations of the optical lens assembly according to the first embodiment of the invention. With reference to FIG. 6, the optical lens assembly 10 provided in the first embodiment includes an aperture stop 2, a first lens element 3, a second lens element 4, a third lens element 5, a fourth lens element 6, and a filter 9 arranged in order from an object side to an image side along an optical axis I of the optical lens assembly 10. When a ray emitted from an object to be shot enters the optical lens assembly 10 and passes through the aperture stop 2, the first lens element 3, the second lens element 4, the third lens element 5, the fourth lens element 6, and the filter 9, an image is formed on an image plane 100. The filter 9, for example, is an infrared cut filter (IR cut filter) configured to prevent the infrared ray at part of the waveband of the ray from being transmitted to the image plane 100 and deteriorating the image quality. It should be added that the object side is a side facing the object to be shot, and the image side is a side facing the image plane 100. In the first embodiment, the optical lens assembly is constituted by four lens elements, for instance.

Each of the first lens element 3, the second lens element 4, the third lens element 5, the fourth lens element 6, and the filter 9 has an object-side surface 31, 41, 51, 61, 71, or 91 that faces the object side and allows an imaging ray to pass through and an image-side surface 32, 42, 52, 62, 72, or 92 that faces the image side and allows the imaging ray to pass through.

The first lens element 3 has positive refracting power. The object-side surface 31 of the first lens element 3 is a convex surface and has a convex portion 311 in the vicinity of the optical axis I and a convex portion 312 in the vicinity of the periphery. The image-side surface 32 of the first lens element 3 is a convex surface and has a convex portion 321 in the vicinity of the optical axis I and a convex portion 322 in the vicinity of the periphery. In the first embodiment, the object-side surface 31 and the image-side surface 32 of the first lens element 3 are both aspheric surfaces.

The second lens element 4 has negative refracting power. The object-side surface 41 of the second lens element 4 is a convex surface and has a convex portion 411 in the vicinity of the optical axis I and a convex portion 412 in the vicinity of the periphery. The image-side surface 42 of the second lens element 4 is a concave surface and has a concave portion 421 in the vicinity of the optical axis I and a concave portion 422 in the vicinity of the periphery. In the first embodiment, the object-side surface 41 and the image-side surface 42 of the second lens element 4 are both aspheric surfaces.

The third lens element 5 has positive refracting power. The object-side surface 51 of the third lens element 5 is a concave surface and has a concave portion 511 in the vicinity of the optical axis I and a concave portion 512 in the vicinity of the periphery. The image-side surface 52 of the third lens element 5 has a convex portion 521 in the vicinity of the optical axis I and a convex portion 522 in the vicinity of the periphery. In the first embodiment, the object-side surface 51 and the image-side surface 52 of the third lens element 5 are both aspheric surfaces.

The fourth lens element 6 has negative refracting power. The object-side surface 61 of the fourth lens element 6 is a concave surface and has a concave portion 611 in the vicinity of the optical axis I and a concave portion 612 in the vicinity of the periphery. The image-side surface 62 of the fourth lens element 6 has a concave portion 621 in the vicinity of the optical axis I and a convex portion 622 in the vicinity of the periphery. In the first embodiment, the object-side surface 61 and the image-side surface 62 of the fourth lens element 6 are both aspheric surfaces.

The detailed optical data in the first embodiment are provided in FIG. 8. In the first embodiment, an effective focal length (EFL) of the optical lens assembly 10 is 7.069 mm; the half field of view (HFOV) of the optical lens assembly 10 is 18.741°; the f-number (Fno) of the optical lens assembly 10 is 2.400; the system length of the optical lens assembly 10 is 6.383 mm, and the image height of the optical lens assembly 10 is 2.400 mm. Here, the system length refers to a distance from the object-side surface 31 of the first lens element 3 to the image plane 100 along the optical axis I.

In addition, in the first embodiment, all of the eight surfaces, i.e., the object-side surfaces 31, 41, 51, and 61 and the image-side surfaces 32, 42, 52, and 62 of the first lens element 3, the second lens element 4, the third lens element 5, and the fourth lens element 6 are aspheric surfaces. The aspheric surfaces are defined by the following formula.

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \tag{1}$$

wherein

Y: a distance from a point on an aspheric curve to the optical axis I;

Z: a depth of the aspheric surface (a vertical distance between the point on the aspheric surface that is spaced from the optical axis I by the distance Y and a tangent plane tangent to a vertex of the aspheric surface on the optical axis I);

R: a radius of curvature of the surface of the lens element close to the optical axis I;

K: a conic constant;

$a_i$: the $i^{th}$ aspheric coefficient.

The aspheric coefficients of the object-side surface 31 of the first lens element 3 to the image-side surface 62 of the fourth lens element 6 in the formula (1) are indicated in FIG. 9. In FIG. 9, the referential number 31 in one column represents the aspheric coefficient of the object-side surface 31 of the first lens element 3, and the reference numbers in other columns can be deduced from the above.

In addition, the relationship among the crucial parameters pertaining to the optical lens assembly 10 in the first embodiment is indicated in FIG. 82 and FIG. 83, wherein T1 represents the thickness of the first lens element 3 along the optical axis I;

T2 represents the thickness of the second lens element 4 along the optical axis I;

T3 represents the thickness of the third lens element 5 along the optical axis I;

T4 represents the thickness of the fourth lens element 6 along the optical axis I;

G12 represents the distance from the first lens element 3 to the second lens element 4 along the optical axis I;

G23 represents the distance from the second lens element 4 to the third lens element 5 along the optical axis I;

G34 represents the distance from the third lens element 5 to the fourth lens element 6 along the optical axis I;

AAG represents a sum of the distance from the first lens element 3 to the second lens element 4 along the optical axis I, the distance from the second lens element 4 to the third lens element 5 along the optical axis I, and the distance from the third lens element 5 to the fourth lens element 6 along the optical axis I, i.e., the sum of G12, G23, and G34;

ALT represents a sum of the thickness of the first lens element 3, the thickness of the second lens element 4, the thickness of the third lens element 5, and the thickness of the fourth lens element 6 along the optical axis I, i.e., the sum of T1, T2, T3, and T4;

TL represents the distance from the object-side surface 31 of the first lens element 3 to the image-side surface 62 of the fourth lens element 6 along the optical axis I;

TTL represents the distance from the object-side surface 31 of the first lens element 3 to the image plane 100 along the optical axis I;

BFL represents the distance from the image-side surface 62 of the fourth lens element 6 to the image plane 100 along the optical axis I;

EFL represents an effective focal length of the optical lens assembly 10.

Besides, it is further defined that:

G4 F represents an air gap from the fourth lens element 6 to the filter 9 along the optical axis I;

TF represents the thickness of the filter 9 along the optical axis I;

GFP represents an air gap from the filter 9 to the image plane 100 along the optical axis I;

f1 is a focal length of the first lens element 3;
f2 is a focal length of the second lens element 4;
f3 is a focal length of the third lens element 5;
f4 is a focal length of the fourth lens element 6;
n1 is a refractive index of the first lens element 3;
n2 is a refractive index of the second lens element 4;
n3 is a refractive index of the third lens element 5;
n4 is a refractive index of the fourth lens element 6;
ν1 is an Abbe number of the first lens element 3, and the Abbe number may also be referred to as a dispersion coefficient;
ν2 is an Abbe number of the second lens element 4;
ν3 is an Abbe number of the third lens element 5;
ν4 is an Abbe number of the fourth lens element 6.

With reference to FIG. 7A to FIG. 7D, FIG. 7A illustrates the longitudinal spherical aberration described in the first embodiment. FIG. 7B and FIG. 7C respectively illustrate field curvature aberration in a sagittal direction on the image plane 100 and field curvature aberration in a tangential direction on the image plane 100 in the first embodiment. FIG. 7D illustrates distortion aberration on the image plane 100 in the first embodiment. In FIG. 7A which illustrates the longitudinal spherical aberration in the first embodiment, the measurement is made on the condition that the pupil radius is 1.4729 mm, the curve of each representative wavelength (e.g., 470 nm, 555 nm, and 650 nm) is close to one another and approaches the center position, which indicates that the off-axis ray of each representative wavelength at different heights is concentrated around the imaging point. The skew margin of the curve of each representative wavelength indicates that the imaging point deviation of the off-axis ray at different heights is controlled within a range of ±0.009 mm. Hence, it is evident that the spherical aberration of the same wavelength can be significantly improved according to the first embodiment. In addition, the curves of the three representative wavelengths are close to one another, which indicates that the imaging positions of the rays with different wavelengths are rather concentrated; therefore, the chromatic aberration can be significantly improved as well.

In FIG. 7B and FIG. 7C which illustrate two diagrams of field curvature aberrations, the focal length variation of the three representative wavelengths within the entire field of view falls within the range of ±0.25 mm, which indicates that aberration of the optical system provided in the first embodiment can be effectively eliminated. In FIG. 7D, the diagram of distortion aberration shows that the distortion aberration in the first embodiment can be maintained within the range of ±0.8%, which indicates that the distortion aberration in the first embodiment can comply with the image quality requirement of the optical system. Accordingly, compared to the existing optical lens assembly, the optical lens assembly provided in the first embodiment can have the favorable image quality, given that the system length of the optical lens assembly is shortened to about 6.383 mm. As a result, according to the first embodiment, the Fno can be reduced (i.e., the aperture stop can be increased), the length of the optical lens assembly can be shortened, and the shooting angle can be increased without sacrificing the optical properties, and thereby the slim design of product with the broadened view angle can be realized.

FIG. 10 is a schematic view illustrating an optical lens assembly according to a second embodiment of the invention, and FIG. 11A to FIG. 11D illustrate a longitudinal spherical aberration and other aberrations of the optical lens assembly according to the second embodiment of the invention. With reference to FIG. 10, the optical lens assembly 10 provided in the second embodiment is similar to that provided in the first embodiment, while the optical data, the aspheric coefficients, and the parameters of the lens elements 3, 4, 5, and 6 in these two embodiments are different to some extent. Other differences lie in that the third lens element 5 has negative refractive power, the image-side surface 52 of the third lens element 5 has a concave portion 523 in the vicinity of the optical axis I and a convex portion 522 in the vicinity of the periphery. The fourth lens element 6 has positive refractive power, and the object-side surface 61 of the fourth lens element 6 has a convex portion 613 in the vicinity of the optical axis I and a concave portion 612 in the vicinity of the periphery. For clear illustration, it should be mentioned that the same reference numbers of the concave portions and the convex portions in the two embodiments are omitted from FIG. 10.

The detailed optical data in the second embodiment are provided in FIG. 12. In the second embodiment, the EFL of the optical lens assembly 10 is 7.069 mm; the HFOV of the optical lens assembly 10 is 18.741°; the Fno of the optical lens assembly 10 is 2.389; the system length of the optical lens assembly 10 is 6.382 mm, and the image height of the optical lens assembly 10 is 2.400 mm.

The aspheric coefficients of the object-side surface 31 of the first lens element 3 to the image-side surface 62 of the fourth lens element 6 in the formula (1) are indicated in FIG. 13 according to the second embodiment.

In addition, the relationship among the crucial parameters pertaining to the optical lens assembly 10 in the second embodiment is indicated in FIG. 82 and FIG. 83.

In FIG. 11A which illustrates the longitudinal spherical aberration in the second embodiment, the measurement is made on the condition that the pupil radius is 1.4729 mm, and the imaging point deviation of the off-axis ray at different heights is controlled within a range of ±0.008 mm. In FIG. 11B and FIG. 11C which illustrate two diagrams of field curvature aberrations, the focal length variation of the three representative wavelengths within the entire field of view falls within the range of ±0.04 mm. In FIG. 11D, the diagram of distortion aberration shows that the distortion aberration in the second embodiment can be maintained within the range of ±0.8%. Accordingly, compared to the existing optical lens assembly, the optical lens assembly provided in the second embodiment can have the favorable image quality, given that the system length of the optical lens assembly is shortened to about 6.382 mm.

According to the above description, the optical lens assembly 10 exemplified in the second embodiment is superior to that exemplified in the first embodiment to some extent. Specifically, the system length provided in the second embodiment is shorter than that provided in the first embodiment, the Fno provided in the second embodiment is smaller than that provided in the first embodiment, the range of the longitudinal spherical aberration provided in the second embodiment is smaller than that provided in the first embodiment, the range of field curvature aberration in the sagittal direction in the second embodiment is smaller than that in the first embodiment, and the optical lens assembly provided in the second embodiment is easier to be fabricated and thus has a higher yield than that provided in the first embodiment.

FIG. 14 is a schematic view illustrating an optical lens assembly according to a third embodiment of the invention, and FIG. 15A to FIG. 15D illustrate a longitudinal spherical aberration and other aberrations of the optical lens assembly according to the third embodiment of the invention. With reference to FIG. 14, the optical lens assembly 10 provided in the second embodiment is similar to that provided in the first embodiment, while the optical data, the aspheric coefficients, and the parameters of the lens elements 3, 4, 5, and 6 in these two embodiments are different to some extent. Other differences lie in that the object-side surface 41 of the second lens element 4 has a concave portion 413 in the vicinity of the optical axis I and a convex portion 412 in the vicinity of the periphery. The third lens element 5 has negative refracting power. The image-side surface 62 of the fourth lens element 6 is a convex surface and has a convex portion 623 in the vicinity of the optical axis I and a convex portion 622 in the vicinity of the periphery. For clear illustration, it should be mentioned that the same reference numbers of the concave portions and the convex portions in the two embodiments are omitted from FIG. 14.

The detailed optical data and the crucial parameters of the optical lens assembly in the third embodiment are provided in FIG. 16. In the third embodiment, the EFL of the optical lens assembly 10 is 7.018 mm; the HFOV of the optical lens assembly 10 is 18.913°; the Fno of the optical lens assembly 10 is 2.381; the system length of the optical lens assembly 10 is 6.396 mm, and the image height of the optical lens assembly 10 is 2.400 mm.

The aspheric coefficients of the object-side surface 31 of the first lens element 3 to the image-side surface 62 of the fourth lens element 6 in the formula (1) are indicated in FIG. 17 according to the third embodiment.

In addition, the relationship among the crucial parameters pertaining to the optical lens assembly 10 in the third embodiment is indicated in FIG. 82 and FIG. 83.

In FIG. 15A which illustrates the longitudinal spherical aberration in the third embodiment, the measurement is made on the condition that the pupil radius is 1.4729 mm, and the imaging point deviation of the off-axis ray at different heights is controlled within a range of ±0.017 mm. In FIG. 15B and FIG. 15C which illustrate two diagrams of field curvature aberrations, the focal length variation of the three representative wavelengths within the entire field of view falls within the range of ±0.21 mm. In FIG. 15D, the diagram of distortion aberration shows that the distortion aberration in the third embodiment can be maintained within the range of ±0.65%. Accordingly, compared to the existing optical lens assembly, the optical lens assembly provided in the third embodiment can have the favorable image quality, given that the system length of the optical lens assembly is shortened to about 6.396 mm.

According to the above description, the optical lens assembly 10 exemplified in the third embodiment is superior to that exemplified in the first embodiment to some extent. Specifically, the Fno provided in the third embodiment is smaller than that provided in the first embodiment, the HFOV provided in the third embodiment is greater than that provided in the first embodiment, the range of field curvature aberration in the sagittal direction in the third embodiment is smaller than the range of field curvature aberration in the tangential direction in the first embodiment, the range of field curvature aberration in the tangential direction in the third embodiment is smaller than the range of field curvature aberration in the tangential direction in the first embodiment, and the image distortion provided in the third embodiment is less significant than that provided in the first embodiment.

FIG. 18 is a schematic view illustrating an optical lens assembly according to a fourth embodiment of the invention, and FIG. 19A to FIG. 19D illustrate a longitudinal spherical aberration and other aberrations of the optical lens assembly according to the fourth embodiment of the invention. With reference to FIG. 18, the optical lens assembly 10 provided in the fourth embodiment is similar to that provided in the first embodiment, while the optical data, the aspheric coefficients, and the parameters of the lens elements 3, 4, 5, and 6 in these two embodiments are different to some extent. Other differences lie in that the object-side surface 41 of the second lens element 4 has a concave portion 413 in the vicinity of the optical axis I and a convex portion 412 in the vicinity of the periphery. The third lens element 5 has negative refracting power. The object-side surface 51 of the third lens element 5 has a convex portion 513 in the vicinity of the optical axis I and a concave portion 512 in the vicinity of the periphery. The image-side surface 52 of the third lens element 5 has a concave portion 523 in the vicinity of the optical axis I and a convex portion 522 in the vicinity of the periphery. The fourth lens element 6 has positive refracting power. The object-side surface 61 of the fourth lens element 6 has a convex portion 613 in the vicinity of the optical axis I and a concave portion 612 in the vicinity of the periphery. For clear illustration, it should be mentioned that the same reference numbers of the concave portions and the convex portions in the two embodiments are omitted from FIG. 18.

The detailed optical data in the fourth embodiment are provided in FIG. 20. In the fourth embodiment, the EFL of the optical lens assembly 10 is 7.069 mm; the HFOV of the optical lens assembly 10 is 18.570°; the Fno of the optical lens assembly 10 is 2.394; the system length of the optical lens assembly 10 is 6.383 mm, and the image height of the optical lens assembly 10 is 2.400 mm.

The aspheric coefficients of the object-side surface 31 of the first lens element 3 to the image-side surface 62 of the fourth lens element 6 in the formula (1) are indicated in FIG. 21 according to the fourth embodiment.

In addition, the relationship among the crucial parameters pertaining to the optical lens assembly 10 in the fourth embodiment is indicated in FIG. 82 and FIG. 83.

In FIG. 19A which illustrates the longitudinal spherical aberration in the fourth embodiment, the measurement is made on the condition that the pupil radius is 1.4729 mm, and the imaging point deviation of the off-axis ray at different heights is controlled within a range of ±0.007 mm. In FIG. 19B and FIG. 19C which illustrate two diagrams of field curvature aberrations, the focal length variation of the three representative wavelengths within the entire field of view falls within the range of ±0.09 mm. In FIG. 19D, the diagram of distortion aberration shows that the distortion aberration in the fourth embodiment can be maintained within the range of ±1.2%. Accordingly, compared to the existing optical lens assembly, the optical lens assembly provided in the fourth embodiment can have the favorable image quality, given that the system length of the optical lens assembly is shortened to about 6.383 mm.

According to the above description, the optical lens assembly 10 exemplified in the fourth embodiment is superior to that exemplified in the first embodiment to some extent. Specifically, the Fno provided in the fourth embodiment is smaller than that provided in the first embodiment, the range of the longitudinal spherical aberration provided in the fourth embodiment is smaller than that provided in the first embodiment, the range of field curvature aberration in the sagittal direction in the fourth embodiment is smaller than that in the first embodiment, and the optical lens assembly provided in the fourth embodiment is easier to be fabricated and thus has a higher yield than that provided in the first embodiment.

Figure 22:
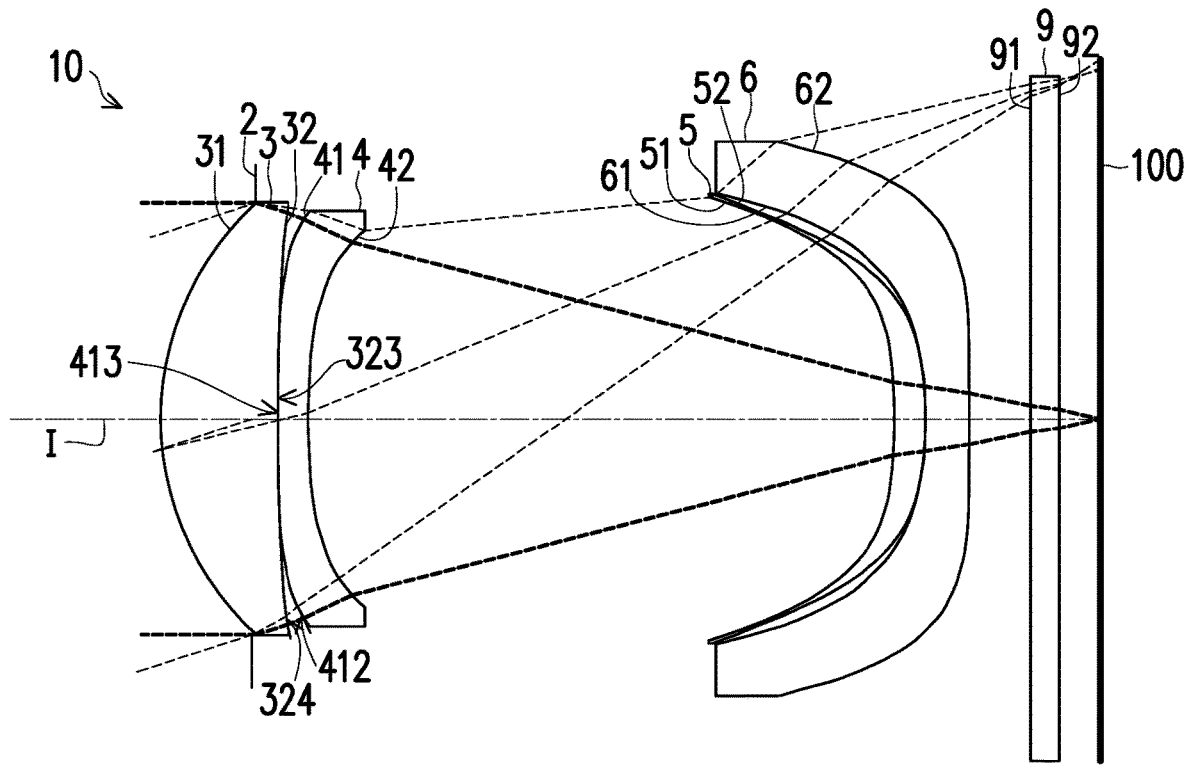
FIG. 22 is a schematic view illustrating an optical lens assembly according to a fifth embodiment of the invention.

FIG. 22 is a schematic view illustrating an optical lens assembly according to a fifth embodiment of the invention, and FIG. 23A to FIG. 23D illustrate a longitudinal spherical aberration and other aberrations of the optical lens assembly according to the fifth embodiment of the invention. With reference to FIG. 22, the optical lens assembly 10 provided in the fifth embodiment is similar to that provided in the first embodiment, while the optical data, the aspheric coefficients, and the parameters of the lens elements 3, 4, 5, and 6 in these two embodiments are different to some extent. Other differences lie in that the image-side surface 32 of the first lens element 3 is a concave surface and has a concave portion 323 in the vicinity of the optical axis I and a concave portion 324 in the vicinity of the periphery. The object-side surface 41 of the second lens element 4 has a concave portion 413 in the vicinity of the optical axis I and a convex portion 412 in the vicinity of the periphery. For clear illustration, it should be mentioned that the same reference numbers of the concave portions and the convex portions in the two embodiments are omitted from FIG. 22.

The detailed optical data in the fifth embodiment are provided in FIG. 24. In the fifth embodiment, the EFL of the optical lens assembly 10 is 7.069 mm; the HFOV of the optical lens assembly 10 is 18.629°; the Fno of the optical lens assembly 10 is 2.374; the system length of the optical lens assembly 10 is 6.399 mm, and the image height of the optical lens assembly 10 is 2.400 mm.

The aspheric coefficients of the object-side surface 31 of the first lens element 3 to the image-side surface 62 of the fourth lens element 6 in the formula (1) are indicated in FIG. 25 according to the fifth embodiment.

In addition, the relationship among the crucial parameters pertaining to the optical lens assembly 10 in the fifth embodiment is indicated in FIG. 82 and FIG. 83.

Figures 23A, 23B, 23C, 23D:
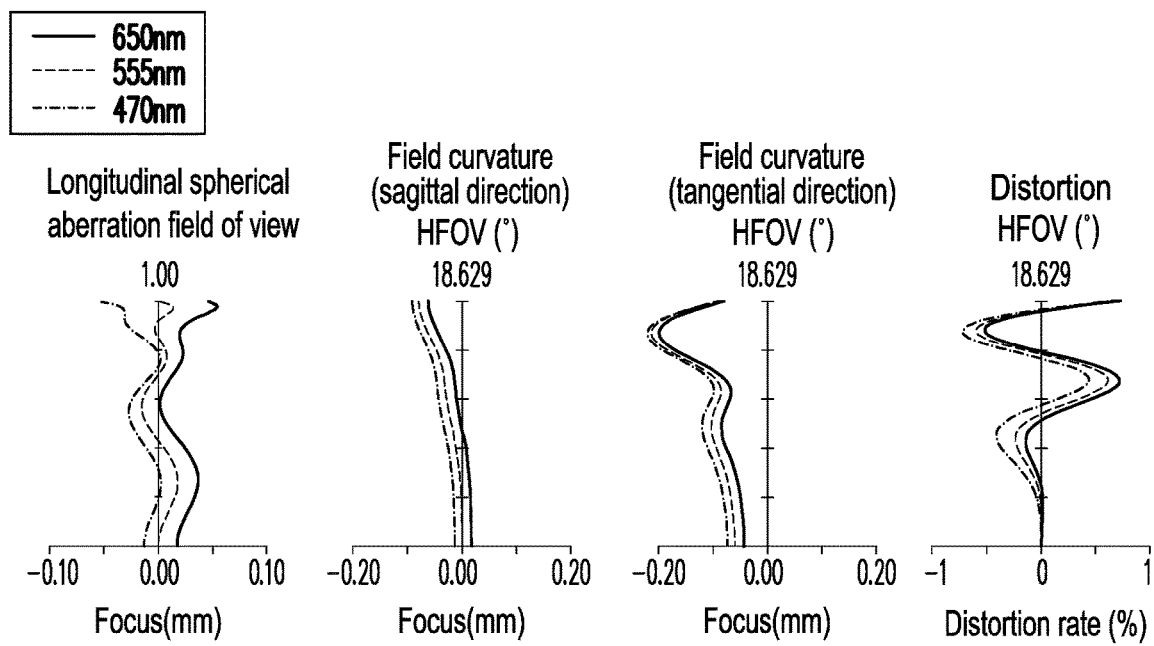
FIG. 23A to FIG. 23D illustrate a longitudinal spherical aberration and other aberrations of the optical lens assembly according to the fifth embodiment of the invention.

In FIG. 23A which illustrates the longitudinal spherical aberration in the fifth embodiment, the measurement is made on the condition that the pupil radius is 1.4729 mm, and the imaging point deviation of the off-axis ray at different heights is controlled within a range of ±0.06 mm. In FIG. 23B and FIG. 23C which illustrate two diagrams of field curvature aberrations, the focal length variation of the three representative wavelengths within the entire field of view falls within the range of ±0.16 mm. In FIG. 23D, the diagram of distortion aberration shows that the distortion aberration in the fifth embodiment can be maintained within the range of ±0.8%. Accordingly, compared to the existing optical lens assembly, the optical lens assembly provided in the fifth embodiment can have the favorable image quality, given that the system length of the optical lens assembly is shortened to about 6.399 mm.

According to the above description, the optical lens assembly 10 exemplified in the fifth embodiment is superior to that exemplified in the first embodiment to some extent. Specifically, the Fno provided in the fifth embodiment is smaller than that provided in the first embodiment, and the range of field curvature aberration in the tangential direction in the fifth embodiment is smaller than the range of field curvature aberration in the tangential direction in the first embodiment.

FIG. 26 is a schematic view illustrating an optical lens assembly according to a sixth embodiment of the invention, and FIG. 27A to FIG. 27D illustrate a longitudinal spherical aberration and other aberrations of the optical lens assembly according to the sixth embodiment of the invention. With reference to FIG. 26, the optical lens assembly 10 provided in the sixth embodiment is similar to that provided in the first embodiment, while the optical data, the aspheric coefficients, and the parameters of the lens elements 3, 4, 5, and 6 in these two embodiments are different to some extent. Other differences lie in that the object-side surface 41 of the second lens element 4 is a concave surface and has a concave portion 413 in the vicinity of the optical axis I and a concave portion 414 in the vicinity of the periphery. The third lens element 5 has negative refractive power, and the image-side surface 52 of the third lens element 5 has a concave portion 523 in the vicinity of the optical axis I and a convex portion 522 in the vicinity of the periphery. The fourth lens element 6 has positive refracting power. The image-side surface 62 of the fourth lens element 6 is a convex surface and has a convex portion 623 in the vicinity of the optical axis I and a convex portion 622 in the vicinity of the periphery. For clear illustration, it should be mentioned that the same reference numbers of the concave portions and the convex portions in the two embodiments are omitted from FIG. 26.

The detailed optical data in the sixth embodiment are provided in FIG. 28. In the sixth embodiment, the EFL of the optical lens assembly 10 is 8.732 mm; the HFOV of the optical lens assembly 10 is 15.313°; the Fno of the optical lens assembly 10 is 2.397; the system length of the optical lens assembly 10 is 8.000 mm, and the image height of the optical lens assembly 10 is 2.400 mm.

The aspheric coefficients of the object-side surface 31 of the first lens element 3 to the image-side surface 62 of the fourth lens element 6 in the formula (1) are indicated in FIG. 29 according to the sixth embodiment.

In addition, the relationship among the crucial parameters pertaining to the optical lens assembly 10 in the sixth embodiment is indicated in FIG. 82 and FIG. 83.

In FIG. 27A which illustrates the longitudinal spherical aberration in the sixth embodiment, the measurement is made on the condition that the pupil radius is 1.8192 mm, and the imaging point deviation of the off-axis ray at different heights is controlled within a range of ±0.02 mm. In FIG. 27B and FIG. 27C which illustrate two diagrams of field curvature aberrations, the focal length variation of the three representative wavelengths within the entire field of view falls within the range of ±0.035 mm. In FIG. 27D, the diagram of distortion aberration shows that the distortion aberration in the sixth embodiment can be maintained within the range of ±0.4%. Accordingly, compared to the existing optical lens assembly, the optical lens assembly provided in the sixth embodiment can have the favorable image quality, given that the system length of the optical lens assembly is shortened to about 8.000 mm.

According to the above description, the optical lens assembly exemplified in the sixth embodiment is superior to that exemplified in the first embodiment to some extent. Specifically, the Fno provided in the sixth embodiment is smaller than that provided in the first embodiment, the range of field curvature aberration in the sagittal direction in the sixth embodiment is smaller than the range of field curvature aberration in the sagittal direction in the first embodiment, the range of field curvature aberration in the tangential direction in the sixth embodiment is smaller than the range of field curvature aberration in the tangential direction in the first embodiment, the image distortion provided in the sixth embodiment is less significant than that provided in the first embodiment, and the optical lens assembly provided in the sixth embodiment is easier to be fabricated and thus has a higher yield than that provided in the first embodiment.

FIG. 30 is a schematic view illustrating an optical lens assembly according to a seventh embodiment of the invention, and FIG. 31A to FIG. 31D illustrate a longitudinal spherical aberration and other aberrations of the optical lens assembly according to the seventh embodiment of the invention. With reference to FIG. 30, the optical lens assembly 10 provided in the seventh embodiment is similar to that provided in the first embodiment, while the optical data, the aspheric coefficients, and the parameters of the lens elements 3, 4, 5, and 6 in these two embodiments are different to some extent. Other differences lie in that the image-side surface 32 of the first lens element 3 has a convex portion 321 in the vicinity of the optical axis I and a concave portion 324 in the vicinity of the periphery. The object-side surface 41 of the second lens element 4 has a concave portion 413 in the vicinity of the optical axis I and a convex portion 412 in the vicinity of the periphery. The third lens element 5 has negative refractive power, and the image-side surface 52 of the third lens element 5 has a concave portion 523 in the vicinity of the optical axis I and a convex portion 522 in the vicinity of the periphery. The fourth lens element 6 has positive refractive power, and the object-side surface 61 of the fourth lens element 6 has a convex portion 613 in the vicinity of the optical axis I and a concave portion 612 in the vicinity of the periphery. For clear illustration, it should be mentioned that the same reference numbers of the concave portions and the convex portions in the two embodiments are omitted from FIG. 30.

The detailed optical data in the seventh embodiment are provided in FIG. 32. In the seventh embodiment, the EFL of the optical lens assembly 10 is 7.066 mm; the HFOV of the optical lens assembly 10 is 18.712°; the Fno of the optical lens assembly 10 is 2.383; the system length of the optical lens assembly 10 is 6.386 mm, and the image height of the optical lens assembly 10 is 2.400 mm.

The aspheric coefficients of the object-side surface 31 of the first lens element 3 to the image-side surface 62 of the fourth lens element 6 in the formula (1) are indicated in FIG. 33 according to the seventh embodiment.

In addition, the relationship among the crucial parameters pertaining to the optical lens assembly 10 in the seventh embodiment is indicated in FIG. 82 and FIG. 83.

In FIG. 31A which illustrates the longitudinal spherical aberration in the seventh embodiment, the measurement is made on the condition that the pupil radius is 1.4729 mm, and the imaging point deviation of the off-axis ray at different heights is controlled within a range of ±0.008 mm. In FIG. 31B and FIG. 31C which illustrate two diagrams of field curvature aberrations, the focal length variation of the three representative wavelengths within the entire field of view falls within the range of ±0.06 mm. In FIG. 31D, the diagram of distortion aberration shows that the distortion aberration in the seventh embodiment can be maintained within the range of ±0.35%. Accordingly, compared to the existing optical lens assembly, the optical lens assembly provided in the seventh embodiment can have the favorable image quality, given that the system length of the optical lens assembly is shortened to about 6.386 mm.

According to the above description, the optical lens assembly exemplified in the seventh embodiment is superior to that exemplified in the first embodiment to some extent. Specifically, the Fno provided in the seventh embodiment is smaller than that provided in the first embodiment, the range of the longitudinal spherical aberration provided in the seventh embodiment is smaller than that provided in the first embodiment, the range of field curvature aberration in the sagittal direction in the seventh embodiment is smaller than the range of field curvature aberration in the sagittal direction in the first embodiment, the range of field curvature aberration in the tangential direction in the seventh embodiment is smaller than the range of field curvature aberration in the tangential direction in the first embodiment, the image distortion provided in the seventh embodiment is less significant than that provided in the first embodiment, and the optical lens assembly provided in the seventh embodiment is easier to be fabricated and thus has a higher yield than that provided in the first embodiment.

Figure 34:
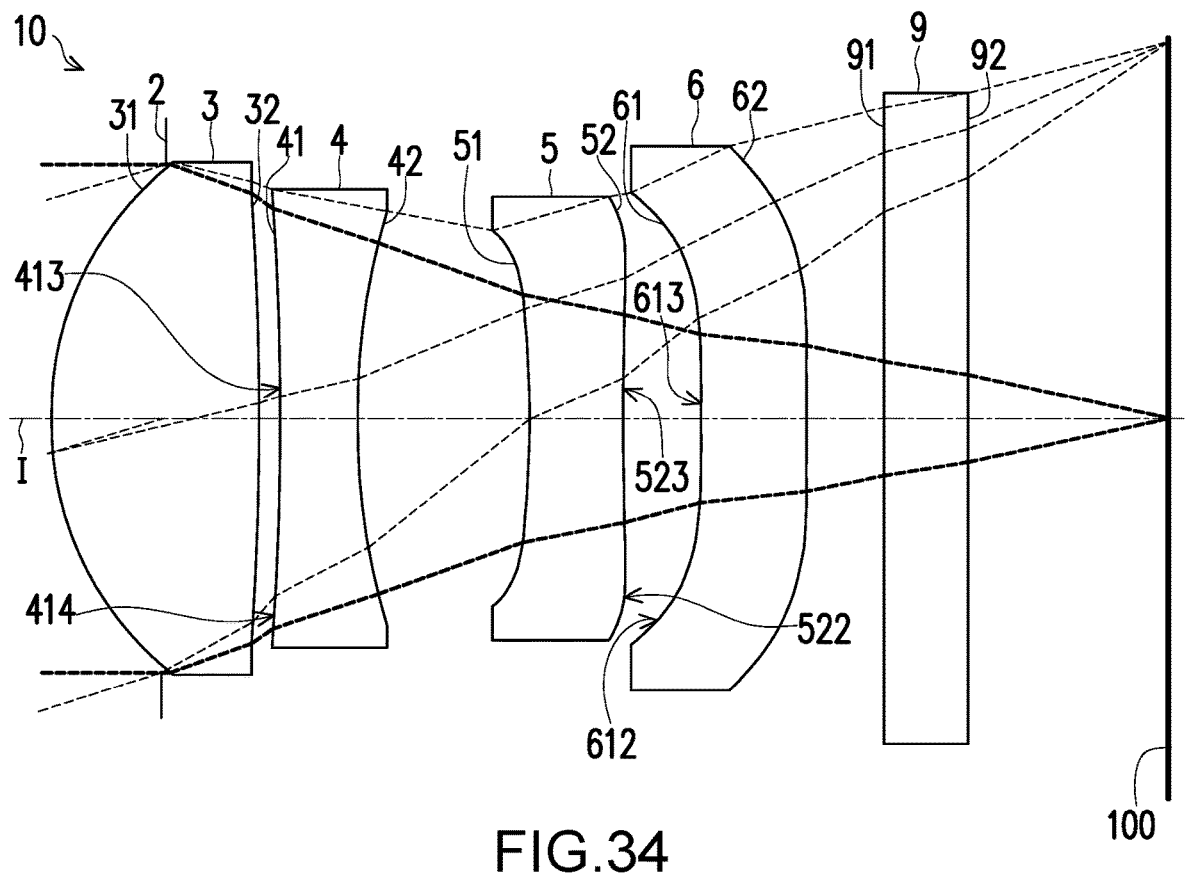
FIG. 34 is a schematic view illustrating an optical lens assembly according to an eighth embodiment of the invention.

FIG. 34 is a schematic view illustrating an optical lens assembly according to an eighth embodiment of the invention, and FIG. 35A to FIG. 35D illustrate a longitudinal spherical aberration and other aberrations of the optical lens assembly according to the eighth embodiment of the invention. With reference to FIG. 34, the optical lens assembly 10 provided in the eighth embodiment is similar to that provided in the first embodiment, while the optical data, the aspheric coefficients, and the parameters of the lens elements 3, 4, 5, and 6 in these two embodiments are different to some extent. Other differences lie in that the object-side surface 41 of the second lens element 4 is a concave surface and has a concave portion 413 in the vicinity of the optical axis I and a concave portion 414 in the vicinity of the periphery. The third lens element 5 has negative refractive power, and the image-side surface 52 of the third lens element 5 has a concave portion 523 in the vicinity of the optical axis I and a convex portion 522 in the vicinity of the periphery. The object-side surface 61 of the fourth lens element 6 has a convex portion 613 in the vicinity of the optical axis I and a concave portion 612 in the vicinity of the periphery. For clear illustration, it should be mentioned that the same reference numbers of the concave portions and the convex portions in the two embodiments are omitted from FIG. 34.

The detailed optical data in the eighth embodiment are provided in FIG. 36. In the eighth embodiment, the EFL of the optical lens assembly 10 is 3.075 mm; the HFOV of the optical lens assembly 10 is 17.174°; the Fno of the optical lens assembly 10 is 2.374; the system length of the optical lens assembly 10 is 2.819 mm, and the image height of the optical lens assembly 10 is 0.960 mm.

The aspheric coefficients of the object-side surface 31 of the first lens element 3 to the image-side surface 62 of the fourth lens element 6 in the formula (1) are indicated in FIG. 37 according to the eighth embodiment.

In addition, the relationship among the crucial parameters pertaining to the optical lens assembly 10 in the eighth embodiment is indicated in FIG. 82 and FIG. 83.

Figures 35A, 35B, 35C, 35D:
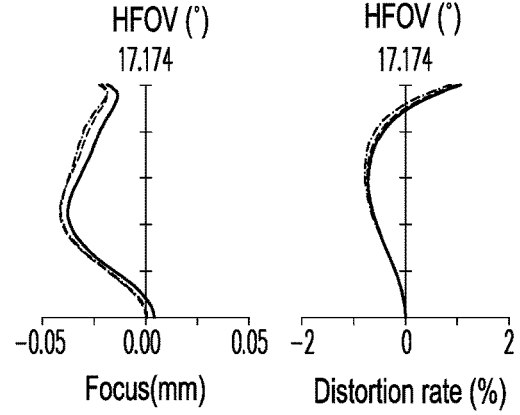
FIG. 35A to FIG. 35D illustrate longitudinal spherical aberration and other aberrations of the optical lens assembly according to the eighth embodiment of the invention.

In FIG. 35A which illustrates the longitudinal spherical aberration in the eighth embodiment, the measurement is made on the condition that the pupil radius is 0.6407 mm, and the imaging point deviation of the off-axis ray at different heights is controlled within a range of ±0.014 mm. In FIG. 35B and FIG. 35C which illustrate two diagrams of field curvature aberrations, the focal length variation of the three representative wavelengths within the entire field of view falls within the range of ±0.043 mm. In FIG. 35D, the diagram of distortion aberration shows that the distortion aberration in the eighth embodiment can be maintained within the range of ±3%. Accordingly, compared to the existing optical lens assembly, the optical lens assembly provided in the eighth embodiment can have the favorable image quality, given that the system length of the optical lens assembly is shortened to about 2.819 mm.

According to the above description, the optical lens assembly 10 exemplified in the eighth embodiment is superior to that exemplified in the first embodiment to some extent. Specifically, the system length provided in the eighth embodiment is shorter than that provided in the first embodiment, the Fno provided in the eighth embodiment is smaller than that provided in the first embodiment, the range of field curvature aberration in the sagittal direction in the eighth embodiment is smaller than that in the first embodiment, and the range of field curvature aberration in the tangential direction in the eighth embodiment is smaller than that in the first embodiment.

FIG. 38 is a schematic view illustrating an optical lens assembly according to a ninth embodiment of the invention, and FIG. 39A to FIG. 39D illustrate a longitudinal spherical aberration and other aberrations of the optical lens assembly according to the ninth embodiment of the invention. With reference to FIG. 38, the optical lens assembly 10 provided in the ninth embodiment is similar to that provided in the first embodiment, while the optical data, the aspheric coefficients, and the parameters of the lens elements 3, 4, 5, and 6 in these two embodiments are different to some extent. Other differences lie in that the image-side surface 32 of the first lens element 3 has a convex portion 321 in the vicinity of the optical axis I and a concave portion 324 in the vicinity of the periphery. The object-side surface 41 of the second lens element 4 has a concave portion 413 in the vicinity of the optical axis I and a convex portion 412 in the vicinity of the periphery. The third lens element 5 has negative refractive power, and the image-side surface 52 of the third lens element 5 has a concave portion 523 in the vicinity of the optical axis I. The fourth lens element 6 has positive refracting power. The object-side surface 61 of the fourth lens element 6 is a convex surface and has a convex portion 613 in the vicinity of the optical axis I and a convex portion 614 in the vicinity of the periphery. For clear illustration, it should be mentioned that the same reference numbers of the concave portions and the convex portions in the two embodiments are omitted from FIG. 38.

The detailed optical data in the ninth embodiment are provided in FIG. 40. In the ninth embodiment, the EFL of the optical lens assembly 10 is 4.382 mm; the HFOV of the optical lens assembly 10 is 23.204°; the Fno of the optical lens assembly 10 is 2.381; the system length of the optical lens assembly 10 is 4.015 mm, and the image height of the optical lens assembly 10 is 1.881 mm.

The aspheric coefficients of the object-side surface 31 of the first lens element 3 to the image-side surface 62 of the fourth lens element 6 in the formula (1) are indicated in FIG. 41 according to the ninth embodiment.

In addition, the relationship among the crucial parameters pertaining to the optical lens assembly 10 in the ninth embodiment is indicated in FIG. 82 and FIG. 83.

In FIG. 39A which illustrates the longitudinal spherical aberration in the ninth embodiment, the imaging point deviation of the off-axis ray at different heights is controlled within a range of ±0.018 mm. In FIG. 39B and FIG. 39C which illustrate two diagrams of field curvature aberrations, the focal length variation of the three representative wavelengths within the entire field of view falls within the range of ±0.045 mm. In FIG. 39D, the diagram of distortion aberration shows that the distortion aberration in the ninth embodiment can be maintained within the range of ±1.95%. Accordingly, compared to the existing optical lens assembly, the optical lens assembly provided in the ninth embodiment can have the favorable image quality, given that the system length of the optical lens assembly is shortened to about 4.015 mm.

According to the above description, the optical lens assembly exemplified in the ninth embodiment is superior to that exemplified in the first embodiment to some extent. Specifically, the system length provided in the ninth embodiment is shorter than that provided in the first embodiment, the Fno provided in the ninth embodiment is smaller than that provided in the first embodiment, the HFOV provided in the ninth embodiment is greater than that provided in the first embodiment, the range of field curvature aberration in the sagittal direction in the ninth embodiment is smaller than that in the first embodiment, the range of field curvature aberration in the tangential direction in the ninth embodiment is smaller than that in the first embodiment, and the optical lens assembly provided in the ninth embodiment is easier to be fabricated and thus has a higher yield than that provided in the first embodiment.

FIG. 42 is a schematic view illustrating an optical lens assembly according to a tenth embodiment of the invention, and FIG. 43A to FIG. 43D illustrate a longitudinal spherical aberration and other aberrations of the optical lens assembly according to the tenth embodiment of the invention. With reference to FIG. 42, the optical lens assembly 10 provided in the tenth embodiment includes an aperture stop 2, a first lens element 3, a second lens element 4, a fifth lens element 7, a third lens element 5, a fourth lens element 6, and a filter 9 arranged in order from an object side to an image side along an optical axis I of the optical lens assembly 10. When a ray emitted from an object to be shot enters the optical lens assembly 10 and passes through the aperture stop 2, the first lens element 3, the second lens element 4, the fifth lens element 7, the third lens element 5, the fourth lens element 6, and the filter 9, an image is formed on an image plane 100. The filter 9, for example, is an infrared cut filter (IR cut filter) configured to prevent the infrared ray at part of the waveband of the ray from being transmitted to the image plane 100 and deteriorating the image quality. It should be added that the object side is a side facing the object to be shot, and the image side is a side facing the image plane 100. In the tenth embodiment, the optical lens assembly is constituted by five lens elements, for instance.

Each of the first lens element 3, the second lens element 4, the fifth lens element 7, the third lens element 5, the fourth lens element 6, and the filter 9 has an object-side surface 31, 41, 71, 51, 61, or 91 that faces the object side and allows an imaging ray to pass through and an image-side surface 32, 42, 72, 52, 62, or 92 that faces the image side and allows the imaging ray to pass through.

The first lens element 3 has positive refracting power. The object-side surface 31 of the first lens element 3 is a convex surface and has a convex portion 311 in the vicinity of the optical axis I and a convex portion 312 in the vicinity of the periphery. The image-side surface 32 of the first lens element 3 is a convex surface and has a convex portion 321 in the vicinity of the optical axis I and a convex portion 322 in the vicinity of the periphery. In the tenth embodiment, the object-side surface 31 and the image-side surface 32 of the first lens element 3 are both aspheric surfaces.

The second lens element 4 has negative refracting power. The object-side surface 41 of the second lens element 4 is a concave surface and has a concave portion 413 in the vicinity of the optical axis I and a concave portion 414 in the vicinity of the periphery. The image-side surface 42 of the second lens element 4 is a concave surface and has a concave portion 421 in the vicinity of the optical axis I and a concave portion 422 in the vicinity of the periphery. In the tenth embodiment, the object-side surface 41 and the image-side surface 42 of the second lens element 4 are both aspheric surfaces.

The fifth lens element 7 has negative refracting power. The object-side surface 71 of the fifth lens element 7 is a concave surface and has a concave portion 711 in the vicinity of the optical axis I and a concave portion 712 in the vicinity of the periphery. The image-side surface 72 of the fifth lens element 7 has a convex portion 721 in the vicinity of the optical axis I and a concave portion 722 in the vicinity of the periphery.

The third lens element 5 has positive refracting power. The object-side surface 51 of the third lens element 5 is a concave surface and has a concave portion 511 in the vicinity of the optical axis I and a concave portion 512 in the vicinity of the periphery. The image-side surface 52 of the third lens element 5 has a concave portion 523 in the vicinity of the optical axis I and a convex portion 522 in the vicinity of the periphery. In the tenth embodiment, the object-side surface 51 and the image-side surface 52 of the third lens element 5 are both aspheric surfaces.

The fourth lens element 6 has positive refracting power. The object-side surface 61 of the fourth lens element 6 has a convex portion 613 in the vicinity of the optical axis I and a concave portion 612 in the vicinity of the periphery. The image-side surface 62 of the fourth lens element 6 is a convex surface and has a convex portion 623 in the vicinity of the optical axis I and a convex portion 622 in the vicinity of the periphery. In the tenth embodiment, the object-side surface 61 and the image-side surface 62 of the fourth lens element 6 are both aspheric surfaces.

The detailed optical data in the tenth embodiment are provided in FIG. 44. In the tenth embodiment, the EFL of the optical lens assembly 10 is 8.688 mm; the HFOV of the optical lens assembly 10 is 18.640°; the Fno of the optical lens assembly 10 is 2.389; the system length of the optical lens assembly 10 is 8.000 mm, and the image height of the optical lens assembly 10 is 2.944 mm. Here, the system length refers to a distance from the object-side surface 31 of the first lens element 3 to the image plane 100 along the optical axis I.

In addition, in the tenth embodiment, all of the ten surfaces, i.e., the object-side surfaces 31, 41, 71, 51, and 61 and the image-side surfaces 32, 42, 72, 52, and 62 of the first lens element 3, the second lens element 4, the fifth lens element 7, the third lens element 5, and the fourth lens element 6 are aspheric surfaces. The aspheric surfaces are defined by the following formula. The aspheric coefficients of the object-side surface 31 of the first lens element 3 to the image-side surface 72 of the fifth lens element 7 in the formula (1) are indicated in FIG. 45. In FIG. 45, the referential number 31 in one column represents the aspheric coefficient of the object-side surface 31 of the first lens element 3, and the reference numbers in other columns can be deduced from the above.

In addition, the relationship among the crucial parameters pertaining to the optical lens assembly 10 in the tenth embodiment is indicated in FIG. 82 and FIG. 83.

The definitions of the parameters of the first lens element 3, the second lens element 4, the third lens element 5, and the fourth lens element 6 provided in the tenth embodiment are similar to those defined in the first embodiment, while the differences are provided below.

T5 is a thickness of the fifth lens element 7 along the optical axis I; in the tenth embodiment, T5 is between T2 and T3;

G25 represents the distance from the second lens element 3 to the fifth lens element 7 along the optical axis I;

G53 represents the distance from the fifth lens element 7 to the third lens element 3 along the optical axis I;

f5 is a focal length of the fifth lens element 7;

n5 is a refractive index of the fifth lens element 7;

ν5 is an Abbe number of the fifth lens element 7.

With reference to FIG. 43A to FIG. 43D, FIG. 43A illustrates the longitudinal spherical aberration described in the tenth embodiment. FIG. 43B and FIG. 43C respectively illustrate field curvature aberration in a sagittal direction on the image plane 100 and field curvature aberration in a tangential direction on the image plane 100 in the tenth embodiment. FIG. 43D illustrates distortion aberration on the image plane 100 in the tenth embodiment. In FIG. 43A which illustrates the longitudinal spherical aberration in the tenth embodiment, the measurement is made on the condition that the pupil radius is 1.8099 mm, the curve of each representative wavelength (e.g., 470 nm, 555 nm, and 650 nm) is close to one another and approaches the center position, which indicates that the off-axis ray of each representative wavelength at different heights is concentrated around the imaging point. The skew margin of the curve of each representative wavelength indicates that the imaging point deviation of the off-axis ray at different heights is controlled within a range of ±0.025 mm. Hence, it is evident that the spherical aberration of the same wavelength can be significantly improved according to the tenth embodiment. In addition, the curves of the three representative wavelengths are close to one another, which indicates that the imaging positions of the rays with different wavelengths are rather concentrated; therefore, the chromatic aberration can be significantly improved as well.

In FIG. 43B and FIG. 43C which illustrate two diagrams of field curvature aberration, the focal length variation of the three representative wavelengths within the entire field of view falls within the range of ±0.035 mm, which indicates that the field curvature aberration of the optical system provided in the tenth embodiment can be effectively eliminated. In FIG. 43D, the diagram of distortion aberration shows that the distortion aberration in the tenth embodiment can be maintained within the range of ±0.6%, which indicates that the distortion aberration in the tenth embodiment can comply with the image quality requirement of the optical system. Accordingly, compared to the existing optical lens assembly, the optical lens assembly provided in the tenth embodiment can have the favorable image quality, given that the system length of the optical lens assembly is shortened to about 8.000 mm. As a result, according to the tenth embodiment, the Fno can be reduced (i.e., the aperture stop can be increased), the length of the optical lens assembly can be shortened, and the shooting angle can be increased without sacrificing the optical properties, and thereby the slim design of product with the broadened view angle can be realized.

FIG. 46 is a schematic view illustrating an optical lens assembly according to an eleventh embodiment of the invention, and FIG. 47A to FIG. 47D illustrate a longitudinal spherical aberration and other aberrations of the optical lens assembly according to the eleventh embodiment of the invention. With reference to FIG. 46, the optical lens assembly 10 provided in the eleventh embodiment is similar to that provided in the tenth embodiment, while the optical data, the aspheric coefficients, and the parameters of the lens elements 3, 4, 7, 5, and 6 in these two embodiments are different to some extent. Other differences lie in that the image-side surface 71 of the fifth lens element 7 is a convex surface and has a convex portion 711 in the vicinity of the optical axis I and a convex portion 714 in the vicinity of the periphery. The image-side surface 52 of the third lens element 5 is a convex surface and has a convex portion 521 in the vicinity of the optical axis I and a convex portion 522 in the vicinity of the periphery. The fourth lens element 6 has negative refractive power, and the object-side surface 61 of the fourth lens element 6 is a concave surface and has a concave portion 611 in the vicinity of the optical axis I and a concave portion 612 in the vicinity of the periphery. The image-side surface 62 of the fourth lens element 6 has a concave portion 621 in the vicinity of the optical axis I and a convex portion 622 in the vicinity of the periphery. For clear illustration, it should be mentioned that the same reference numbers of the concave portions and the convex portions in the two embodiments are omitted from FIG. 46.

The detailed optical data in the eleventh embodiment are provided in FIG. 48. In the eleventh embodiment, the EFL of the optical lens assembly 10 is 8.643 mm; the HFOV of the optical lens assembly 10 is 18.844°; the Fno of the optical lens assembly 10 is 2.378; the system length of the optical lens assembly 10 is 8.000 mm, and the image height of the optical lens assembly 10 is 2.944 mm.

The aspheric coefficients of the object-side surface 31 of the first lens element 3 to the image-side surface 72 of the fifth lens element 7 in the formula (1) are indicated in FIG. 49 according to the eleventh embodiment.

In addition, the relationship among the crucial parameters pertaining to the optical lens assembly 10 in the eleventh embodiment is indicated in FIG. 87 and FIG. 88.

In FIG. 47A which illustrates the longitudinal spherical aberration in the eleventh embodiment, the measurement is made on the condition that the pupil radius is 1.8008 mm, and the imaging point deviation of the off-axis ray at different heights is controlled within a range of ±0.04 mm. In FIG. 47B and FIG. 47C which illustrate two diagrams of field curvature aberration, the focal length variation of the three representative wavelengths within the entire field of view falls within the range of ±0.04 mm. In FIG. 47D, the diagram of distortion aberration shows that the distortion aberration in the eleventh embodiment can be maintained within the range of ±0.5%. Accordingly, compared to the existing optical lens assembly, the optical lens assembly provided in the eleventh embodiment can have the favorable image quality, given that the system length of the optical lens assembly is shortened to about 8.000 mm.

According to the above description, the optical lens assembly 10 exemplified in the eleventh embodiment is superior to that exemplified in the tenth embodiment to some extent. Specifically, the Fno provided in the eleventh embodiment is smaller than that provided in the tenth embodiment, the range of field curvature aberration in the tangential direction in the eleventh embodiment is smaller than the range of field curvature aberration in the tangential direction in the tenth embodiment, and the image distortion provided in the eleventh embodiment is less significant than that provided in the tenth embodiment.

FIG. 50 is a schematic view illustrating an optical lens assembly according to a twelfth embodiment of the invention, and FIG. 51A to FIG. 51D illustrate a longitudinal spherical aberration and other aberrations of the optical lens assembly according to the twelfth embodiment of the invention. With reference to FIG. 50, the optical lens assembly 10 provided in the twelfth embodiment is similar to that provided in the tenth embodiment, while the optical data, the aspheric coefficients, and the parameters of the lens elements 3, 4, 7, 5, and 6 in these two embodiments are different to some extent. Other differences lie in that the object-side surface 41 of the second lens element 4 is a convex surface and has a convex portion 411 in the vicinity of the optical axis I and a convex portion 412 in the vicinity of the periphery. The object-side surface 71 of the fifth lens element 7 has a convex portion 711 in the vicinity of the optical axis I and a concave portion 712 in the vicinity of the periphery. The image-side surface 72 of the fifth lens element 7 has a concave portion 723 in the vicinity of the optical axis I and a convex portion 724 in the vicinity of the periphery. The image-side surface 52 of the third lens element 5 is a convex surface and has a convex portion 521 in the vicinity of the optical axis I and a convex portion 522 in the vicinity of the periphery. The fourth lens element 6 has negative refractive power, and the object-side surface 61 of the fourth lens element 6 is a concave surface and has a concave portion 611 in the vicinity of the optical axis I and a concave portion 612 in the vicinity of the periphery. For clear illustration, it should be mentioned that the same reference numbers of the concave portions and the convex portions in the two embodiments are omitted from FIG. 50.

The detailed optical data in the twelfth embodiment are provided in FIG. 52. In the twelfth embodiment, the EFL of the optical lens assembly 10 is 8.592 mm; the HFOV of the optical lens assembly 10 is 18.894°; the Fno of the optical lens assembly 10 is 2.374; the system length of the optical lens assembly 10 is 7.963 mm, and the image height of the optical lens assembly 10 is 2.374 mm.

The aspheric coefficients of the object-side surface 31 of the first lens element 3 to the image-side surface 72 of the fifth lens element 7 in the formula (1) are indicated in FIG. 53 according to the twelfth embodiment.

In addition, the relationship among the crucial parameters pertaining to the optical lens assembly 10 in the twelfth embodiment is indicated in FIG. 84 and FIG. 85.

In FIG. 51A which illustrates the longitudinal spherical aberration in the twelfth embodiment, the measurement is made on the condition that the pupil radius is 1.7900 mm, and the imaging point deviation of the off-axis ray at different heights is controlled within a range of ±0.05 mm. In FIG. 51B and FIG. 51C which illustrate two diagrams of field curvature aberration, the focal length variation of the three representative wavelengths within the entire field of view falls within the range of ±0.04 mm. In FIG. 51D, the diagram of distortion aberration shows that the distortion aberration in the twelfth embodiment can be maintained within the range of ±0.45%. Accordingly, compared to the existing optical lens assembly, the optical lens assembly provided in the twelfth embodiment can have the favorable image quality, given that the system length of the optical lens assembly is shortened to about 7.963 mm.

According to the above description, the optical lens assembly exemplified in the twelfth embodiment is superior to that exemplified in the tenth embodiment to some extent. Specifically, the system length provided in the twelfth embodiment is shorter than that provided in the tenth embodiment, the Fno provided in the twelfth embodiment is smaller than that provided in the tenth embodiment, the HFOV provided in the twelfth embodiment is greater than that provided in the tenth embodiment, the range of field curvature aberration in the sagittal direction in the twelfth embodiment is smaller than that in the tenth embodiment, the image distortion provided in the twelfth embodiment is less significant than that provided in the tenth embodiment, and the optical lens assembly provided in the twelfth embodiment is easier to be fabricated and thus has a higher yield than that provided in the tenth embodiment.

FIG. 54 is a schematic view illustrating an optical lens assembly according to a thirteenth embodiment of the invention, and FIG. 55A to FIG. 55D illustrate a longitudinal spherical aberration and other aberrations of the optical lens assembly according to the thirteenth embodiment of the invention. With reference to FIG. 54, the optical lens assembly 10 provided in the thirteenth embodiment is similar to that provided in the tenth embodiment, while the optical data, the aspheric coefficients, and the parameters of the lens elements 3, 4, 7, 5, and 6 in these two embodiments are different to some extent. Other differences lie in that the image-side surface 72 of the fifth lens element 7 is a convex surface and has a convex portion 721 in the vicinity of the optical axis I and a convex portion 724 in the vicinity of the periphery. The third lens element has negative refracting power. For clear illustration, it should be mentioned that the same reference numbers of the concave portions and the convex portions in the two embodiments are omitted from FIG. 54.

The detailed optical data in the thirteenth embodiment are provided in FIG. 56. In the thirteenth embodiment, the EFL of the optical lens assembly 10 is 8.788 mm; the HFOV of the optical lens assembly 10 is 18.402°; the Fno of the optical lens assembly 10 is 2.394; the system length of the optical lens assembly 10 is 8.000 mm, and the image height of the optical lens assembly 10 is 2.944 mm.

The aspheric coefficients of the object-side surface 31 of the first lens element 3 to the image-side surface 72 of the fifth lens element 7 in the formula (1) are indicated in FIG. 57 according to the thirteenth embodiment.

In addition, the relationship among the crucial parameters pertaining to the optical lens assembly 10 in the thirteenth embodiment is indicated in FIG. 84 and FIG. 85.

In FIG. 55A which illustrates the longitudinal spherical aberration in the thirteenth embodiment, the measurement is made on the condition that the pupil radius is 1.8309 mm, and the imaging point deviation of the off-axis ray at different heights is controlled within a range of ±0.02 mm. In FIG. 55B and FIG. 55C which illustrate two diagrams of field curvature aberrations, the focal length variation of the three representative wavelengths within the entire field of view falls within the range of ±0.035 mm. In FIG. 55D, the diagram of distortion aberration shows that the distortion aberration in the thirteenth embodiment can be maintained within the range of ±1.6%. Accordingly, compared to the existing optical lens assembly, the optical lens assembly provided in the thirteenth embodiment can have the favorable image quality, given that the system length of the optical lens assembly is shortened to about 8.000 mm.

According to the above description, the optical lens assembly exemplified in the thirteenth embodiment is superior to that exemplified in the tenth embodiment to some extent. Specifically, the range of the longitudinal spherical aberration provided in the thirteenth embodiment is smaller than that provided in the tenth embodiment, the range of field curvature aberration in the tangential direction in the thirteenth embodiment is smaller than that in the tenth embodiment, the image distortion provided in the thirteenth embodiment is less significant than that provided in the tenth embodiment, and the optical lens assembly provided in the thirteenth embodiment is easier to be fabricated and thus has a higher yield than that provided in the tenth embodiment.

FIG. 58 is a schematic view illustrating an optical lens assembly according to a fourteenth embodiment of the invention, and FIG. 59A to FIG. 59D illustrate a longitudinal spherical aberration and other aberrations of the optical lens assembly according to the fourteenth embodiment of the invention. With reference to FIG. 58, the optical lens assembly 10 provided in the fourteenth embodiment is similar to that provided in the tenth embodiment, while the optical data, the aspheric coefficients, and the parameters of the lens elements 3, 4, 7, 5, and 6 in these two embodiments are different to some extent. Other differences lie in that the image-side surface 72 of the fifth lens element 7 is a convex surface and has a convex portion 721 in the vicinity of the optical axis I and a convex portion 724 in the vicinity of the periphery. The object-side surface 51 of the third lens element 5 has a convex portion 513 in the vicinity of the optical axis I and a concave portion 512 in the vicinity of the periphery. The fourth lens element 6 has negative refracting power. The object-side surface 61 of the fourth lens element 6 is a concave surface and has a concave portion 611 in the vicinity of the optical axis I and a concave portion 612 in the vicinity of the periphery. The image-side surface 62 of the fourth lens element 6 has a concave portion 621 in the vicinity of the optical axis I and a convex portion 622 in the vicinity of the periphery. For clear illustration, it should be mentioned that the same reference numbers of the concave portions and the convex portions in the two embodiments are omitted from FIG. 58.

The detailed optical data in the fourteenth embodiment are provided in FIG. 60. In the fourteenth embodiment, the EFL of the optical lens assembly 10 is 8.677 mm; the HFOV of the optical lens assembly 10 is 18.723°; the Fno of the optical lens assembly 10 is 2.386; the system length of the optical lens assembly 10 is 8.000 mm, and the image height of the optical lens assembly 10 is 2.944 mm.

The aspheric coefficients of the object-side surface 31 of the first lens element 3 to the image-side surface 72 of the fifth lens element 7 in the formula (1) are indicated in FIG. 61 according to the fourteenth embodiment.

In addition, the relationship among the crucial parameters pertaining to the optical lens assembly 10 in the fourteenth embodiment is indicated in FIG. 84 and FIG. 85.

In FIG. 59A which illustrates the longitudinal spherical aberration in the fourteenth embodiment, the measurement is made on the condition that the pupil radius is 1.8076 mm, and the imaging point deviation of the off-axis ray at different heights is controlled within a range of ±0.019 mm. In FIG. 59B and FIG. 59C which illustrate two diagrams of field curvature aberrations, the focal length variation of the three representative wavelengths within the entire field of view falls within the range of ±0.06 mm. In FIG. 59D, the diagram of distortion aberration shows that the distortion aberration in the fourteenth embodiment can be maintained within the range of ±0.6%. Accordingly, compared to the existing optical lens assembly, the optical lens assembly provided in the fourteenth embodiment can have the favorable image quality, given that the system length of the optical lens assembly is shortened to about 8.000 mm.

According to the above description, the optical lens assembly exemplified in the fourteenth embodiment is superior to that exemplified in the tenth embodiment to some extent. Specifically, the Fno provided in the fourteenth embodiment is smaller than that provided in the tenth embodiment, the HFOV provided in the fourteenth embodiment is greater than that in the tenth embodiment, the range of the longitudinal spherical aberration provided in the fourteenth embodiment is smaller than that provided in the tenth embodiment, and the optical lens assembly provided in the fourteenth embodiment is easier to be fabricated and thus has a higher yield than that provided in the tenth embodiment.

FIG. 62 is a schematic view illustrating an optical lens assembly according to a fifteenth embodiment of the invention, and FIG. 63A to FIG. 63D illustrate a longitudinal spherical aberration and other aberrations of the optical lens assembly according to the fifteenth embodiment of the invention. With reference to FIG. 62, the optical lens assembly 10 provided in the fifteenth embodiment is similar to that provided in the tenth embodiment, while the optical data, the aspheric coefficients, and the parameters of the lens elements 3, 4, 7, 5, and 6 in these two embodiments are different to some extent. Other differences lie in that the object-side surface 71 of the fifth lens element 7 has a convex portion 713 in the vicinity of the optical axis I and a concave portion 712 in the vicinity of the periphery. The image-side surface 72 of the fifth lens element 7 is a concave surface and has a concave portion 723 in the vicinity of the optical axis I and a concave portion 722 in the vicinity of the periphery. The image-side surface 52 of the third lens element 5 is a convex surface and has a convex portion 521 in the vicinity of the optical axis I and a convex portion 522 in the vicinity of the periphery. The fourth lens element 6 has negative refracting power. The object-side surface 61 of the fourth lens element 6 is a concave surface and has a concave portion 611 in the vicinity of the optical axis I and a concave portion 612 in the vicinity of the periphery. For clear illustration, it should be mentioned that the same reference numbers of the concave portions and the convex portions in the two embodiments are omitted from FIG. 62.

The detailed optical data in the fifteenth embodiment are provided in FIG. 64. In the fifteenth embodiment, the EFL of the optical lens assembly 10 is 8.650 mm; the HFOV of the optical lens assembly 10 is 18.738°; the Fno of the optical lens assembly 10 is 2.379; the system length of the optical lens assembly 10 is 8.000 mm, and the image height of the optical lens assembly 10 is 2.944 mm.

The aspheric coefficients of the object-side surface 31 of the first lens element 3 to the image-side surface 72 of the fifth lens element 7 in the formula (1) are indicated in FIG. 65 according to the fifteenth embodiment.

In addition, the relationship among the crucial parameters pertaining to the optical lens assembly 10 in the fifteenth embodiment is indicated in FIG. 84 and FIG. 85.

In FIG. 63A which illustrates the longitudinal spherical aberration in the fifteenth embodiment, the measurement is made on the condition that the pupil radius is 1.8021 mm, and the imaging point deviation of the off-axis ray at different heights is controlled within a range of ±0.025 mm. In FIG. 63B and FIG. 63C which illustrate two diagrams of field curvature aberrations, the focal length variation of the three representative wavelengths within the entire field of view falls within the range of ±0.03 mm. In FIG. 63D, the diagram of distortion aberration shows that the distortion aberration in the fifteenth embodiment can be maintained within the range of ±0.9%. Accordingly, compared to the existing optical lens assembly, the optical lens assembly provided in the fifteenth embodiment can have the favorable image quality, given that the system length of the optical lens assembly is shortened to about 8.000 mm.

According to the above description, the optical lens assembly exemplified in the fifteenth embodiment is superior to that exemplified in the tenth embodiment to some extent. Specifically, the Fno provided in the fifteenth embodiment is smaller than that provided in the tenth embodiment, the HFOV provided in the fifteenth embodiment is greater than that in the tenth embodiment, the range of the field curvature aberration in the tangential direction in the fifteenth embodiment is smaller than that provided in the tenth embodiment, and the optical lens assembly provided in the fifteenth embodiment is easier to be fabricated and thus has a higher yield than that provided in the tenth embodiment.

FIG. 66 is a schematic view illustrating an optical lens assembly according to a sixteenth embodiment of the invention, and FIG. 67A to FIG. 67D illustrate a longitudinal spherical aberration and other aberrations of the optical lens assembly according to the sixteenth embodiment of the invention. With reference to FIG. 66, the optical lens assembly 10 provided in the sixteenth embodiment is similar to that provided in the tenth embodiment, while the optical data, the aspheric coefficients, and the parameters of the lens elements 3, 4, 7, 5, and 6 in these two embodiments are different to some extent. Other differences lie in that the fifth lens element 7 has positive refractive power. The image-side surface 72 of the fifth lens element 7 is a convex surface and has a convex portion 721 in the vicinity of the optical axis I and a convex portion 724 in the vicinity of the periphery. The third lens element 5 has negative refracting power. For clear illustration, it should be mentioned that the same reference numbers of the concave portions and the convex portions in the two embodiments are omitted from FIG. 66.

The detailed optical data in the sixteenth embodiment are provided in FIG. 68. In the sixteenth embodiment, the EFL of the optical lens assembly 10 is 8.609 mm; the HFOV of the optical lens assembly 10 is 18.810°; the Fno of the optical lens assembly 10 is 2.390; the system length of the optical lens assembly 10 is 7.927 mm, and the image height of the optical lens assembly 10 is 2.944 mm.

The aspheric coefficients of the object-side surface 31 of the first lens element 3 to the image-side surface 72 of the fifth lens element 7 in the formula (1) are indicated in FIG. 69 according to the sixteenth embodiment.

In addition, the relationship among the crucial parameters pertaining to the optical lens assembly 10 in the sixteenth embodiment is indicated in FIG. 84 and FIG. 85.

In FIG. 67A which illustrates the longitudinal spherical aberration in the sixteenth embodiment, the measurement is made on the condition that the pupil radius is 1.7936 mm, and the imaging point deviation of the off-axis ray at different heights is controlled within a range of ±0.025 mm. In FIG. 67B and FIG. 67C which illustrate two diagrams of field curvature aberrations, the focal length variation of the three representative wavelengths within the entire field of view falls within the range of ±0.035 mm. In FIG. 67D, the diagram of distortion aberration shows that the distortion aberration in the sixteenth embodiment can be maintained within the range of ±0.82%. Accordingly, compared to the existing optical lens assembly, the optical lens assembly provided in the sixteenth embodiment can have the favorable image quality, given that the system length of the optical lens assembly is shortened to about 7.927 mm.

According to the above description, the optical lens assembly exemplified in the sixteenth embodiment is superior to that exemplified in the tenth embodiment to some extent. Specifically, the system length provided in the sixteenth embodiment is shorter than that provided in the tenth embodiment, the HFOV provided in the sixteenth embodiment is greater than that in the tenth embodiment, and the optical lens assembly provided in the sixteenth embodiment is easier to be fabricated and thus has a higher yield than that provided in the tenth embodiment.

FIG. 70 is a schematic view illustrating an optical lens assembly according to a seventeenth embodiment of the invention, and FIG. 71A to FIG. 71D illustrate a longitudinal spherical aberration and other aberrations of the optical lens assembly according to the seventeenth embodiment of the invention. With reference to FIG. 70, the optical lens assembly 10 provided in the seventeenth embodiment is similar to that provided in the tenth embodiment, while the optical data, the aspheric coefficients, and the parameters of the lens elements 3, 4, 7, 5, and 6 in these two embodiments are different to some extent. Other differences lie in that the object-side surface 41 of the second lens element 4 has a concave portion 413 in the vicinity of the optical axis I and a convex portion 412 in the vicinity of the periphery. The image-side surface 72 of the fifth lens element 7 has a concave portion 723 in the vicinity of the optical axis I and a convex portion 724 in the vicinity of the periphery. The image-side surface 52 of the third lens element 5 is a convex surface and has a convex portion 521 in the vicinity of the optical axis I and a convex portion 522 in the vicinity of the periphery. The fourth lens element 6 has negative refracting power. The object-side surface 61 of the fourth lens element 6 is a concave surface and has a concave portion 611 in the vicinity of the optical axis I and a concave portion 612 in the vicinity of the periphery. For clear illustration, it should be mentioned that the same reference numbers of the concave portions and the convex portions in the two embodiments are omitted from FIG. 70.

The detailed optical data in the seventeenth embodiment are provided in FIG. 72. In the seventeenth embodiment, the EFL of the optical lens assembly 10 is 8.652 mm; the HFOV of the optical lens assembly 10 is 18.797°; the Fno of the optical lens assembly 10 is 2.379; the system length of the optical lens assembly 10 is 8.000 mm, and the image height of the optical lens assembly 10 is 2.944 mm.

The aspheric coefficients of the object-side surface 31 of the first lens element 3 to the image-side surface 72 of the fifth lens element 7 in the formula (1) are indicated in FIG. 73 according to the seventeenth embodiment.

In addition, the relationship among the crucial parameters pertaining to the optical lens assembly 10 in the seventeenth embodiment is indicated in FIG. 84 and FIG. 85.

In FIG. 71A which illustrates the longitudinal spherical aberration in the seventeenth embodiment, the measurement is made on the condition that the pupil radius is 1.8024 mm, and the imaging point deviation of the off-axis ray at different heights is controlled within a range of ±0.0225 mm. In FIG. 71B and FIG. 71C which illustrate two diagrams of field curvature aberration, the focal length variation of the three representative wavelengths within the entire field of view falls within the range of ±0.04 mm. In FIG. 71D, the diagram of distortion aberration shows that the distortion aberration in the seventeenth embodiment can be maintained within the range of ±0.4%. Accordingly, compared to the existing optical lens assembly, the optical lens assembly provided in the seventeenth embodiment can have the favorable image quality, given that the system length of the optical lens assembly is shortened to about 8.000 mm.

According to the above description, the optical lens assembly exemplified in the seventeenth embodiment is superior to that exemplified in the tenth embodiment to some extent. Specifically, the Fno provided in the seventeenth rteenth embodiment is smaller than that provided in the tenth embodiment, the HFOV provided in the seventeenth embodiment is greater than that in the tenth embodiment, the image distortion provided in the seventeenth embodiment is smaller than that provided in the tenth embodiment, and the optical lens assembly provided in the seventeenth embodiment is easier to be fabricated and thus has a higher yield than that provided in the tenth embodiment.

FIG. 74 is a schematic view illustrating an optical lens assembly according to an eighteenth embodiment of the invention, and FIG. 75A to FIG. 75D illustrate a longitudinal spherical aberration and other aberrations of the optical lens assembly according to the eighteenth embodiment of the invention. With reference to FIG. 74, the optical lens assembly 10 provided in the eighteenth embodiment is similar to that provided in the tenth embodiment, while the optical data, the aspheric coefficients, and the parameters of the lens elements 3, 4, 7, 5, and 6 in these two embodiments are different to some extent. Other differences lie in that the image-side surface 52 of the third lens element 5 is a convex surface and has a convex portion 521 in the vicinity of the optical axis I and a convex portion 522 in the vicinity of the periphery. The fourth lens element 6 has negative refracting power. The object-side surface 61 of the fourth lens element 6 is a concave surface and has a concave portion 611 in the vicinity of the optical axis I and a concave portion 612 in the vicinity of the periphery. The image-side surface 62 of the fourth lens element 6 has a concave portion 621 in the vicinity of the optical axis I and a convex portion 622 in the vicinity of the periphery. For clear illustration, it should be mentioned that the same reference numbers of the concave portions and the convex portions in the two embodiments are omitted from FIG. 74.

The detailed optical data in the eighteenth embodiment are provided in FIG. 76. In the eighteenth embodiment, the EFL of the optical lens assembly 10 is 3.044 mm; the HFOV of the optical lens assembly 10 is 18.192°; the Fno of the optical lens assembly 10 is 2.392; the system length of the optical lens assembly 10 is 2.800 mm, and the image height of the optical lens assembly 10 is 1.000 mm.

The aspheric coefficients of the object-side surface 31 of the first lens element 3 to the image-side surface 72 of the fifth lens element 7 in the formula (1) are indicated in FIG. 77 according to the eighteenth embodiment.

In addition, the relationship among the crucial parameters pertaining to the optical lens assembly 10 in the eighteenth embodiment is indicated in FIG. 84 and FIG. 85.

In FIG. 75A which illustrates the longitudinal spherical aberration in the eighteenth embodiment, the measurement is made on the condition that the pupil radius is 0.6343 mm, and the imaging point deviation of the off-axis ray at different heights is controlled within a range of ±14 μm. In FIG. 75B and FIG. 75C which illustrate two diagrams of field curvature aberrations, the focal length variation of the three representative wavelengths within the entire field of view falls within the range of ±0.035 mm. In FIG. 75D, the diagram of distortion aberration shows that the distortion aberration in the eighteenth embodiment can be maintained within the range of ±0.38%. Accordingly, compared to the existing optical lens assembly, the optical lens assembly provided in the eighteenth embodiment can have the favorable image quality, given that the system length of the optical lens assembly is shortened to about 2.800 mm.

According to the above description, the optical lens assembly exemplified in the eighteenth embodiment is superior to that exemplified in the tenth embodiment to some extent. Specifically, the system length provided in the eighteenth embodiment is is shorter than that provided in the tenth embodiment, the range of the longitudinal spherical aberration provided in the eighteenth embodiment is smaller than that provided in the tenth embodiment, the range of field curvature aberration in the sagittal direction in the eighteenth embodiment is smaller than the range of field curvature aberration in the sagittal direction in the tenth embodiment, the range of field curvature aberration in the tangential direction in the eighteenth embodiment is smaller than the range of field curvature aberration in the tangential direction in the tenth embodiment, and the image distortion provided in the eighteenth embodiment is less significant than that provided in the tenth embodiment.

FIG. 78 is a schematic view illustrating an optical lens assembly according to a nineteenth embodiment of the invention, and FIG. 79A to FIG. 79D illustrate a longitudinal spherical aberration and other aberrations of the optical lens assembly according to the nineteenth embodiment of the invention. With reference to FIG. 78, the optical lens assembly 10 provided in the nineteenth embodiment is similar to that provided in the tenth embodiment, while the optical data, the aspheric coefficients, and the parameters of the lens elements 3, 4, 7, 5, and 6 in these two embodiments are different to some extent. Other differences lie in that the fifth lens element 7 has positive refractive power. The image-side surface 72 of the fifth lens element 7 is a convex surface and has a convex portion 721 in the vicinity of the optical axis I and a convex portion 724 in the vicinity of the periphery. The third lens element 5 has negative refracting power. The image-side surface 62 of the fourth lens element 6 has a concave portion 621 in the vicinity of the optical axis I and a convex portion 623 in the vicinity of the periphery. For clear illustration, it should be mentioned that the same reference numbers of the concave portions and the convex portions in the two embodiments are omitted from FIG. 78.

The detailed optical data in the nineteenth embodiment are provided in FIG. 80. In the nineteenth embodiment, the EFL of the optical lens assembly 10 is 6.828 mm; the HFOV of the optical lens assembly 10 is 23.288°; the Fno of the optical lens assembly 10 is 2.387; the system length of the optical lens assembly 10 is 6.294 mm, and the image height of the optical lens assembly 10 is 2.944 mm.

The aspheric coefficients of the object-side surface 31 of the first lens element 3 to the image-side surface 72 of the fifth lens element 7 in the formula (1) are indicated in FIG. 81 according to the nineteenth embodiment.

In addition, the relationship among the crucial parameters pertaining to the optical lens assembly 10 in the nineteenth embodiment is indicated in FIG. 84 and FIG. 85.

In FIG. 79A which illustrates the longitudinal spherical aberration in the nineteenth embodiment, the measurement is made on the condition that the pupil radius is 1.4225 mm, and the imaging point deviation of the off-axis ray at different heights is controlled within a range of ±0.0225 mm. In FIG. 79B and FIG. 79C which illustrate two diagrams of field curvature aberrations, the focal length variation of the three representative wavelengths within the entire field of view falls within the range of ±0.035 mm. In FIG. 79D, the diagram of distortion aberration shows that the distortion aberration in the nineteenth embodiment can be maintained within the range of ±0.85%. Accordingly, compared to the existing optical lens assembly, the optical lens assembly provided in the nineteenth embodiment can have the favorable image quality, given that the system length of the optical lens assembly is shortened to about 6.294 mm.

According to the above description, the optical lens assembly exemplified in the nineteenth embodiment is superior to that exemplified in the tenth embodiment to some extent. Specifically, the system length provided in the nineteenth embodiment is shorter than that provided in the tenth embodiment, the Fno provided in the nineteenth embodiment is smaller than that provided in the tenth embodiment, the HFOV provided in the nineteenth embodiment is greater than that provided in the tenth embodiment, the range of field curvature aberration in the sagittal direction in the nineteenth embodiment is smaller than that in the tenth embodiment, the range of field curvature aberration in the tangential direction in the nineteenth embodiment is smaller than that in the tenth embodiment, and the optical lens assembly provided in the twelfth embodiment is easier to be fabricated and thus has a higher yield than that provided in the tenth embodiment.

With reference to FIG. 82, FIG. 83, FIG. 83, and FIG. 84 that are table diagrams illustrating optical parameters provided in the previous nineteen embodiments, if the relationship of the optical parameters in the optical lens assembly 10 provided in the embodiments of the invention satisfies at least one of the following conditional equations, the design of the optical lens assembly with favorable optical performance and the reduced length in whole becomes technical feasible:

1. To shorten the system length of the lens elements, the thickness of the lens elements and the air gap among the lens elements are properly reduced according to the embodiments of the invention. However, in consideration of the difficulty of assembling the lens elements without sacrificing the imaging quality, the thickness of the lens elements and the air gap among the lens elements need be correspondingly adjusted. Hence, the configurations of the optical lens assembly can be optimized if the following conditional equations are satisfied.

2. If the optical lens assembly satisfies $(TTL \times Fno)/EFL \leq 2.2$, the light incident aperture can be enhanced without increasing the length of the optical lens assembly, which is conducive to the design of the telescopic lens assembly with the large aperture stop. Preferably, $0.8 \leq (TTL \times Fno)/EFL \leq 2.2$.

3. If the optical lens assembly satisfies $2.8 \text{ mm} \leq TTL \leq 8$ mm, the optical lens assembly is not excessively long; the optical lens assembly is neither overly short, which may lead to the reduced length of the image and the reduced size of the resultant photograph.

4. If the optical lens assembly satisfies $HFOV \leq 25°$ or $2.5 \leq EFL/ALT \leq 4.75$, the capability of the optical lens assembly for taking photographs of a distant object can be improved.

5. If the optical lens assembly satisfies $7.3 \leq EFL/T4$, T4 is neither excessive nor insufficient through monitoring the correlation between the focal length and the thickness of the fourth lens element 6. Thereby, the manufacturing difficulty is not increased, and various image aberrations can be slightly corrected. Preferably, $8.4 \leq EFL/T3 \leq 26$.

6. If the optical lens assembly satisfies $6.9 \leq EFL/T3$, T3 is neither excessive nor insufficient through monitoring the correlation between the focal length and the thickness of the third lens element 5. Thereby, the issues of coma and bent imaging surfaces be better resolved. Preferably, $8.4 \leq EFL/T3 \leq 40$.

7. If the optical lens assembly satisfies $EFL/T2 \leq 39$, T2 is neither excessive nor insufficient through monitoring the correlation between the focal length and the thickness of the second lens element 4. Thereby, the aberration generated in the first lens element 3 can be better corrected. Preferably, $7.6 \leq EFL/T2 \leq 39$.

8. If the optical lens assembly satisfies $EFL/G2 \leq 7.1$ and $EFL/G2 \leq 4.6$, the distance among the lens elements can be reduced through monitoring the correlation between the focal length and the distance among the lens elements. Thereby, the telescopic photograph taking ability can be improved without deteriorating the imaging quality. Preferably, $1.7 \leq EFL/G2 \leq 7.1$, and $1.7 \leq EFL/G2 \leq 4.6$.

Besides, the optical lens assembly can further satisfy the following conditional equations, wherein:

$2 \leq AAG/T1 \leq 5.1$;

$1.7 \leq G23/T4$, preferably $1.7 \leq G23/T4 \leq 14$;

$2.4 \leq AAG/T4$, preferably $2.4 \leq AAG/T4 \leq 14$;

$0.8 \leq G23/T1$, preferably $0.8 \leq G23/T1 \leq 5.1$;

$10.5 \leq AAG/G12$, preferably $10.5 \leq AAG/G12 \leq 550$;

$7.5 \leq G23/G12$, preferably $7.5 \leq G23/G12 \leq 548$;

$2.6 \leq G23/T3$, preferably $2.6 \leq G23/T3 \leq 20$;

$(T3+BFL)/T1 \leq 2.2$, preferably $0.95 \leq (T3+BFL)/T1 \leq 2.2$;

$1.1 \leq G23/BFL$, preferably $1.1 \leq G23/BFL \leq 4.5$;

$AAG/T2 \leq 19.5$, preferably $2.4 \leq AAG/T2 \leq 19.5$;

$ALT/G23 \leq 1.8$, preferably $0.35 \leq ALT/G23 \leq 1.8$;

$G23/T2 \leq 19.5$, preferably $1.6 \leq G23/T2 \leq 19.5$;

$ALT/T1 \leq 3.2$, preferably $1.8 \leq ALT/T1 \leq 3.2$.

At least one of the above conditional equations aims at properly maintaining the thickness and the interval among the lens elements, ensuring the entire optical lens assembly can be thinned out without being affected by any overly large parameter, or reducing the difficulty of assembly or fabrication caused by any overly small parameter.

Moreover, the design of the optical lens assembly provided in the embodiments of the invention can further satisfy the following conditional equations:

$1.1 \leq T3/G12 \leq 28.1$;

$0.9T2/G12 \leq 28.2$;

$4.0 \leq T1/G12 \leq 109$;

$25.3 \leq EFL/G12 \leq 967.2$;

$5.3 \leq EFL/T1 \leq 9.0$;

$0.7 \leq T1/T4 \leq 3.7$;

$0.25 \leq T3/T2 \leq 5.3$;

$0.25 \leq T4/T3 \leq 5.4$;

$0.2 \leq G34/G12 \leq 28.5$;

$1.0 \leq G23/G34 \leq 464$;

$1.0 \leq AAG/G23 \leq 2.0$;

$2.0 \leq AAG/G34 \leq 466$;

$3 \leq ALT/T2 \leq 14$;

$2.4 \leq ALT/T3 \leq 16$;

$2.1 \leq ALT/T4 \leq 9.1$;

$0.7T1/G34 \leq 92$;

$0.04 \leq G34/T2 \leq 5.2$;

$0.04 \leq G34/T3 \leq 4.3$;

$2.3 \leq T4/G12 \leq 40$;

$0.03 \leq G34/T4 \leq 1.8$;

$1.8 \leq ALT/G34 \leq 174$;

$5.4 \leq EFL/G34 \leq 820$;

$0.7 \leq BFL/T1 \leq 1.8$;

$1.4 \leq BFL/T2 \leq 8.6$;

$1.1 \leq BFL/T3 \leq 6.3$;

$0.8 \leq BFL/T4 \leq 5.2$;

$3.4 \leq BFL/G1 \leq 122$;

$0.95 \leq BFL/G34 \leq 103$;

$1.1 \leq EFL/TL \leq 1.65$;

Here, in consideration of the design of the optical lens assembly with the same structure, the parameters provided in the embodiments can be combined at will to pose more limitations to the optical lens assembly.

In view of the unpredictability of the design of an optical system, with the framework set forth in the embodiments of the invention, the optical lens assembly satisfying said conditional equations can be characterized by the reduced length, the enlarged available aperture stop, the improved imaging quality, or the improved assembly yield, such that the shortcomings described in the related art can be better prevented.

In addition, the above-mentioned exemplary conditions can be randomly or selectively combined and applied to the embodiments of the invention in different manners; the invention should not be limited to the above examples. During the implementation of the invention, in addition to the above-described conditions, it is also possible to add other detailed structures to one single lens elements or plural lens elements to be equipped with more concave and convex surfaces as well as curvatures, so as to enhance control of system performance and/or resolution. For instance, it is optional to form an additional convex portion in the vicinity of the optical axis on the image-side surface of the first lens element, or the first lens element may have positive refractive power. Note that the above-described details can be optionally combined and applied to the embodiments set forth herein on the premises that these details are not in conflict with one another.

To sum up, the optical lens assembly 10 described in the embodiments of the invention may have at least one of the following advantages and/or achieve at least one of the following effects.

1. The longitudinal spherical aberrations, field curvature aberrations, and distortion aberrations provided in the embodiments of the invention all comply with usage specifications. Moreover, the off-axis rays with different heights and the three representative wavelengths 650 nm, 555 nm, and 470 nm are all gathered around imaging points, and according to a deviation range of each curve, it can be observed that deviations of the imaging points of the off-axis rays with different heights are all controlled and thus capable of suppressing spherical aberrations, image aberrations, and distortion. With reference to the imaging quality data, distances among the three representative wavelengths 650 nm, 555 nm, and 470 nm are fairly close, which indicates that rays with different wavelengths in the optical lens assemblies as provided in the embodiments of the invention can be well concentrated under different circumstances, and the optical lens assemblies are all characterized by the capability of suppressing dispersion. As such, the optical lens assemblies provided herein have favorable optical properties. The optical lens assembly 10 provided in the embodiments of the invention can have the design of the telescopic lens assembly with the large aperture stop or have an improved ability to take photographs of a distant object, and the good imaging quality of the optical lens assembly 10 is also guaranteed according to the above descriptions.

2. The object-side surface 31 of the first lens element 3 has the convex portion 312 in the vicinity of the periphery, which is conducive to concentration of rays.

3. The second lens element 4 has the negative refractive power, such that the primary aberration generated in the first lens element 3 can be easily corrected.

4. The object-side surface 51 of the third lens element 5 has the concave portion 512 in the vicinity of the periphery, and the image-side surface 62 of the fourth lens element 6 has the convex portion 622 in the vicinity of the periphery, such that the primary aberration generated in the third and fourth lens elements 5 and 6 can be easily corrected.

5. The aperture stop 2 is located in front of the first lens element 3, or other lenses are arranged between the first lens element 3 and the second lens element 4, so as to increase the available aperture stop(s) and reduce the Fno. Note that the ray-collecting effects can be most satisfactory if the aperture stop 2 is located in front of the first lens element 3.

Although the disclosure has been provided with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An optical lens assembly comprising a first lens element, a second lens element, a fifth lens element, a third lens element, and a fourth lens element in order from an object side to an image side along an optical axis, each of the first lens element to the fifth lens element comprising an object-side surface facing the object side and allowing an imaging ray to pass through and an image-side surface facing the image side and allowing the imaging ray to pass through, lens elements having refractive power of the optical lens assembly consisting of five lens elements described above;

the image-side surface of the first lens element has a convex portion in the vicinity of a periphery;

the image-side surface of the second lens element has a concave portion in the vicinity of a periphery;

wherein the optical lens assembly satisfies:

$HFOV \leq 18.840°$;

$16.986 \leq EFL/T3 \leq 27.729$;

$1.1 \leq G23/BFL$;

$7.5 \leq G23/G12$;

$10.5 \leq AAG/G12$, wherein HFOV is a half field of view of the optical lens assembly, EFL is an effective focal length of the optical lens assembly, T3 is a thickness of the third lens element along the optical axis, G23 is a distance from the second lens element to the third lens element along the optical axis, BFL is a distance from the image-side surface of the fourth lens element to the image plane along the optical axis, G12 is a distance from the first lens element to the second lens element along the optical axis, and AAG is a sum of a distance from the first lens element to the second lens element along the optical axis, a distance from the second lens element to the third lens element along the optical axis, and a distance from the third lens element to the fourth lens element along the optical axis.

2. The optical lens assembly as recited in claim 1, further satisfying:

(TTL×Fno)/EFL≤2.2, wherein TTL is a distance from the object-side surface of the first lens element to an image plane at the image side along the optical axis, and Fno is an f-number of the optical lens assembly.

3. The optical lens assembly as recited in claim 1, further satisfying:

(T3+BFL)/T1≤2.2, wherein T1 is the thickness of the first lens element along the optical axis.

4. The optical lens assembly as recited in claim 1, wherein the object-side surface of the second lens element having a concave portion in a vicinity of a periphery.

5. The optical lens assembly as recited in claim 1, wherein the object-side surface of the second lens element having a concave portion in a vicinity of the optical axis.

6. The optical lens assembly as recited in claim 1, wherein the object-side surface of the fourth lens element having a concave portion in a vicinity of a periphery.

7. The optical lens assembly as recited in claim 1, wherein the image-side surface of the fourth lens element having a convex portion in a vicinity of the optical axis.

8. The optical lens assembly as recited in claim 1, wherein the second lens element has negative refracting power;

the object-side surface of the fourth lens element having a concave portion in a vicinity of a periphery, wherein the optical lens assembly further satisfies:

$(TTL \times Fno)/EFL \leq 2.2$; and $2.5 \leq EFL/ALT \leq 4.75$, wherein TTL is a distance from the object-side surface of the first lens element to an image plane at the image side along the optical axis, Fno is an f-number of the optical lens assembly, and ALT is a sum of a thickness of the first lens element along the optical axis, a thickness of the second lens element along the optical axis, a thickness of the third lens element along the optical axis, and a thickness of the fourth lens element along the optical axis.

9. The optical lens assembly as recited in claim 8, further satisfying: 7.3≤EFL/T4, wherein T4 is a thickness of the fourth lens element along the optical axis.

10. The optical lens assembly as recited in claim 8, further satisfying: (T3+BFL)/T1≤2.2, wherein T1 is a thickness of the first lens element along the optical axis.

11. The optical lens assembly as recited in claim 8, wherein the object-side surface of the second lens element having a concave portion in a vicinity of a periphery.

12. The optical lens assembly as recited in claim 8, wherein the object-side surface of the fourth lens element having a concave portion in a vicinity of the optical axis.

13. The optical lens assembly as recited in claim 8, further satisfying: ALT/G23≤1.8.

14. The optical lens assembly as recited in claim 8, further satisfying: 1.7≤G23/T4, wherein T4 is a thickness of the fourth lens element along the optical axis.

15. The optical lens assembly as recited in claim 1, wherein
the second lens element has negative refracting power;
the image-side surface of the third lens element has a convex portion in the vicinity of the optical axis;
wherein the optical lens assembly further satisfies:

$(TTL \times Fno)/EFL \leq 2.2$; and $2.5 \leq EFL/ALT \leq 4.75$, wherein TTL is a distance from the object-side surface of the first lens element to an image plane at the image side along the optical axis, Fno is an f-number of the optical lens assembly, and ALT is a sum of a thickness of the first lens element along the optical axis, a thickness of the second lens element along the optical axis, a thickness of the third lens element along the optical axis, and a thickness of the fourth lens element along the optical axis.

16. The optical lens assembly as recited in claim 15, further satisfying: (T3+BFL)/T1≤2.2, wherein T1 is a thickness of the first lens element along the optical axis.

17. The optical lens assembly as recited in claim 15, wherein the object-side surface of the second lens element having a concave portion in a vicinity of a periphery.

18. The optical lens assembly as recited in claim 15, wherein the object-side surface of the fourth lens element having a concave portion in a vicinity of the optical axis.

19. The optical lens assembly as recited in claim 15, further satisfying: 0.863≤(BFL+T5)/(T1+G12)≤1.740, wherein T5 is a thickness of the fifth lens element along the optical axis, and T1 is a thickness of the first lens element along the optical axis.

20. The optical lens assembly as recited in claim 15, further satisfying: 0.489≤(BFL+G34)/G25≤1.976, wherein G34 is a distance from the third lens element to the fourth lens element along the optical axis, and G25 is a distance from the second lens element to the fifth lens element along the optical axis.

* * * * *